(12) United States Patent
Hossain et al.

(10) Patent No.: US 11,683,057 B2
(45) Date of Patent: Jun. 20, 2023

(54) PAM-4 DFE ARCHITECTURES WITH SYMBOL-TRANSITION DEPENDENT DFE TAP VALUES

(71) Applicant: Rambus Inc., San Jose, CA (US)

(72) Inventors: Masum Hossain, Edmonton (CA); Nhat Nguyen, San Jose, CA (US); Yikui Jen Dong, Cupertino, CA (US); Arash Zargaran-Yazd, Sunnyvale, CA (US); Wendemagegnehu Beyene, San Jose, CA (US)

(73) Assignee: Rambus Inc., San Jose, CA (US)

( * ) Notice: Subject to any disclaimer, the term of this patent is extended or adjusted under 35 U.S.C. 154(b) by 0 days.

(21) Appl. No.: 17/527,631

(22) Filed: Nov. 16, 2021

(65) Prior Publication Data

US 2022/0149876 A1 May 12, 2022

Related U.S. Application Data

(63) Continuation of application No. 17/114,782, filed on Dec. 8, 2020, now Pat. No. 11,211,960, which is a (Continued)

(51) Int. Cl.
*H04B 1/12* (2006.01)
*H04L 25/03* (2006.01)
(Continued)

(52) U.S. Cl.
CPC ............... *H04B 1/123* (2013.01); *H04B 1/12* (2013.01); *H04L 25/0264* (2013.01);
(Continued)

(58) Field of Classification Search
CPC ....... H04B 1/12; H04B 1/123; H04L 25/0264; H04L 25/03057; H04L 25/03076;
(Continued)

(56) References Cited

U.S. PATENT DOCUMENTS 7,522,847 B2 4/2009 Momtaz et al.
8,576,903 B2 11/2013 Raphaeli et al.
(Continued)

FOREIGN PATENT DOCUMENTS

CN 1655483 A 8/2005
CN 101106386 A 1/2008
(Continued)

OTHER PUBLICATIONS

EP Communication Pursuant to Article 94(3) EPC dated Jan. 21, 2020 re: EP Appln. No. 16856070.4. 5 Pages.
(Continued)

*Primary Examiner* — David S Huang
(74) *Attorney, Agent, or Firm* — The Neudeck Law Firm, LLC

(57) ABSTRACT

Decision feedback equalization (DFE) is used to help reduce inter-symbol interference (ISI) from a data signal received via a band-limited (or otherwise non-ideal) channel. A first PAM-4 DFE architecture has low latency from the output of the samplers to the application of the first DFE tap feedback to the input signal. This is accomplished by not decoding the sampler outputs in order to generate the feedback signal for the first DFE tap. Rather, weighted versions of the raw sampler outputs are applied directly to the input signal without further analog or digital processing. Additional PAM-4 DFE architectures use the current symbol in addition to previous symbol(s) to determine the DFE feedback signal. Another architecture transmits PAM-4 signaling using non-uniform pre-emphasis. The non-uniform pre-emphasis allows a speculative DFE receiver to resolve the transmitted PAM-4 signals with fewer comparators/samplers.

20 Claims, 31 Drawing Sheets

Related U.S. Application Data continuation of application No. 16/680,859, filed on Nov. 12, 2019, now Pat. No. 10,892,791, which is a continuation of application No. 15/755,255, filed as application No. PCT/US2016/056542 on Oct. 12, 2016, now Pat. No. 10,516,427.

(60) Provisional application No. 62/351,557, filed on Jun. 17, 2016, provisional application No. 62/248,461, filed on Oct. 30, 2015, provisional application No. 62/242,196, filed on Oct. 15, 2015.

(51) Int. Cl.
| | | |
|---|---|---|
| *H04L 25/49* | (2006.01) | |
| *H04L 27/06* | (2006.01) | |
| *H04L 27/01* | (2006.01) | |
| *H04L 27/00* | (2006.01) | |
| *H04L 25/02* | (2006.01) | |

(52) U.S. Cl.
CPC .. *H04L 25/03057* (2013.01); *H04L 25/03076* (2013.01); *H04L 25/03133* (2013.01); *H04L 25/4917* (2013.01); *H04L 27/00* (2013.01); *H04L 27/01* (2013.01); *H04L 27/06* (2013.01)

(58) Field of Classification Search
CPC ........... H04L 25/03133; H04L 25/4917; H04L 27/00; H04L 27/01; H04L 27/06
See application file for complete search history.

(56) References Cited

U.S. PATENT DOCUMENTS

| | | | |
|---|---|---|---|
| 8,879,616 | B2 | 11/2014 | Zhou et al. |
| 8,966,353 | B2 | 2/2015 | Zhou et al. |
| 2004/0264615 | A1 | 12/2004 | Ho et al. |
| 2005/0135475 | A1 | 6/2005 | Momtaz et al. |
| 2012/0027074 | A1 | 2/2012 | Raghavan et al. |
| 2012/0140812 | A1 | 6/2012 | Ho et al. |
| 2012/0314756 | A1 | 12/2012 | Leibowitz et al. |
| 2013/0094561 | A1 | 4/2013 | Raphaeli et al. |
| 2013/0322506 | A1 | 12/2013 | Zerbe et al. |
| 2014/0140389 | A1 | 5/2014 | Chen |
| 2015/0256363 | A1 | 9/2015 | Shvydun et al. |
| 2020/0295871 | A1* | 9/2020 | Lu ..................... H04L 25/03203 |

FOREIGN PATENT DOCUMENTS

| | | |
|---|---|---|
| CN | 102870386 A | 1/2013 |
| CN | 103081422 A | 5/2013 |

OTHER PUBLICATIONS

EP Extended European Search Report dated May 22, 2019 re: EP Appln. No. 16856070.4. 8 Pages.
EP Response as Filed on Apr. 23, 2020 in Response to the Official Communication Pursuant to Art. 94(3) EPC dated Jan. 21, 2020 re: EP Appl. No. 16856070.4. 20 pages.
Frazier, Howard et al., "Feasibility of 100 GB/s Operation on Installed Backplane Channels", IEEE Draft, vol. 802.3, Apr. 2012, Broadcom Inc., 21 Pages.
Lee, Edward W., "High-Speed Serial Data Link Design and Simulation," Thesis paper submitted to University of Illinois at Urbana-Champaign, 2009. [retrieved on Feb. 1, 2017]. Retrieved from Google Scholar: <URL: https://www.ideals.illinois.edu/bitstream/handle/2142/14727/1_Lee_Edward.pdf?sequence=3&isAllowed=y>. 27 pages.
Notification Concerning Transmittal of International Preliminary Report on Patentability dated Apr. 26, 2018 re: Int'l Appln No. PCT/US16/056542. 10 Pages.
Notification of Transmittal of the International Search Report and the Written Opinion of the International Searching Authority dated Feb. 27, 2017 re: Int'l Appln. No. PCT/US16/056542. 17 Pages.
Son, Seuk et al., "A 2.3-mW, 5-GB/s Low-Power Decision-Feedback Equalizer Receiver Front-End and its Two-Step, Minimum Bit-Error-Rate Adaptation Algorithm", IEEE Journal of Solid-State Circuits, vol. 48, No. 11, Nov. 2013, pp. 2693-2704. 12 Pages.
Wong, Koon-Lun et al., "A 5-m 6-Gb/s Quarter-Rate Sampling Receiver With a 2-Tap DFE Using Soft Decisions", IEEE Journal of Solid-State Circuits, vol. 42, No. 4. Apr. 2007. pp. 881-888. 8 Pages.
CN Second Office Action dated Jun. 16, 2022 re: CN Appln. No. 202110458051.9. 6 pages. (W/translation).
CN Office Action dated Jan. 14, 2022 re; CN Appln. No. 202110458051.9. 8 pages.

* cited by examiner

PRODUCE A FIRST SAMPLER DECISION INDICATOR BASED ON A COMPARISON BETWEEN AN EQUALIZED DATA SIGNAL AND A FIRST REFERENCE VOLTAGE
1802

PRODUCE A SECOND SAMPLER DECISION INDICATOR BASED ON A COMPARISON BETWEEN THE EQUALIZED DATA SIGNAL AND A SECOND REFERENCE VOLTAGE
1804

PRODUCE A THIRD SAMPLER DECISION INDICATOR BASED ON A COMPARISON BETWEEN THE EQUALIZED DATA SIGNAL AND A THIRD REFERENCE VOLTAGE
1806

BASED ON THE FIRST SAMPLER DECISION INDICATOR, PRODUCE A FIRST ERROR REMOVAL VOLTAGE
1808

BASED ON THE SECOND SAMPLER DECISION INDICATOR, PRODUCE A SECOND ERROR REMOVAL VOLTAGE
1810

BASED ON THE THIRD SAMPLER DECISION INDICATOR, PRODUCE A THIRD ERROR REMOVAL VOLTAGE
1812

SUM A RECEIVED DATA SIGNAL WITH THE FIRST ERROR REMOVAL VOLTAGE, THE SECOND ERROR REMOVAL VOLTAGE, AND THE THRID ERROR REMOVAL VOLTAGE TO PRODUCE THE EQUALIZED DATA SIGNAL
1814

FIGURE 18

```
┌─────────────────────────────────────────────────────────────┐
│  PRODUCE A FIRST PREVIOUS SYMBOL SAMPLER DECISION INDICATOR │
│  BASED ON A COMPARISON BETWEEN AN EQUALIZED DATA SIGNAL AND │
│                  A FIRST REFERENCE VOLTAGE                  │
│                            1902                             │
└─────────────────────────────────────────────────────────────┘
                              │
┌─────────────────────────────────────────────────────────────┐
│        PRODUCE A SECOND PREVIOUS SYMBOL SAMPLER DECISION    │
│  INDICATOR BASED ON A COMPARISON BETWEEN THE EQUALIZED DATA │
│            SIGNAL AND A SECOND REFERENCE VOLTAGE            │
│                            1904                             │
└─────────────────────────────────────────────────────────────┘
                              │
┌─────────────────────────────────────────────────────────────┐
│  PRODUCE A THIRD PREVIOUS SYMBOL SAMPLER DECISION INDICATOR │
│ BASED ON A COMPARISON BETWEEN THE EQUALIZED DATA SIGNAL AND │
│                  A THIRD REFERENCE VOLTAGE                  │
│                            1906                             │
└─────────────────────────────────────────────────────────────┘
                              │
┌─────────────────────────────────────────────────────────────┐
│  PRODUCE A FIRST CURRENT SYMBOL SAMPLER DECISION INDICATOR  │
│   BASED ON A COMPARISON BETWEEN A RECEIVED DATA SIGNAL AND  │
│                  THE FIRST REFERENCE VOLTAGE                │
│                            1908                             │
└─────────────────────────────────────────────────────────────┘
                              │
┌─────────────────────────────────────────────────────────────┐
│  PRODUCE A SECOND CURRENT SYMBOL SAMPLER DECISION INDICATOR │
│   BASED ON A COMPARISON BETWEEN A RECEIVED DATA SIGNAL AND  │
│                 THE SECOND REFERENCE VOLTAGE                │
│                            1910                             │
└─────────────────────────────────────────────────────────────┘
                              │
┌─────────────────────────────────────────────────────────────┐
│  PRODUCE A THIRD CURRENT SYMBOL SAMPLER DECISION INDICATOR  │
│   BASED ON A COMPARISON BETWEEN A RECEIVED DATA SIGNAL AND  │
│                 THE THIRD REFERENCE VOLTAGE                 │
│                            1912                             │
└─────────────────────────────────────────────────────────────┘
                              │
                             (A)
```

FIGURE 19A (A)

BASED ON THE FIRST PREVIOUS SYMBOL SAMPLER DECISION INDICATOR, PRODUCE A FIRST PREVIOUS SYMBOL ERROR REMOVAL VOLTAGE
1914

BASED ON THE SECOND PREVIOUS SYMBOL SAMPLER DECISION INDICATOR, PRODUCE A SECOND PREVIOUS SYMBOL ERROR REMOVAL VOLTAGE
1916

BASED ON THE THIRD PREVIOUS SYMBOL SAMPLER DECISION INDICATOR, PRODUCE A THIRD PREVIOUS SYMBOL ERROR REMOVAL VOLTAGE
1918

BASED ON THE FIRST CURRENT SYMBOL SAMPLER DECISION INDICATOR, PRODUCE A FIRST CURRENT SYMBOL ERROR REMOVAL VOLTAGE
1920

BASED ON THE SECOND CURRENT SYMBOL SAMPLER DECISION INDICATOR, PRODUCE A SECOND CURRENT SYMBOL ERROR REMOVAL VOLTAGE
1922

BASED ON THE THIRD CURRENT SYMBOL SAMPLER DECISION INDICATOR, PRODUCE A THIRD CURRENT SYMBOL ERROR REMOVAL VOLTAGE
1924

SUM A DELAYED VERSION OF A RECEIVED DATA SIGNAL WITH THE FIRST PREVIOUS SYMBOL ERROR REMOVAL VOLTAGE, THE SECOND PREVIOUS SYMBOL ERROR REMOVAL VOLTAGE, THE THIRD PREVIOUS SYMBOL ERROR REMOVAL VOLTAGE, THE FIRST CURRENT SYMBOL ERROR REMOVAL VOLTAGE, THE SECOND CURRENT SYMBOL ERROR REMOVAL VOLTAGE, AND THE THIRD CURRENT SYMBOL ERROR REMOVAL VOLTAGE TO PRODUCE THE EQUALIZED DATA SIGNAL
1926

PAM-4 DFE ARCHITECTURES WITH SYMBOL-TRANSITION DEPENDENT DFE TAP VALUES

BRIEF DESCRIPTION OF THE DRAWINGS

FIG. 18 is a flowchart illustrating a non-speculative decoder free method of decision feedback equalization.

FIGS. 19A-19B are a flowchart illustrating a non-speculative method of decision feedback equalization.

DETAILED DESCRIPTION OF THE EMBODIMENTS

Decision feedback equalization (DFE) is used to help reduce inter-symbol interference (ISI) from a data signal received via a band-limited (or otherwise non-ideal) channel. In an embodiment, a PAM-4 DFE architecture has low latency from the output of the samplers to the application of the first DFE tap feedback to the input signal. This is accomplished by not decoding the sampler outputs in order to generate the feedback signal for the first DFE tap. Rather, weighted versions of the raw sampler outputs are applied directly to the input signal without further analog or digital processing.

In other embodiments, additional PAM-4 DFE architectures use the current symbol in addition to previous symbol(s) to determine the DFE feedback signal. For example, an analog sample and hold circuit is used to capture the voltage level of a symbol while it is the current symbol. This captured voltage is held until the next symbol period, weighted, and then analog added to a weighted version of the current input voltage. This implements an analog feed-forward equalizer that utilizes the current symbol. In another example, a weighted version of the current input voltage is added to a first DFE tap voltage. The sum of these inputs is sampled to produce the first DFE tap voltage for the next symbol period.

A finite impulse response (FIR) filter is used to provide non-uniform pre-emphasis to a PAM-4 output signal. The non-uniform pre-emphasis values are selected such that, after passing through the channel, several of the received voltage levels have approximately the same values. In other words, the non-uniform pre-emphasis is combined with the ISI caused by the channel to allow certain transitions to be sampled using the same reference voltages rather than different reference voltages. This allows the use of fewer comparators (e.g., five instead of twelve) to speculatively sample the received PAM-4 signal.

Figure 1:
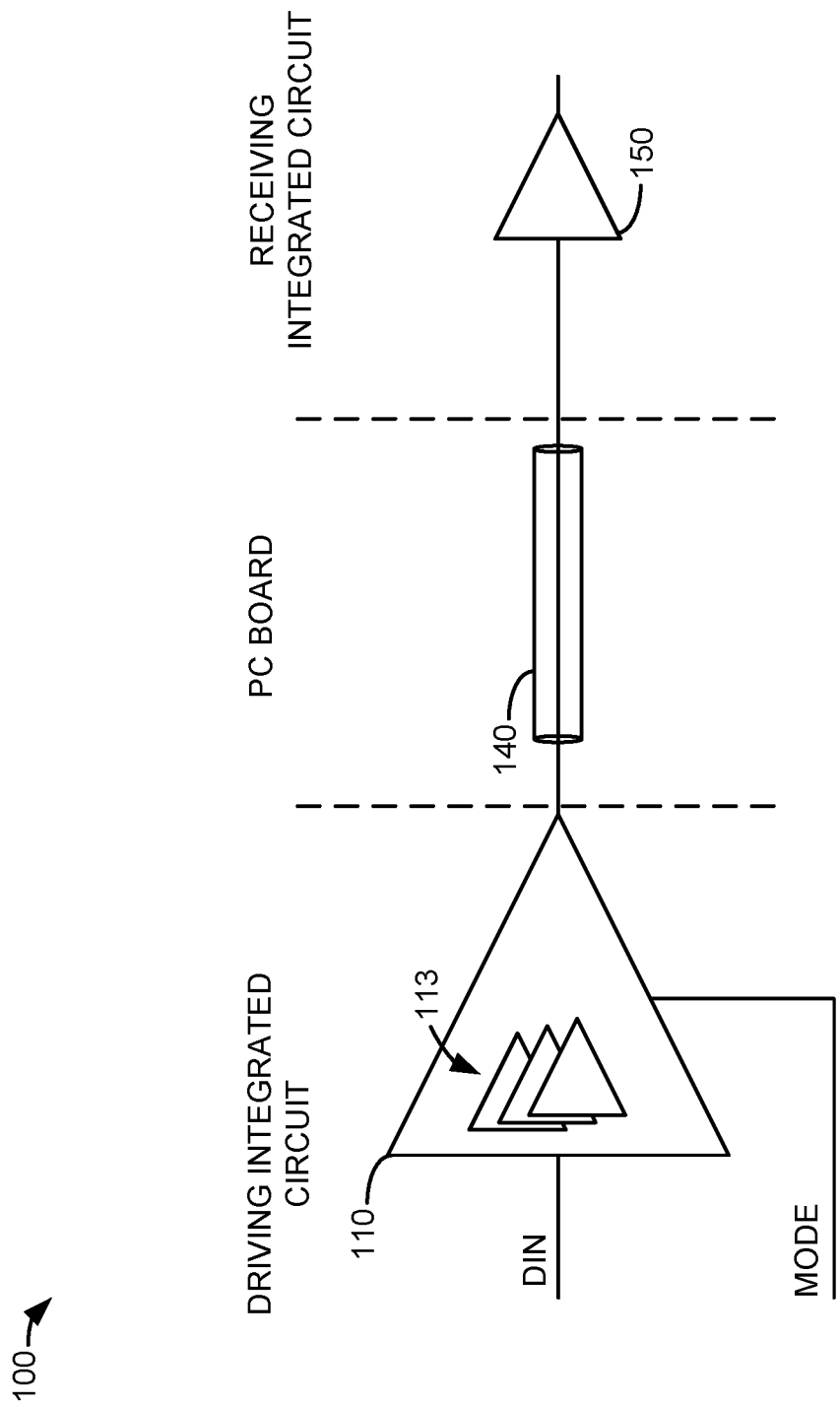
FIG. 1 is a diagram illustrating a communication system with decision feedback equalization (DFE).

FIG. 1 is a diagram illustrating a communication system with decision feedback equalization (DFE). Communication system 100 comprises a driving integrated circuit, a receiving integrated circuit, and interconnect between them. The driving integrated circuit includes transmitter circuit 110 (a.k.a., a driver). Transmitter circuit 110 may use finite impulse response (FIR) based equalization. Transmitter circuit 110 may include tap drivers 113. Tap drivers 113 may include one or more pre-tap FFE drivers, one or more post-tap FFE drivers, and a main tap driver.

The receiver integrated circuit includes receiver circuit 150. The interconnect between the driving integrated circuit and the receiving integrated circuit comprises interconnect system 140. Interconnect system 140 would typically comprise a printed circuit (PC) board, connector, cable, flex circuit, other substrate, and/or a combination of these. Interconnect system 140 may be and/or include one or more transmission lines.

Receiver circuit 150 would typically be part of an integrated circuit that is receiving the signal sent by the driving integrated circuit. It should be understood that termination (not shown in FIG. 1) can be part of the integrated circuit or interconnect system 140. It should also be understood that although system 100 is illustrated as transmitting a single-ended signal, the signals sent by the driving integrated circuit of system 100 may represent one of a pair of differential signals or one of a collection of signals sending multi-wire-coded data.

In FIG. 1, the output of transmitter circuit 110 is connected to a first end of interconnect system 140. The second end of interconnect system 140 is connected to the input of receiver 150. In an embodiment, transmitter circuit 110 may be configured to drive PAM-4 signaling levels. In another embodiment, transmitter circuit 110 may be configured to drive PAM-2 (non-return to zero—NRZ) signaling levels.

In an embodiment receiver 150 uses a PAM-4 DFE architecture that has low latency from the output of the samplers to the application of the first DFE tap feedback to the input signal. Appropriately weighted versions of the raw sampler outputs are applied directly to the input signal without further analog or digital processing. By applying the weighted versions of the raw sampler outputs directly to the input signal, the latency associated with processing the sampler outputs into a single DFE tap value is reduced.

In an embodiment, receiver 150 uses a DFE architecture that uses the current input voltage (symbol) received via interconnect system 140 as an input to help determine the DFE feedback signal. Receiver 150 adds the current input symbol to the higher (i.e., greater than 1) DFE feedback taps (if any) to produce a first input voltage. Receiver 150 may use an analog sample and hold circuit to capture this first input voltage during the current symbol period. Receiver 150 holds the captured first input voltage during the next symbol period. Receiver 150 weights the captured first input voltage. Receiver 150 analog adds this weighted version to an analog weighted version of the current input voltage (i.e., the next symbol). Receiver 150 therefore implements an analog feed-forward equalizer that utilizes the current symbol.

In an embodiment, receiver 150 adds the current input symbol to the higher (i.e., greater than 1) DFE feedback taps (if any) to produce a first input voltage. Receiver 150 analog weights this first input voltage to produce a weighted version of the first input voltage. Receiver 150 analog adds this weighted version of the first input voltage to a first DFE tap voltage produced from the sampled (digital) version of the previous symbol. The sum of these two inputs is sampled by receiver 150 to produce the first DFE tap voltage for the next (i.e., subsequent) symbol period.

In an embodiment, receiver 150 is a speculative DFE receiver. Transmitter circuit 110 uses a finite impulse response (FIR) filter to apply non-uniform pre-emphasis to a PAM-4 output signal. The non-uniform pre-emphasis applied by transmitter circuit 110 is selected such that, after passing through interconnect system 140, several of the received PAM-4 voltage levels have effectively the same values. The non-uniform pre-emphasis applied by transmitter circuit 110 combined with the ISI caused by interconnect system 140 allow certain PAM-4 transitions sent by transmitter circuit 110 to be accurately sampled by speculative DFE receiver 150 using five comparators.

PAM-4 voltage levels may be assigned the values −3, −1, +1, and +3. These values are assumed for the discussion herein. In addition, for the discussion herein, the letter 'a' is used to denote these symbol values in digital/integer form (i.e., −3, −1, +1, and +3) and the letter 'v' to denote these symbol values and other voltages in their analog form (e.g., −30 mV, −10 mV, +10 mV, +30 mV).

A desirable non-speculative DFE receiver (e.g., receiver 150) would implement the first DFE tap to be based on the current symbol according to the following Equation 1:

$$dfe_1 = -0.5\alpha_1(a_{-1} - a_0) \qquad \text{EQN. 1}$$

where $dfe_1$ is the desirable DFE tap value for the first post-cursor DFE tap; $a_{-1}$ is the previous symbol; $a_0$ is the current symbol; and $\alpha_1$ is the amount of ISI associated with a transition between two adjacent, with respect to signal/voltage, PAM-4 levels (e.g., from +1 to −1, −3 to −1, etc.) for the first post-cursor ISI. Thus, a desirable non-speculative DFE receiver (e.g., receiver 150) would implement the first DFE tap according to Table 1.

TABLE 1

| Previous Symbol $a_{-1}$ | Current Symbol $a_0$ | $(a_{-1} - a_0)$ | $-0.5(a_{-1} - a_0)$ | DFE Tap Value |
|---|---|---|---|---|
| +3 | +3 | 0 | 0 | 0 |
| +3 | +1 | +2 | −1 | −1α |
| +3 | −1 | +4 | −2 | −2α |
| +3 | −3 | +6 | −3 | −3α |
| +1 | +3 | −2 | +1 | +α |
| +1 | +1 | 0 | 0 | 0 |
| +1 | −1 | +2 | −1 | −α |
| +1 | −3 | +4 | −2 | −2α |
| −1 | +3 | −4 | +2 | +2α |
| −1 | +1 | −2 | +1 | +α |
| −1 | −1 | 0 | 0 | 0 |
| −1 | −3 | +2 | −1 | −α |
| −3 | +3 | −6 | +3 | +3α |
| −3 | +1 | −4 | +2 | +2α |
| −3 | −1 | −2 | +1 | +α |
| −3 | −3 | 0 | 0 | 0 |

For the second and higher DFE tap values, (e.g., DFE tap #n, where n=2, 3, 4 . . . ), it can be shown that the amount of ISI a previous symbol $a_{-n}$ has on a current symbol $a_0$ depends on the trajectory between the two adjacent symbols $a_{-n}$ and $a_{-(n-1)}$. Therefore, desired values for higher DFE taps can be expressed according to Equation 2:

$$dfe_n = \tfrac{1}{2}(a_{-n} - a_{-(n-1)})\alpha_n = -0.5(a_{-n} - a_{-(n-1)})\alpha_n \qquad \text{EQN. 2}$$

where $dfe_n$ is the desirable DFE tap value for the $n^{th}$ post-cursor DFE tap; $a_{-(n-1)}$ is the symbol immediately previous to the $n^{th}$ symbol; $a_{-n}$ is the current symbol; and an is the amount of ISI associated with a transition magnitude of a single PAM-4 level (e.g., from +1 to −1, −3 to −1, etc.) for the $n^{th}$ post-cursor ISI.

In accordance with Equation 1 and Equation 2, the Equations in Table 2 generalize the desirable DFE tap values for all taps. In Table 2, $v_m$ is the received voltage; m is the time index; $h_0$, $h_1$, $h_2$, etc. are the discrete-time voltage values of the channel (e.g., interconnect system 140) single-bit response; and $a_m$ is the $m^{th}$ transmitted symbol.

TABLE 2

$v_m = a_m h_0 + 0.5(a_{m-1} - a_m)h_1 + 0.5(a_{m-2} - a_{m-1})h_2 + \ldots$
$dfe_1 = -0.5(a_{m-1} - a_m)\alpha_1$
$dfe_2 = -0.5(a_{m-2} - a_{m-1})\alpha_2$
$dfe_3 = -0.5(a_{m-3} - a_{m-2})\alpha_3$
etc.
sampler input $= a_m h_0 + 0.5(a_{m-1} - a_m)(h_1 - \alpha_1) + 0.5(a_{m-2} - a_{m-1})(h_2 - \alpha_2)$
$+ \ldots$
where $a_i = \{+3, +1, -1, -3\}$ It should be understood that as used herein, h is the single-bit response (SBR). In other words, when plotting the single-bit response such that the Y axis is in units of volts and x is in units of time, the single-bit response is obtained by convolving channel impulse response (e.g., impulse response of interconnect 140) with an ideal bit (i.e. a square shaped signal). To find the effect of ISI on each symbol (bit) the single-bit response needs to be used. When h is used with a subscript (i.e. $h_0$, $h_1$, $h_2$ . . . $h_m$, refer to samples of continuous a waveform h, acquired at uniformly spaced time instances, where each two adjacent sampling intervals are apart by 1 UI—unit interval—equal to 1/(data rate). The point that h has its maximum amplitude may be referred to as cursor, or $h_0$. The subscript zero (0) refers to the fact that cursor is used as the time reference. The sample coming 1 UI after (right side on a time axis running left to right) of $h_0$ is called first post-cursor, or $h_1$. The sample that precedes (left side) $h_0$ is called first pre-cursor, or $h_{-1}$. To illustrate how to calculate the effect of ISI on the current bit voltage amplitude, $v_0$, assume a simplified channel that only has 1 pre-cursor, and 1 post-cursor. In this case, for example:

$$v_0 = (\text{current symbol}) \times h_0 + (\text{next symbol}) \times h_{-1} + (\text{previous symbol}) \times h_1$$

Note that the symbol in NRZ (i.e., PAM-2) signaling can have a value of either −1 or +1. For PAM-4 signaling the symbol can have a value of −1, −⅓, +⅓ or +1.

Figure 2:
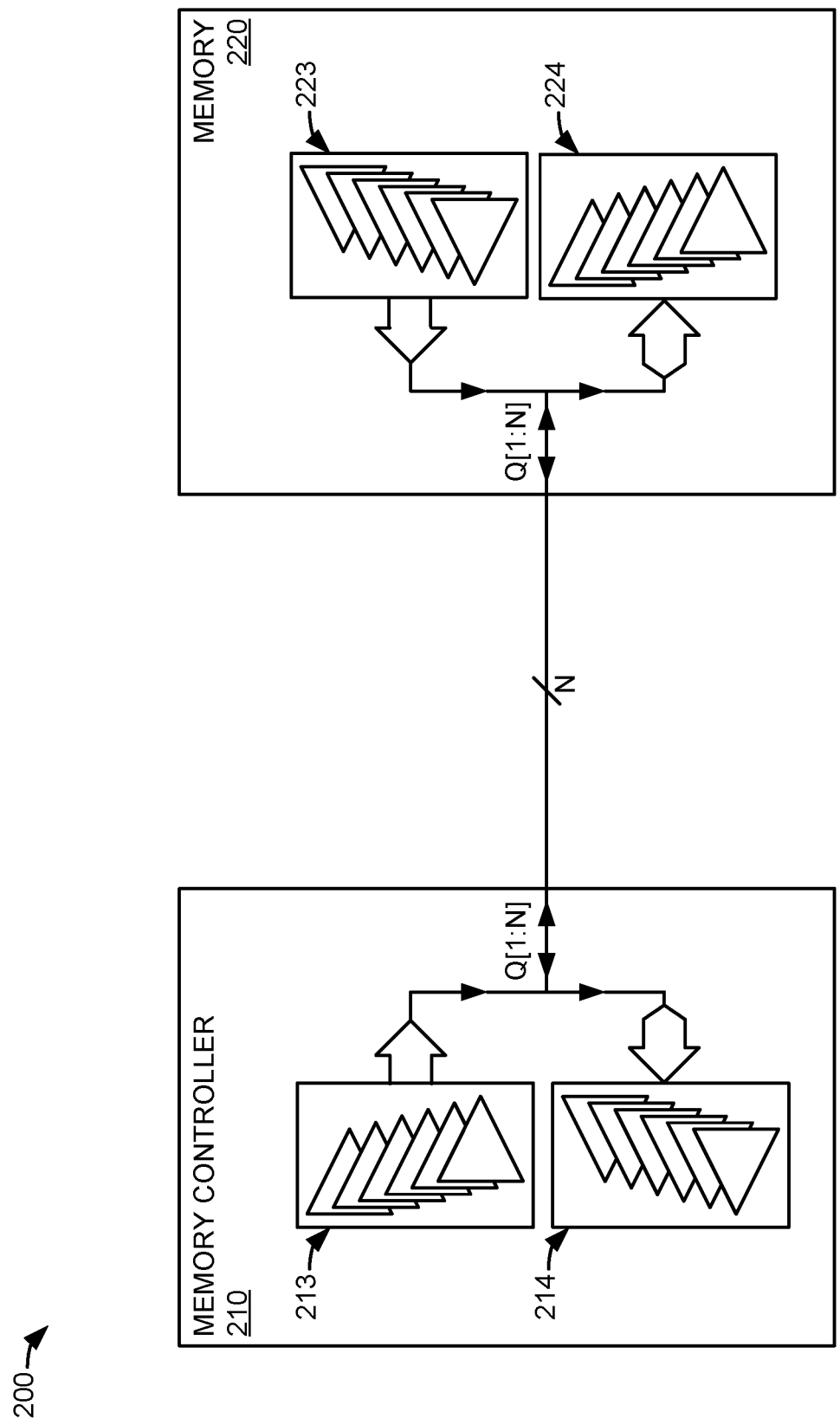
FIG. 2 is a diagram illustrating a memory system.

FIG. 2 is a block diagram illustrating a memory system. In FIG. 2, memory system 200 comprises memory controller 210 and memory 220. Memory controller 210 includes drivers 213 and receivers 214. Memory controller 210 also includes N number of signal ports Q[1:N] that may be driven by one or more of drivers 213 and may receive signals to be sampled by one or more of receivers 214. Memory 220 includes drivers 223 and receivers 224. Memory 220 also includes N number of signal ports Q[1:N] that may be driven by one or more of drivers 223 and may receive signals to be sampled by one or more of receivers 224. Signal ports Q[1:N] of memory controller 210 are operatively coupled to ports Q[1:N] of memory 220, respectively. Receivers 224 of memory 220 may receive one or more of the Q[1:N] signals from memory controller 210. Receivers 214 of memory controller 210 may receive one or more of the Q[1:N] signals from memory 220.

One or more of drivers 213 when configured and coupled with a corresponding one or more receivers 224 may form a PAM-2 signaling system or a PAM-4 signaling system. Thus, one or more of drivers 213 of memory controller 210 may correspond to transmitter circuit 110, discussed previously, or correspond to a transmitter circuit discussed herein subsequently. The one or more of drivers 213 of memory controller 210 may apply pre-emphasis to drive a (two- or four-level) signal. One or more of receivers 214 of memory controller 210 may correspond to receiver 150, discussed previously, or correspond to a receiver circuit discussed herein subsequently. The one or more of receivers 214 of memory controller 210 may use a DFE architecture that uses the current input voltage (symbol) received via from memory 220 as an input to help determine a DFE feedback signal.

One or more of drivers 223 when configured and coupled with a corresponding one or more receivers 214 may form a PAM-2 signaling system or a PAM-4 signaling system. Thus, one or more of drivers 223 of memory 220 may correspond to transmitter circuit 110, discussed previously, or correspond to a transmitter circuit discussed herein subsequently. The one or more of drivers 223 of memory 220 may apply pre-emphasis to drive a (two- or four-level) signal. One or more of receivers 224 of memory 220 may correspond to receiver 150, discussed previously, or correspond to a receiver circuit discussed herein subsequently. The one or more of receivers 224 of memory 220 may use a DFE architecture that uses the current input voltage (symbol) received from memory controller 210 as an input to help determine a DFE feedback signal.

Memory controller 210 and memory 220 are integrated circuit type devices, such as one commonly referred to as a "chip". A memory controller, such as memory controller 210, manages the flow of data going to and from memory devices, such as memory 220. For example, a memory controller may be a northbridge chip, an application specific integrated circuit (ASIC) device, a graphics processor unit (GPU), a system-on-chip (SoC) or an integrated circuit device that includes many circuit blocks such as ones selected from graphics cores, processor cores, and MPEG encoder/decoders, etc. Memory 220 can include a dynamic random access memory (DRAM) core or other type of memory cores, for example, static random access memory (SRAM) cores, or non-volatile memory cores such as flash. In addition, although the embodiments presented herein describe memory controller and components, the instant apparatus and methods may also apply to chip interfaces that effectuate signaling between separate integrated circuit devices.

It should be understood that signal ports Q[1:N] of both memory controller 210 and memory 220 may correspond to any input or output pins (or balls) of memory controller 210 or memory 220 that transmit information between memory controller 210 and memory 220. For example, signal ports Q[1:N] can correspond to bidirectional data pins (or pad means) used to communicate read and write data between memory controller 210 and memory 220. The data pins may also be referred to as "DQ" pins. Thus, for a memory 220 that reads and writes data up to 16 bits at a time, signal ports Q[1:N] can be seen as corresponding to pins DQ[0:15]. In another example, signal ports Q[1:N] can correspond to one or more unidirectional command/address (C/A) bus. Signal ports Q[1:N] can correspond to one or more unidirectional control pins. Thus, signal ports Q[1:N] on memory controller 210 and memory 220 may correspond to pins such as CS (chip select), a command interface that includes timing control strobes such as RAS and CAS, address pins A[0:P] (i.e., address pins carrying address bits), DQ[0:X] (i.e., data pins carrying data bits), etc., and other pins in past, present, or future devices.

Figure 3A:
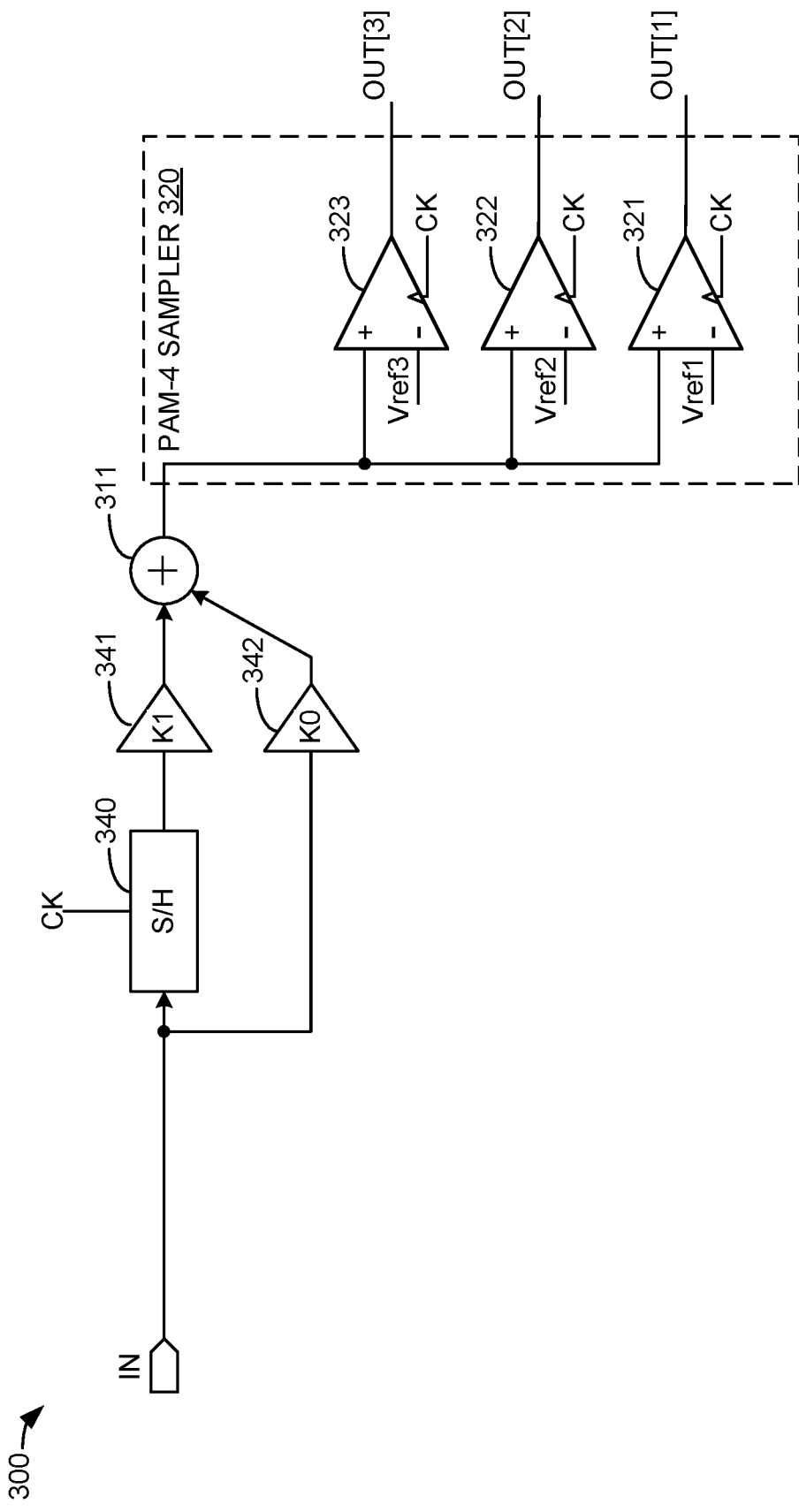
FIG. 3A illustrates a non-speculative DFE four-level pulse amplitude modulation (PAM-4) receiver with analog feed-forward equalization (FFE).

FIG. 3A illustrates a non-speculative DFE four-level pulse amplitude modulation (PAM-4) receiver with analog feed-forward equalization (FFE). Receiver 300, illustrated in FIG. 3A, may correspond to one or more of receiver 150, receivers 214, and/or receivers 224. In an embodiment, receiver 300 may be configured to implement DFE tap values as described herein. In particular, receiver 300 may implement DFE tap values as given in one or more of Equation 1, Equation 2, Table 1, and/or Table 2.

Receiver 300 comprises analog summer 311, sample-and-hold (S/H) circuit 340, weighted buffer 341, weighted buffer 342, and PAM-4 sampler 320. PAM-4 sampler 320 includes sampler 321, sampler 322, and sampler 323. Samplers 321-323 output digital signals that can be interpreted to be either +1 or −1. Weighted buffers 341-342 receive and output analog signals that do not need interpretation.

An input signal (IN) is operatively coupled to the input of S/H 340 and the input of weighted buffer 342. Input signal (IN) may be received from, for example, interconnect system 140. Weighted buffer 342 outputs the analog voltage at the input to weighted buffer 342 multiplied by the factor K0. In an embodiment, $K0 = 1 + 0.5\alpha_1$, where $\alpha_1$ is may be adapted or selected to remove the first post-cursor ISI component. When $\alpha_1$ is dynamically adapted, it should be understood that K0 may be variable during an adaptation (i.e., training) period, but is typically constant during normal operation.

Sample-and-hold 340 samples and holds according to a timing reference (CK) that is synchronized to symbol periods such that S/H 340 will take an analog sample of the voltage on the input to S/H 340 at the same time PAM-4 sampler 320 is controlled to sample. This analog sample is held at the output of S/H 340 until a new analog sample is taken during the next symbol period.

The output of S/H 340 is input to weighted buffer 341. Weighted buffer 341 outputs the analog voltage at the input to weighted buffer 341 multiplied by the factor K1. In an embodiment, K1=−0.5$\alpha_1$. Similar to K0, it should be understood that K1 may be variable during an adaptation (i.e., training) period, but is typically constant during normal operation.

The outputs of weighted buffer 341 and weighted buffer 342 are input to analog summer 311. The output of analog summer 311 is input to PAM-4 sampler 320. The output of analog summer 311 is input to the non-inverting inputs of samplers 321-323. The inverting input of sampler 321 receives reference voltage Vref1. The inverting input of sampler 322 receives reference voltage Vref2. The inverting input of sampler 323 receives reference voltage Vref3. Reference voltages Vref1, Vref2, and Vref3 are typically selected to be between PAM-4 voltage levels. For example, if the four PAM-4 levels are −3V, −1V, +1V, and +3V, Vref1 may be selected to be −2V, Vref2=0V, and Vref3=+2V.

Samplers 321-323 each receive a timing reference CK. CK determines the timing that samplers 321-323 compare inputs (i.e., output of summer 311) to their respective reference voltage (e.g., Vref1, etc.) to produce their respective digital output signal.

The voltage at the input of PAM-4 sampler 320 can be expressed by the Equations in Table 3. In Table 3, $v_m$ is the received voltage; m is the time index; $h_0$, $h_1$, $h_2$, etc. are the discrete-time voltage values of the channel (e.g., interconnect system 140) single-bit response; $a_m$ is the $m^{th}$ transmitted symbol; and $\beta$ is the ISI at the output of S/H 340.

TABLE 3

| |
|---|
| define $\Delta = 0.5(a_{m-1} - a_m)$ |
| $v_m = a_m h_0 + \Delta h_1$ |
| $v_{m-1} = a_{m-1} h_0 + \Delta \beta$ |
| sampler input: $v_m - 0.5(v_{m-1} - v_m)\alpha_1$ |
| sampler input: $a_m h_0 + \Delta(h_1 - h_0\alpha_1) + 0.5\Delta\alpha_1(h_1 - \beta)$ (during adaptation) |
| sampler input: $a_m h_0 + 0.5\Delta\alpha_1(h_1 - \beta)$ (steady state as $\alpha_1 \to {}^{h_1}/_{h_0}$) |

Figure 3B:
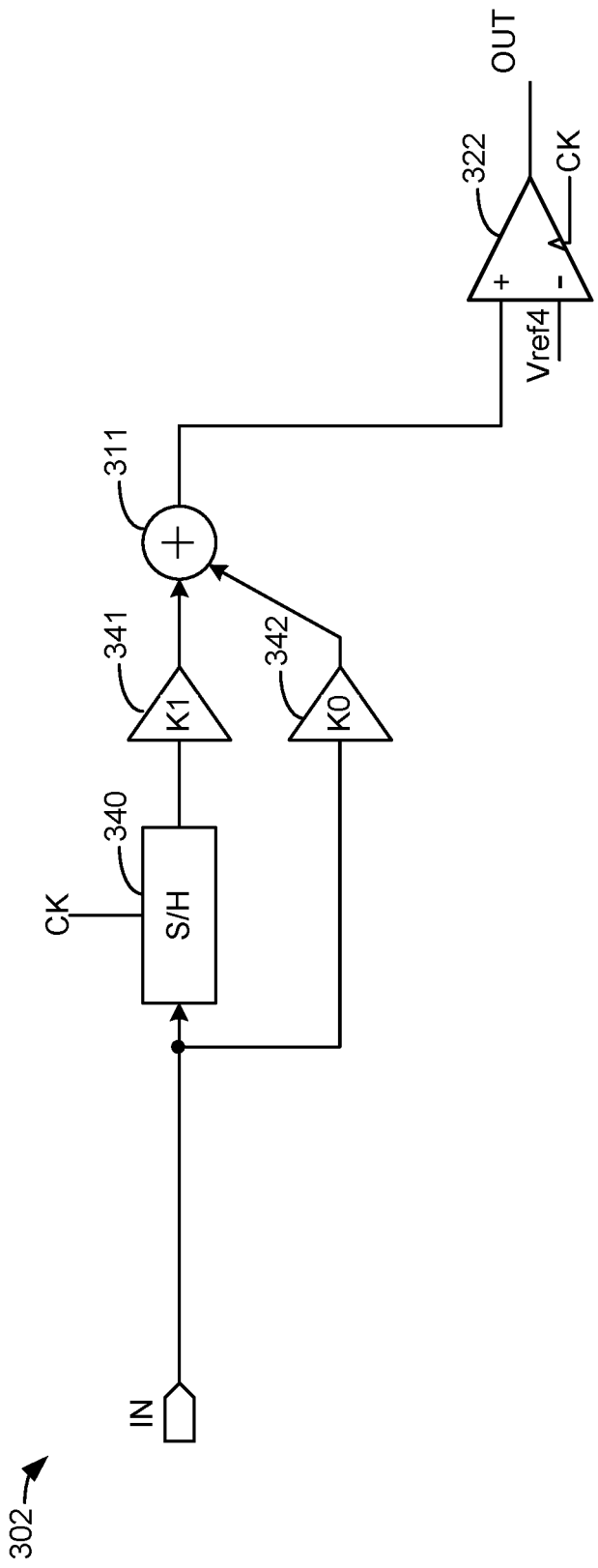
FIG. 3B illustrates a non-speculative DFE two-level pulse amplitude modulation (PAM-2) receiver with analog FFE.

FIG. 3B illustrates a non-speculative DFE two-level pulse amplitude modulation (PAM-2) receiver with analog FFE. Receiver 302 illustrated in FIG. 3B may correspond to one or more of receiver 150, receivers 214, and/or receivers 224. In an embodiment, receiver 302 may be configured to implement DFE tap values as described herein. In particular, receiver 302 may implement DFE tap values as given in one or more of Equation 1, Equation 2, Table 1, and/or Table 2.

Receiver 302 comprises analog summer 311, sample-and-hold (S/H) circuit 340, weighted buffer 341, weighted buffer 342, and sampler 322. Thus, it should be evident from FIG. 3B that receiver 302 is similar to receiver 300 but without sampler 321 and sampler 323. Also, receiver 302 has the inverting input of sampler 322 coupled to Vref4. In an embodiment, Vref4=Vref2=0V.

Figure 4A:
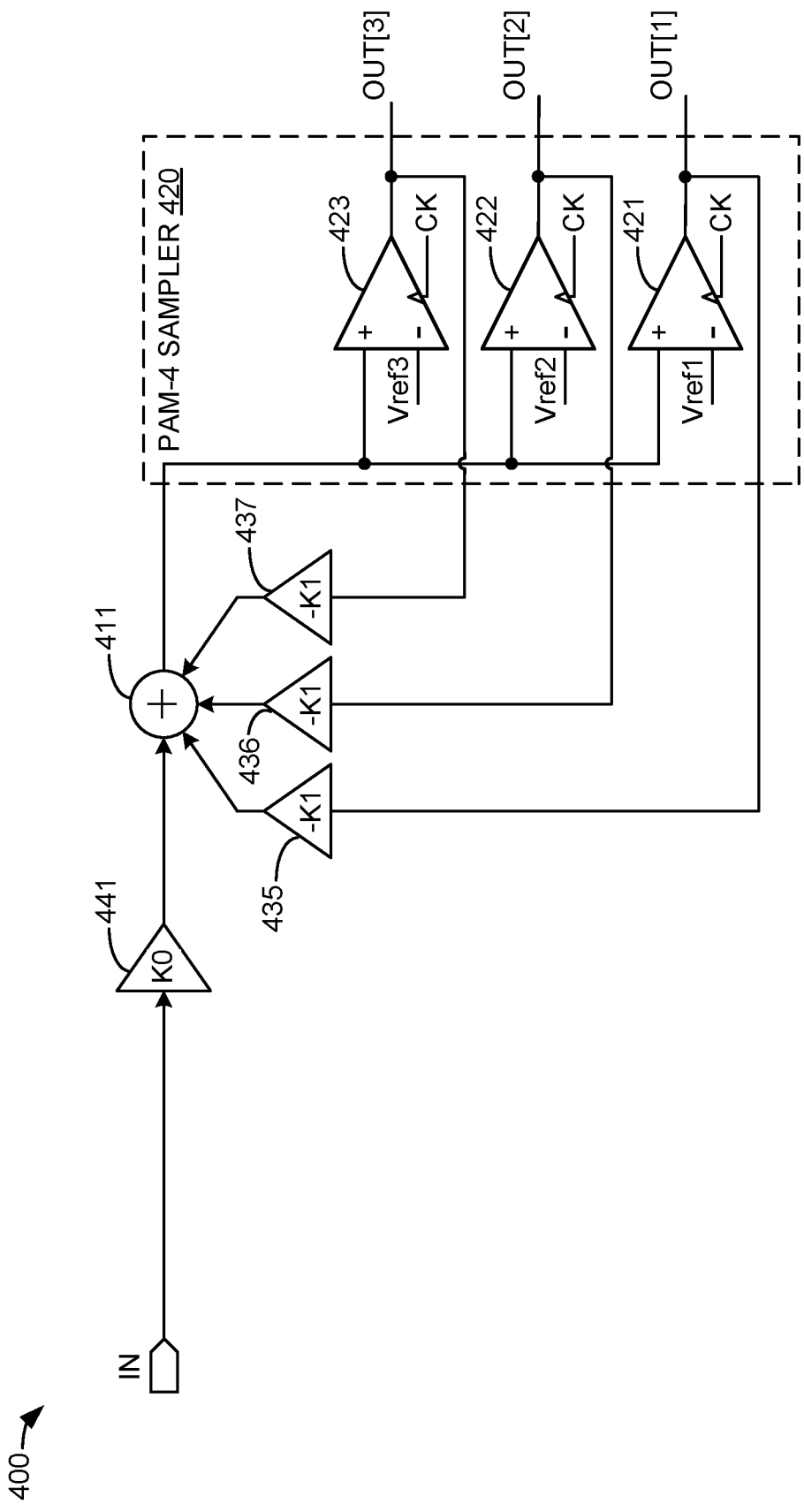
FIG. 4A illustrates a non-speculative DFE PAM-4 receiver with a combination receive FFE and first tap DFE loop.

FIG. 4A illustrates a non-speculative DFE PAM-4 receiver with a combination receive FFE and first tap DFE loop. Receiver 400, illustrated in FIG. 4A, may correspond to one or more of receiver 150, receivers 214, and/or receivers 224. In an embodiment, receiver 400 may be configured to implement DFE tap values as described herein. In particular, receiver 400 may implement DFE tap values as given in one or more of Equation 1, Equation 2, Table 1, and/or Table 2.

Receiver 400 comprises analog summer 411, weighted buffer 441, weighted buffer 435, weighted buffer 436, weighted buffer 437, and PAM-4 sampler 420. PAM-4 sampler 420 includes sampler 421, sampler 422, and sampler 423. Samplers 421-423 output digital signals that can be interpreted to be either +1 or −1. Weighted buffer 441 receives an analog signal that does not need interpretation.

An input signal (IN) is operatively coupled to the input to weighted buffer 441. Input signal (IN) may be received from, for example, interconnect system 140. Weighted buffer 441 outputs the analog voltage at the input to weighted buffer 441 multiplied by the factor K0. In an embodiment, K0=1+0.5$\alpha_1$, where $\alpha_1$ is adapted or selected to remove the first post-cursor ISI component. When $\alpha_1$ is dynamically adapted, it should be understood that K0 may be variable during an adaptation (i.e., training) period, but is typically constant during normal operation.

The outputs of weighted buffer 441, and weighted buffers 435-437 are input to analog summer 411. The output of analog summer 411 is input to PAM-4 sampler 420. The output of analog summer 411 is input to the non-inverting inputs of samplers 421-423. The inverting input of sampler 421 receives reference voltage Vref1. The inverting input of sampler 422 receives reference voltage Vref2. The inverting input of sampler 423 receives reference voltage Vref3. Reference voltages Vref1, Vref2, and Vref3 are typically selected to be between PAM-4 voltage levels. For example, if the four PAM-4 levels are −3V, −1V, +1V, and +3V, Vref1 may be selected to be −2V, Vref2=0V, and Vref3=+2V.

Samplers 421-423 each receive a timing reference CK. CK determines the timing that samplers 421-423 compare inputs (i.e., output of summer 411) to their respective reference voltage (e.g., Vref1, etc.) to produce their respective digital output signal. Weighted buffer 441, summer 411, PAM-4 sampler 420, and weighted buffers 435-437 form a combination ISI pre-filter and first DFE tap loop.

The voltage at the input of PAM-4 sampler 420 can be expressed by the Equations in Table 4. In Table 4, $v_m$ is the received voltage; m is the time index; $h_0$, $h_1$, $h_2$, etc. are the discrete-time voltage values of the channel (e.g., interconnect system 140) single-bit response; and $a_m$ is the $m^{th}$ transmitted symbol. Note that the equations in Table 4 are written for a sample single-tap (i.e. $h_0$ is main tap and $h_1$ is the first post-cursor) channel.

TABLE 4

| |
|---|
| define $\Delta = 0.5(a_{m-1} - a_m)$ |
| $v_m = a_m h_0 + \Delta h_1$ |
| sampler input: $v_m - 0.5(a_{m-1}h_0 - v_m)\alpha_1$ |
| sampler input: $a_m h_0 + \Delta(h_1 - h_0\alpha_1) + 0.5\Delta h_1 \alpha_1$ (during adaptation) |
| sampler input: $a_m h_0 + 0.5\Delta\alpha_1 h_1$ (steady state as $\alpha_1 \to {}^{h_1}/_{h_0}$) |

Figure 4B:
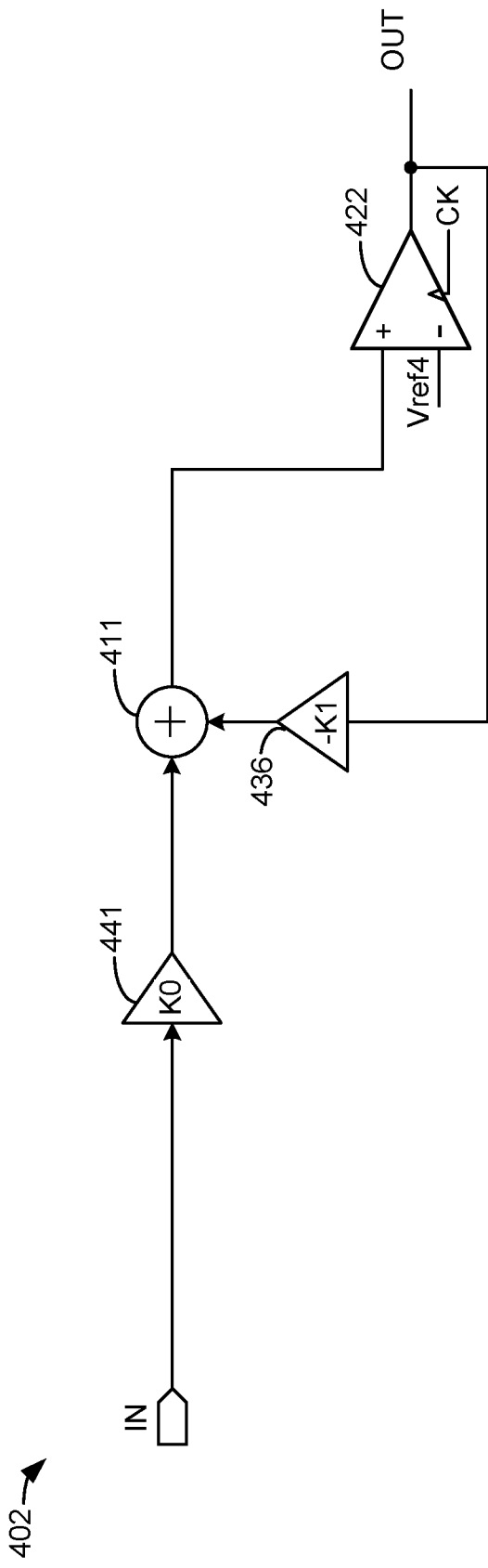
FIG. 4B illustrates a non-speculative DFE PAM-2 receiver with a combination receive FFE and first tap DFE loop.

FIG. 4B illustrates a non-speculative DFE PAM-2 receiver with a combination receive FFE and first tap DFE loop. Receiver 402 illustrated in FIG. 4B may correspond to one or more of receiver 150, receivers 214, and/or receivers 224. In an embodiment, receiver 402 may be configured to implement DFE tap values as described herein. In particular, receiver 402 may implement DFE tap values as given in one or more of Equation 1, Equation 2, Table 1, and/or Table 2.

Receiver 402 comprises analog summer 411, weighted buffer 441, weighted buffer 436, and sampler 422. Thus, it should be evident from FIG. 4B that receiver 402 is similar to receiver 400 but without sampler 421, sampler 423, weighted buffer 435, and weighted buffer 437. Also, receiver 402 has the inverting input of sampler 322 coupled to Vref4. In an embodiment, Vref4=Vref2=0V.

Figure 5:
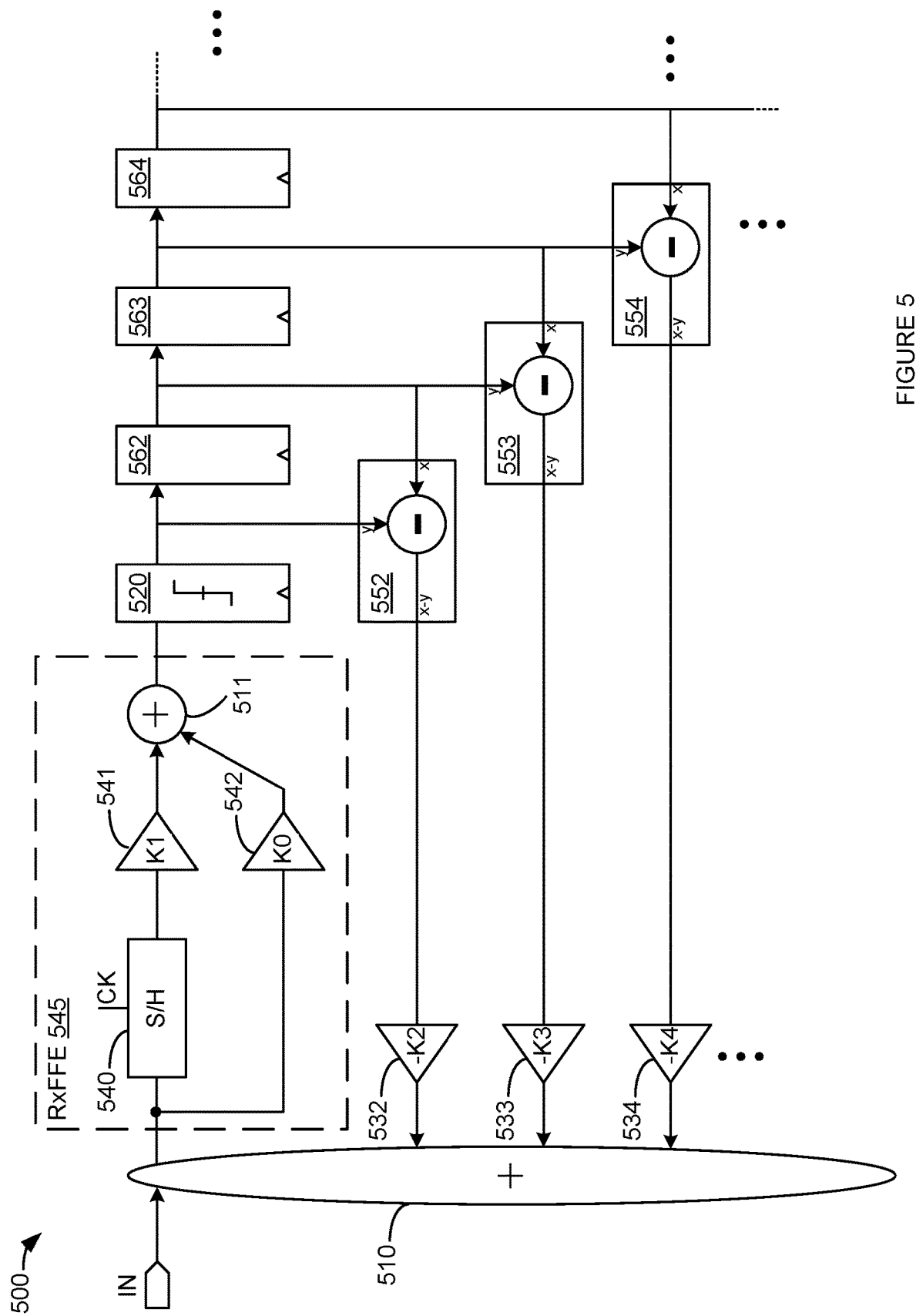
FIG. 5 illustrates a non-speculative DFE receiver with analog FFE and higher order DFE taps.

FIG. 5 illustrates a non-speculative DFE receiver with analog FFE and higher order DFE taps. Receiver 500 illustrated in FIG. 5 may correspond to one or more of receiver 150, receivers 214, and/or receivers 224. In an embodiment, receiver 500 may be configured to implement DFE tap values as described herein. In particular, receiver 500 may implement DFE tap values as given in one or more of Equation 1, Equation 2, Table 1, and/or Table 2.

Receiver 500 comprises analog summer 510, receiver feed-forward equalizer (RxFFE) 545, sampler 520, weighted buffer 532, weighted buffer 533, weighted buffer 534, tap logic 552, tap logic 553, tap logic 554, register 562, register 563, and register 564. In an embodiment, sampler 520 is a PAM-4 sampler (e.g., similar to, or the same as, PAM-4 sampler 320 or 420) and outputs a plurality of decision bits accordingly. In another embodiment, sampler 520 is a PAM-2 sampler that outputs a single decision bit (e.g., similar to, or the same as, sampler 322 or sampler 422.) RxFFE 545 includes sample-and-hold (S/H) circuit 540, weighted buffer 541, weighted buffer 542, and analog summer 511.

An input signal (IN) is operatively coupled to an input of summer 510. Input signal (IN) may be received from, for example, interconnect system 140. The output of summer 510 is input to sample-and-hold circuit 540 and weighted buffer 542. Weighted buffer 542 outputs the analog voltage at the input to weighted buffer 542 multiplied by the factor K0. In an embodiment, $K0=1+0.5\alpha_1$, where $\alpha_1$ is adapted or selected to remove the first post-cursor ISI component. When $\alpha_1$ is dynamically adapted, it should be understood that K0 may be variable during an adaptation (i.e., training) period, but is typically constant during normal operation.

The output of S/H 540 is input to weighted buffer 541. Weighted buffer 541 outputs the analog voltage at the input to weighted buffer 541 multiplied by the factor K1. In an embodiment, $K1=-0.5\alpha_1$. Similar to K0, it should be understood that K1 may be variable during an adaptation (i.e., training) period, but is typically constant during normal operation.

The outputs of weighted buffer 541 and weighted buffer 542 are input to analog summer 511. The output of analog summer 511 is input to sampler 520. Sampler 520 and each of registers 562-564 receive a timing reference (not shown in FIG. 5.) This timing reference (e.g., CK of FIGS. 3A and 3B) determines the timing that sampler 520 compares its input (i.e., output of summer 511) to reference (or threshold) voltage(s) to produce respective digital output signal(s). The timing reference also determines when each register latches and propagates the value on its input to its output. Register 562 receives the output of sampler 520. Registers 563-564 each serially receive the output of the previous register 562-564, respectively, thereby forming a serial shift register that, for each successive stage, holds previous values sampled by sampler 520.

The output of sampler 520 is also input to tap logic 552. Tap logic 552 subtracts the output of sampler 520 from the output of register 562. The output of tap logic 552 is input to weighted buffer 532. Weighted buffer 532 outputs the analog voltage at the input to weighted buffer 532 multiplied by the factor -K2. In an embodiment, $K2=0.5\alpha_2$. The output of weighted buffer 532 is input to summer 510 thereby completing the second DFE tap loop. The output of register 562 is also input to tap logic 553. Tap logic 553 subtracts the output of register 562 from the output of register 563. The output of tap logic 553 is input to weighted buffer 533.

Weighted buffer 533 outputs the analog voltage at the input to weighted buffer 533 multiplied by the factor -K3. In an embodiment, $K3=0.5\alpha_3$. The output of weighted buffer 533 is input to summer 510 thereby completing the third DFE tap loop. The output of register 563 is also input to tap logic 554. Tap logic 554 subtracts the output of register 563 from the output of register 564. The output of tap logic 554 is input to weighted buffer 534. Weighted buffer 534 outputs the analog voltage at the input to weighted buffer 534 multiplied by the factor -K4. In an embodiment, $K4=0.5\alpha_4$. The output of weighted buffer 534 is input to summer 510 thereby completing the fourth DFE tap loop. Additional higher order DFE tap loops can be formed in a similar manner.

Figure 6:
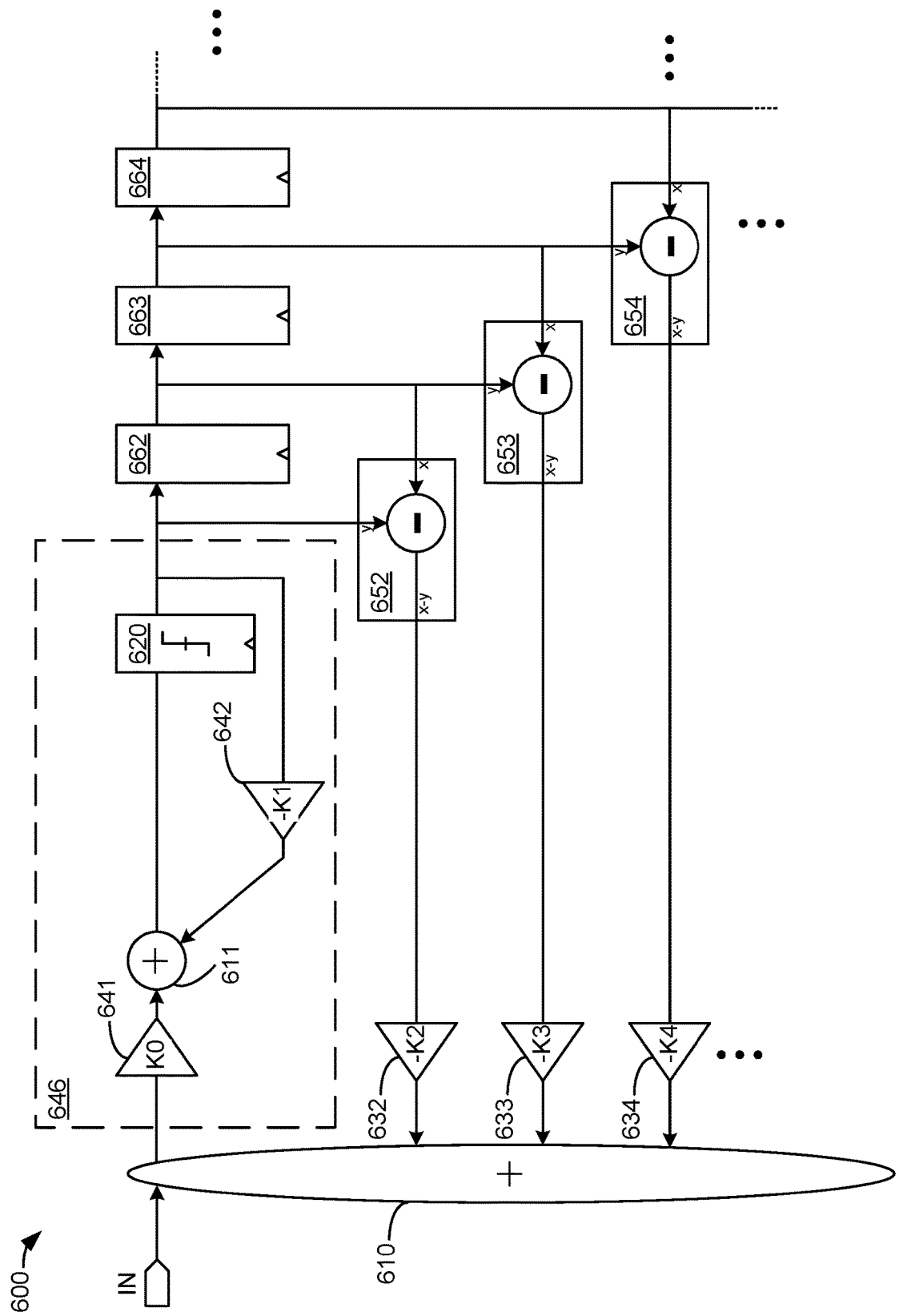
FIG. 6 illustrates a non-speculative DFE receiver with receive FFE and higher order DFE taps.

FIG. 6 illustrates a non-speculative DFE receiver with receive FFE and higher order DFE taps. Receiver 600 illustrated in FIG. 6 may correspond to one or more of receiver 150, receivers 214, and/or receivers 224. In an embodiment, receiver 600 may be configured to implement DFE tap values as described herein. In particular, receiver 600 may implement DFE tap values as given in one or more of Equation 1, Equation 2, Table 1, and/or Table 2.

Receiver 600 comprises analog summer 610, ISI pre-filter/1$^{st}$ DFE tap 646, weighted buffer 632, weighted buffer 633, weighted buffer 634, tap logic 652, tap logic 653, tap logic 654, register 662, register 663, and register 664. ISI pre-filter/1$^{st}$ DFE tap 646 includes weighted buffer 641, weighted buffer 642, analog summer 611, and sampler 620. In an embodiment, sampler 620 is a PAM-4 sampler (e.g., similar to, or the same as, PAM-4 sampler 320 or 420) and outputs a plurality of decision bits accordingly. In another embodiment, sampler 620 is a PAM-2 sampler that outputs a single decision bit (e.g., similar to, or the same as, sampler 322 or sampler 422.)

An input signal (IN) is operatively coupled to an input to summer 610. Input signal (IN) may be received from, for example, interconnect system 140. The output of summer 610 is input to ISI pre-filter/1$^{st}$ DFE tap 646. In particular, the output of summer 610 is input to weighted buffer 641. Weighted buffer 641 outputs the analog voltage at the input to weighted buffer 641 multiplied by the factor K0. In an embodiment, $K0=1+0.5\alpha_1$, where $\alpha_1$ is adapted or selected to remove the first post-cursor ISI component. When $\alpha_1$ is dynamically adapted, it should be understood that K0 may be variable during an adaptation (i.e., training) period, but is typically constant during normal operation.

The outputs of weighted buffer 641 and weighted buffer 642 are input to analog summer 611. The output of analog summer 611 is input to sampler 620. The output of sampler 620 is input to weighted buffer 642. Weighted buffer 642 outputs the analog voltage at the input to weighted buffer 642 multiplied by the factor -K1. In an embodiment, $K1=0.5\alpha_1$. Similar to K0, it should be understood that K1 may be variable during an adaptation (i.e., training) period, but is typically constant during normal operation.

Sampler 620 and each of registers 662-664 receive a timing reference (not shown in FIG. 6.) This timing reference (e.g., CK of FIGS. 3A and 3B) determines the timing that sampler 620 compares its input (i.e., output of summer 611) to reference (or threshold) voltage(s) to produce respective digital output signal(s). Register 662 receives the output of sampler 620. Registers 663-664 each serially receive the output of the previous register 662-664, respectively, thereby forming a serial shift register that, for each successive stage, holds previous values sampled by sampler 620.

The output of sampler 620 is also input to tap logic 652. Tap logic 652 subtracts the output of sampler 620 from the output of register 662. The output of tap logic 652 is input to weighted buffer 632. Weighted buffer 632 outputs the analog voltage at the input to weighted buffer 632 multiplied by the factor −K2. In an embodiment, K2=0.5$\alpha_2$. The output of weighted buffer 633 is input to summer 610 thereby completing the second DFE tap loop. The output of register 662 is also input to tap logic 653. Tap logic 653 subtracts the output of register 662 from the output of register 663. The output of tap logic 653 is input to weighted buffer 633. Weighted buffer 633 outputs the analog voltage at the input to weighted buffer 633 multiplied by the factor −K3. In an embodiment, K3=0.5$\alpha_3$. The output of weighted buffer 633 is input to summer 610 thereby completing the third DFE tap loop. The output of register 663 is also input to tap logic 654. Tap logic 654 subtracts the output of register 663 from the output of register 664. The output of tap logic 654 is input to weighted buffer 634. Weighted buffer 634 outputs the analog voltage at the input to weighted buffer 634 multiplied by the factor −K4. In an embodiment, K4=0.5$\alpha_4$. The output of weighted buffer 634 is input to summer 610 thereby completing the fourth DFE tap loop. Additional higher order DFE tap loops can be formed in a similar manner.

Figure 7:
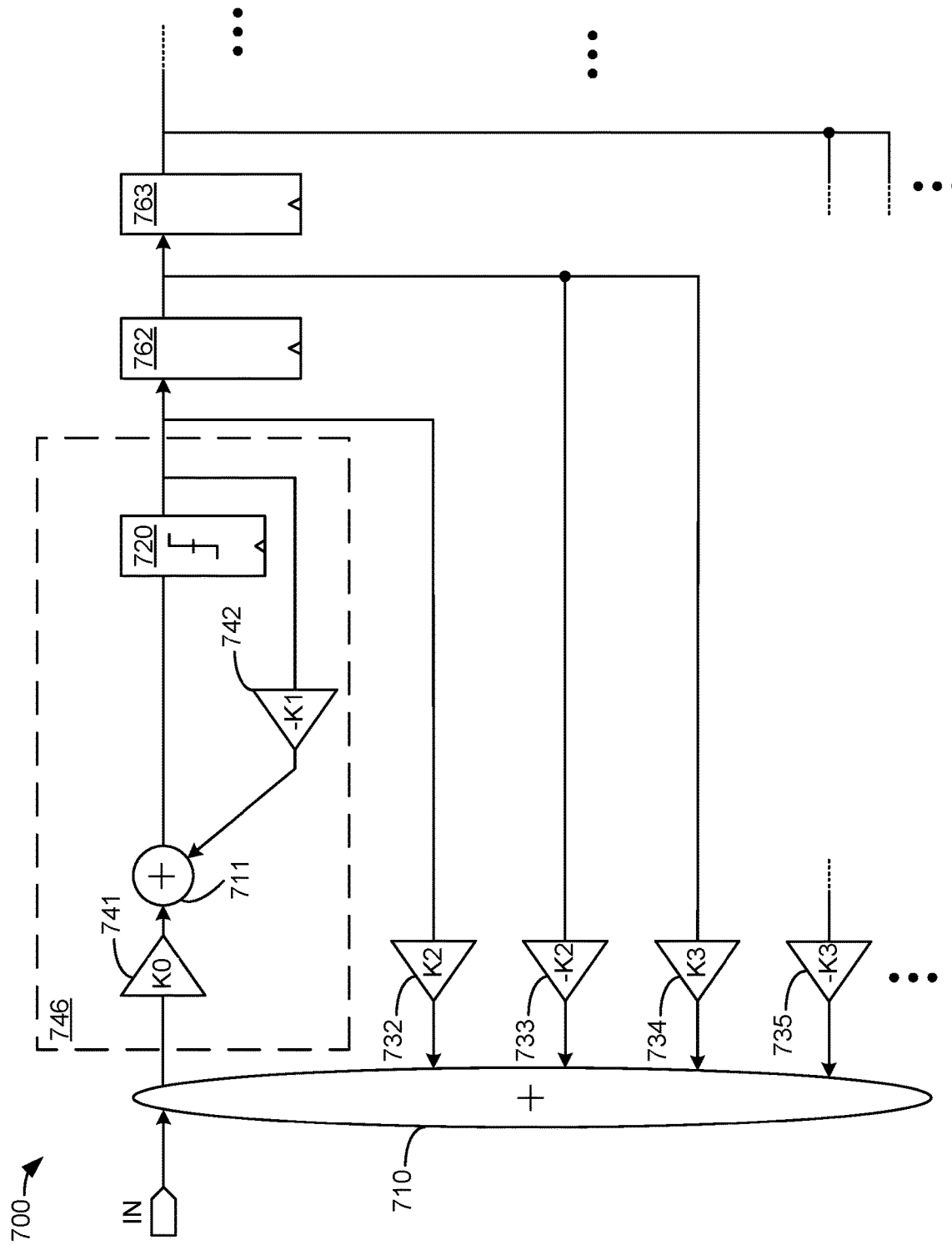
FIG. 7 illustrates a non-speculative DFE receiver with low-latency DFE tap feedback.

FIG. 7 illustrates a non-speculative DFE receiver with low-latency DFE tap feedback. Receiver 700 illustrated in FIG. 7 may correspond to one or more of receiver 150, receivers 214, and/or receivers 224. In an embodiment, receiver 700 may be configured to implement DFE tap values as described herein. In particular, receiver 700 may implement DFE tap values as given in one or more of Equation 1, Equation 2, Table 1, and/or Table 2.

Receiver 700 comprises analog summer 710, ISI pre-filter/$1^{st}$ DFE tap 746, weighted buffer 732, weighted buffer 733, weighted buffer 734, weighted buffer 735, register 762, and register 763. ISI pre-filter/$1^{st}$ DFE tap 746 includes weighted buffer 741, weighted buffer 742, analog summer 711, and sampler 720. In an embodiment, sampler 720 is a PAM-4 sampler (e.g., similar to, or the same as, PAM-4 sampler 320 or 420) and outputs a plurality of decision bits accordingly. In another embodiment, sampler 720 is a PAM-2 sampler that outputs a single decision bit (e.g., similar to, or the same as, sampler 322 or sampler 422.)

An input signal (IN) is operatively coupled to an input of summer 710. Input signal (IN) may be received from, for example, interconnect system 140. The output of summer 710 is input to ISI pre-filter/$1^{st}$ DFE tap 746. In particular, the output of summer 710 is input to weighted buffer 741. Weighted buffer 741 outputs the analog voltage at the input to weighted buffer 741 multiplied by the factor K0. In an embodiment, K0=1+0.5$\alpha_1$, where $\alpha_1$ is adapted or selected to remove the first post-cursor ISI component. When $\alpha_1$ is dynamically adapted, it should be understood that K0 may be variable during an adaptation (i.e., training) period, but is typically constant during normal operation.

The outputs of weighted buffer 741 and weighted buffer 742 are input to analog summer 711. The output of analog summer 711 is input to sampler 720. The output of sampler 720 is input to weighted buffer 742. In an embodiment, K1=0.5$\alpha_1$. Similar to K0, it should be understood that K1 may be variable during an adaptation (i.e., training) period, but is typically constant during normal operation.

Sampler 720 and each of registers 762-764 receive a timing reference (not shown in FIG. 7.) This timing reference (e.g., CK of FIGS. 3A and 3B) determines the timing that sampler 720 compares its input (i.e., output of summer 711) to reference (or threshold) voltage(s) to produce respective digital output signal(s). Register 762 receives the output of sampler 720. Registers 763 etc. each serially receive the output of the previous register 762-763, respectively thereby forming a serial shift register that, for each successive stage, holds previous values sampled by sampler 720.

The output of sampler 720 is also input to weighted buffer 732. Weighted buffer 732 outputs the analog voltage at the input to weighted buffer 732 multiplied by the factor +K2. The output of register 762 is input to weighted buffer 733. Weighted buffer 733 outputs the analog voltage at the input to weighted buffer 733 multiplied by the factor −K2. In an embodiment, K2=0.5$\alpha_2$. The output of weighted buffer 732 and the output of weighted buffer 732 are input to summer 710 thereby completing the second DFE tap loop. The output of register 762 is also input to weighted buffer 734. Weighted buffer 734 outputs the analog voltage at the input to weighted buffer 734 multiplied by the factor +K3. The output of weighted buffer 734 and the output of weighted buffer 735 (which receives the output of register 763—not shown in FIG. 7) are input to summer 710 thereby completing the third DFE tap loop. Additional higher order DFE tap loops can be formed in a similar manner.

Figure 8:
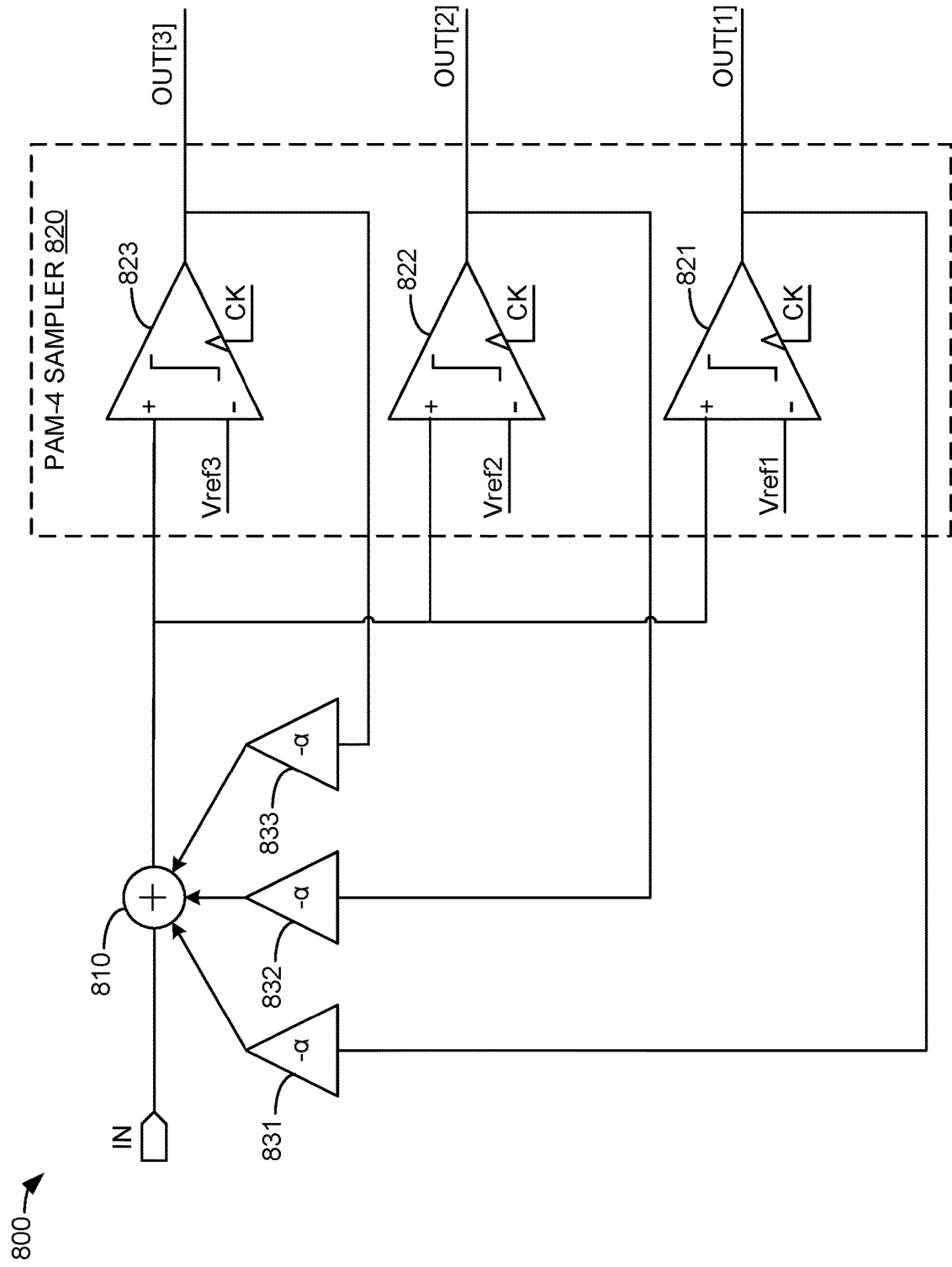
FIG. 8 illustrates a PAM-4 receiver with low-latency DFE feedback.

FIG. 8 illustrates a PAM-4 receiver with low-latency DFE feedback. Receiver 800, illustrated in FIG. 8, may correspond to one or more of receiver 150, receivers 214, and/or receivers 224. In an embodiment, receiver 800 may be configured to implement DFE tap values as described herein. In particular, receiver 800 may implement DFE tap values as given in one or more of Equation 1, Equation 2, Table 1, and/or Table 2.

Receiver 800 comprises analog summer 810, sampler 821, sampler 822, sampler 823, weighted buffer 831, weighted buffer 832, and weighted buffer 833. Weighted buffers 831-833 receive digital signals that are interpreted to be +1 or −1. Weighted buffers 831-833 apply (e.g., multiply) a weighting factor (−$\alpha$) to the input value and output an analog voltage corresponding to the weighted input signal. For example, when weighted buffer 831 receives a logical "0" (which is interpreted to mean −1), weighted buffer 831 applies the weighting factor of −$\alpha$ and output an analog signal corresponding to −1×−$\alpha$=$\alpha$ volts. When weighted buffer 831 receives a logical "1" (which is interpreted to mean +1), weighted buffer 831 applies the weighting factor of −$\alpha$ and output an analog signal corresponding to +1×−$\alpha$=−$\alpha$ volts.

An input signal (IN) is operatively coupled to an input to summer 810. Input signal (IN) may be received from, for example, interconnect system 140. The output of summer 810 is input to PAM-4 sampler 820. The output of analog summer 810 is input to the non-inverting inputs of samplers 821-823. The inverting input of sampler 821 receives reference voltage Vref1. The inverting input of sampler 822 receives reference voltage Vref2. The inverting input of sampler 823 receives reference voltage Vref3. Reference voltages Vref1, Vref2, and Vref3 are typically selected to be between PAM-4 voltage levels. For example, if the four PAM-4 levels are −3V, −1V, +1V, and +3V, Vref1 may be selected to be −2V, Vref2=0V, and Vref3=+2V.

Samplers 821-823 each receive a timing reference CK. CK determines the timing that samplers 821-823 compare inputs (i.e., output of summer 811) to their respective reference voltage (e.g., Vref1, etc.) to produce their respective digital output signal. The output of sampler 821 is input to weighted buffer 831. The output of sampler 822 is input to weighted buffer 832. The output of sampler 823 is input to weighted buffer 833. Weighted buffers 831-833 each apply (e.g., multiply) the same weighting factor (i.e., −$\alpha$) to their respective input value and output a respective analog voltage corresponding to the weighted input signal. Note that when Vref3>Vref2>Vref1, the outputs OUT[1:3] of PAM-4 sampler 820 are encoded as a 3-bit thermometer code. This 3-bit thermometer code is not decoded before being applied to the inputs of weighted buffers 831-833. This lack of decoding logic helps lower the latency from the CK timing reference that causes samplers 821-823 to sample to the application of the DFE tap value to summer 810.

Figure 9:
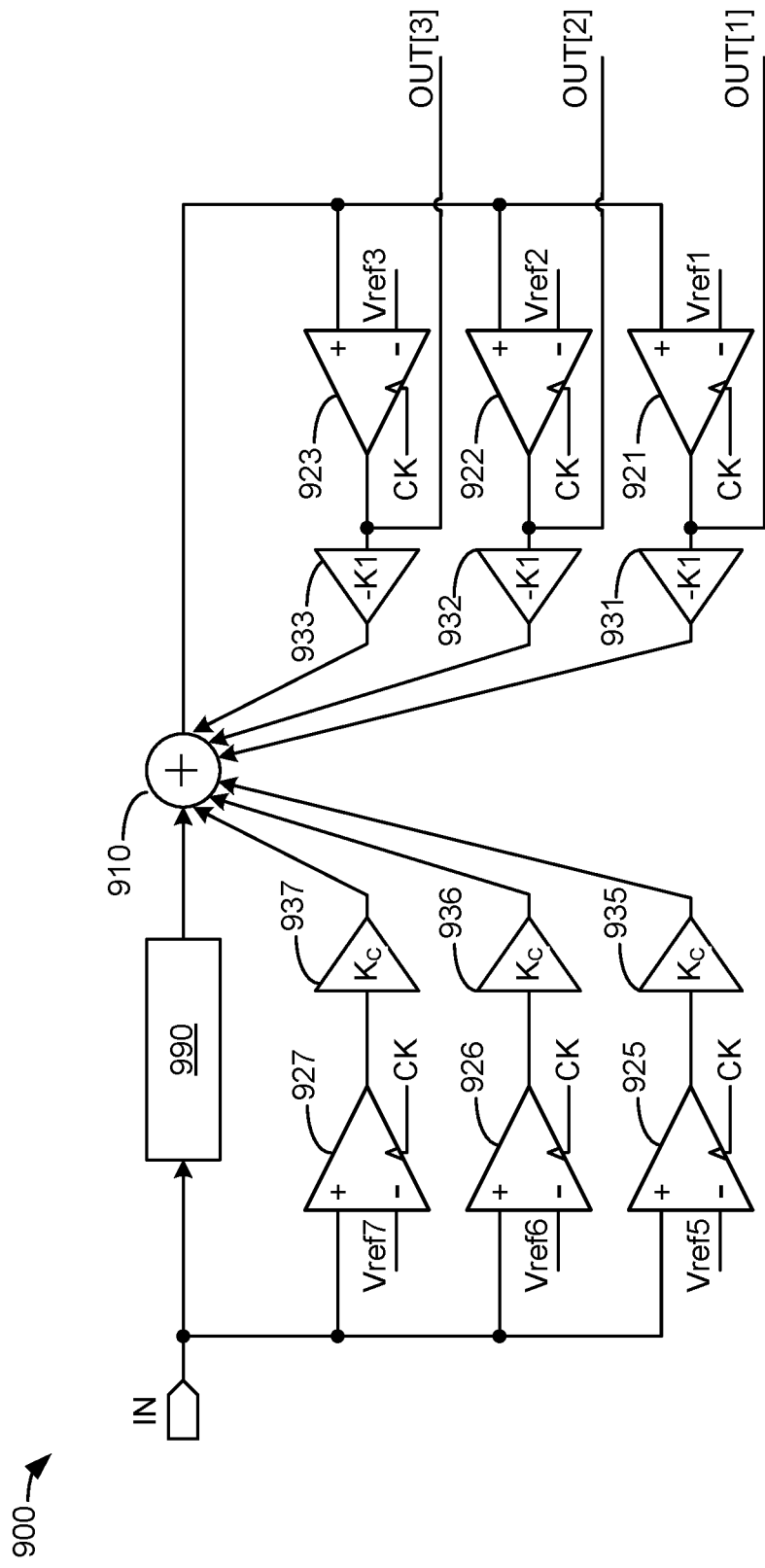
FIG. 9 illustrates a PAM-4 receiver with DFE feedback.

FIG. 9 illustrates a PAM-4 receiver with DFE feedback. Receiver 900 illustrated in FIG. 9 may correspond to one or more of receiver 150, receivers 214, and/or receivers 224. In an embodiment, receiver 900 may be configured to implement DFE tap values as described herein. In particular, receiver 900 may implement DFE tap values as given in one or more of Equation 1, Equation 2, Table 1, and/or Table 2.

Receiver 900 comprises analog summer 910, sampler 921, sampler 922, sampler 923, sampler 924, sampler 925, sampler 926, weighted buffer 931, weighted buffer 932, weighted buffer 933, weighted buffer 935, weighted buffer 936, weighted buffer 937, and sample-and-hold (S/H) 990.

An input signal (IN) is operatively coupled to the input to S/H 990 and the non-inverting inputs of samplers 925-927. Input signal (IN) may be received from, for example, interconnect system 140. The output of S/H 990 is input to summer 910. The output of analog summer 910 is input to the non-inverting inputs of samplers 921-923. The inverting input of sampler 921 receives reference voltage Vref1. The inverting input of sampler 922 receives reference voltage Vref2. The inverting input of sampler 923 receives reference voltage Vref3. The inverting input of sampler 925 receives reference voltage Vref5. The inverting input of sampler 926 receives reference voltage Vref6. The inverting input of sampler 923 receives reference voltage Vref7. Reference voltages Vref1, Vref2, Vref3, Vref5, Vref6, and Vref7 are typically selected to be between PAM-4 voltage levels. For example, if the four PAM-4 levels are −3V, −1V, +1V, and +3V, Vref1 and Vref5 may be selected to be −2V, Vref2=Vref6=0V, and Vref3=Vref7=+2V.

Samplers 921-923 and 925-927 each receive a timing reference CK. CK determines the timing that samplers 921-923 and 925-927 compare inputs (i.e., the input voltage and the output of summer 910) to their respective reference voltage (e.g., Vref1, etc.) to produce their respective digital output signal. The output of sampler 921 is input to weighted buffer 931. The output of sampler 922 is input to weighted buffer 932. The output of sampler 923 is input to weighted buffer 933. The output of sampler 925 is input to weighted buffer 935. The output of sampler 926 is input to weighted buffer 936. The output of sampler 927 is input to weighted buffer 937. Weighted buffers 931-933 each apply (e.g., multiply) the same weighting factor (i.e., −K1) to their respective input value and output a respective analog voltage corresponding to the weighted input signal. In FIG. 9, weighted buffers 935-937 each apply (e.g., multiply) the same weighting factor (i.e., +$K_C$) to their respective input value and output a respective analog voltage corresponding to the weighted input signal. However, it should be understood that in some embodiments weighted buffers 935-937 apply (e.g., multiply) different weighting factors from each other. In addition, in an embodiment, $K_C$=K1. In another embodiment, $K_C$≠K1.

The voltage at the inputs of samplers 931-933 can be expressed by the Equations in Table 5. In Table 5, $v_m$ is the received voltage; m is the time index; $h_0$, $h_1$, $h_2$, etc. are the discrete-time voltage values of the channel (e.g., interconnect system 140) single-bit response; and $a_m$ is the $m^{th}$ transmitted symbol.

TABLE 5

| |
|---|
| define $\Delta = 0.5(a_{m-1} - a_m)$ |
| $v_m = a_m h_0 + \Delta h_1$ |
| sampler input: $v_m - 0.5(a_{m-1}h_0 - a_m h_0)\alpha_1$ |
| sampler input: $a_m h_0 + \Delta(h_1 - h_0 \alpha_1)$ (during adaptation) |
| sampler input: $a_m h_0$ (steady state as $\alpha_1 \to {}^{h_1}/_{h_0}$) |

Figure 10:
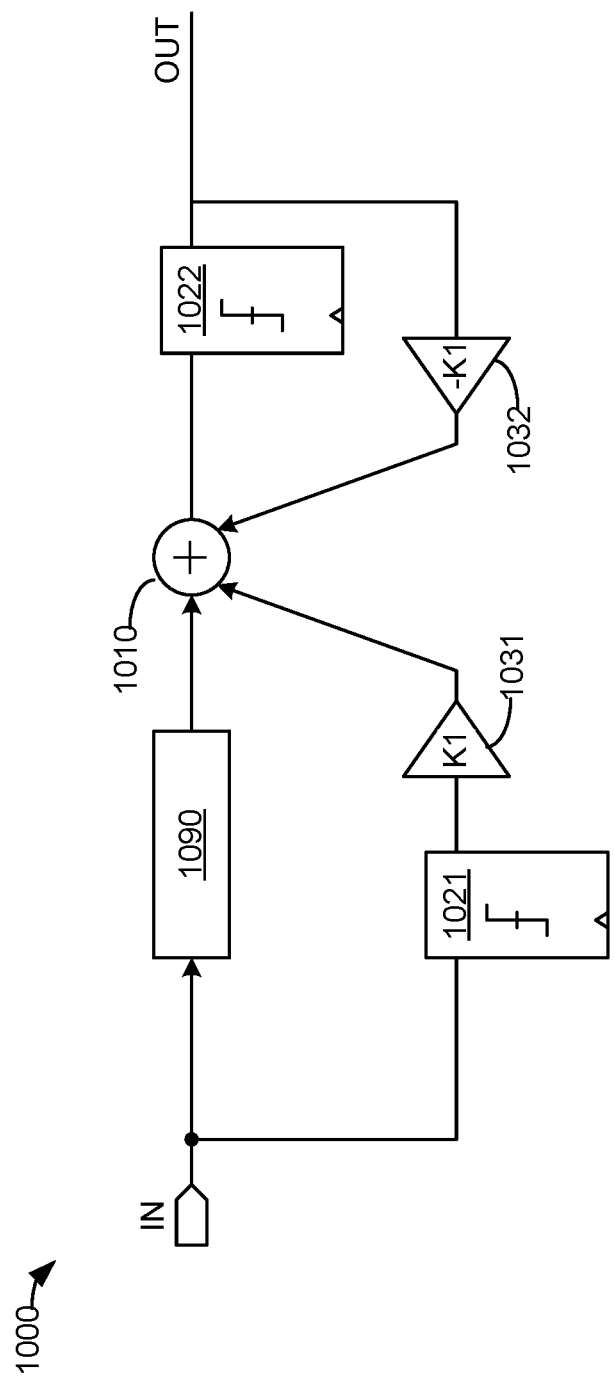
FIG. 10 illustrates a receiver with DFE feedback.

FIG. 10 illustrates a receiver with DFE feedback. Receiver 1000 illustrated in FIG. 10 may correspond to one or more of receiver 150, receivers 214, and/or receivers 224. Receiver 1000 comprises analog summer 1010, sampler 1021, sampler 1022, weighted buffer 1031, weighted buffer 1032, and sample-and-hold (S/H) 1090. In an embodiment, samplers 1021-1022 may be PAM-2 samplers. In another embodiment, samplers 1021-1022 may be PAM-4 samplers.

An input signal (IN) is operatively coupled to the input to S/H 1090 and the input of sampler 1021. Input signal (IN) may be received from, for example, interconnect system 140. The output of S/H 1090 is input to summer 1010. The output of analog summer 1010 is input to sampler 1022.

Samplers 1021-1023 and 1025-1027 each receive a timing reference (not shown in FIG. 10.) The output of sampler 1021 is input to weighted buffer 1031. The output of sampler 1022 is input to weighted buffer 1032. The output of sampler 1022 is the output of receiver 1000 OUT. Weighted buffer 1031 applies (e.g., multiplies) a first weighting factor (i.e., +K) to its respective input value and outputs a respective analog voltage corresponding to the weighted input signal. Weighted buffer 1022 applies (e.g., multiplies) a second weighting factor (i.e., −K) to its respective input value and outputs a respective analog voltage corresponding to the weighted input signal.

Figure 11:
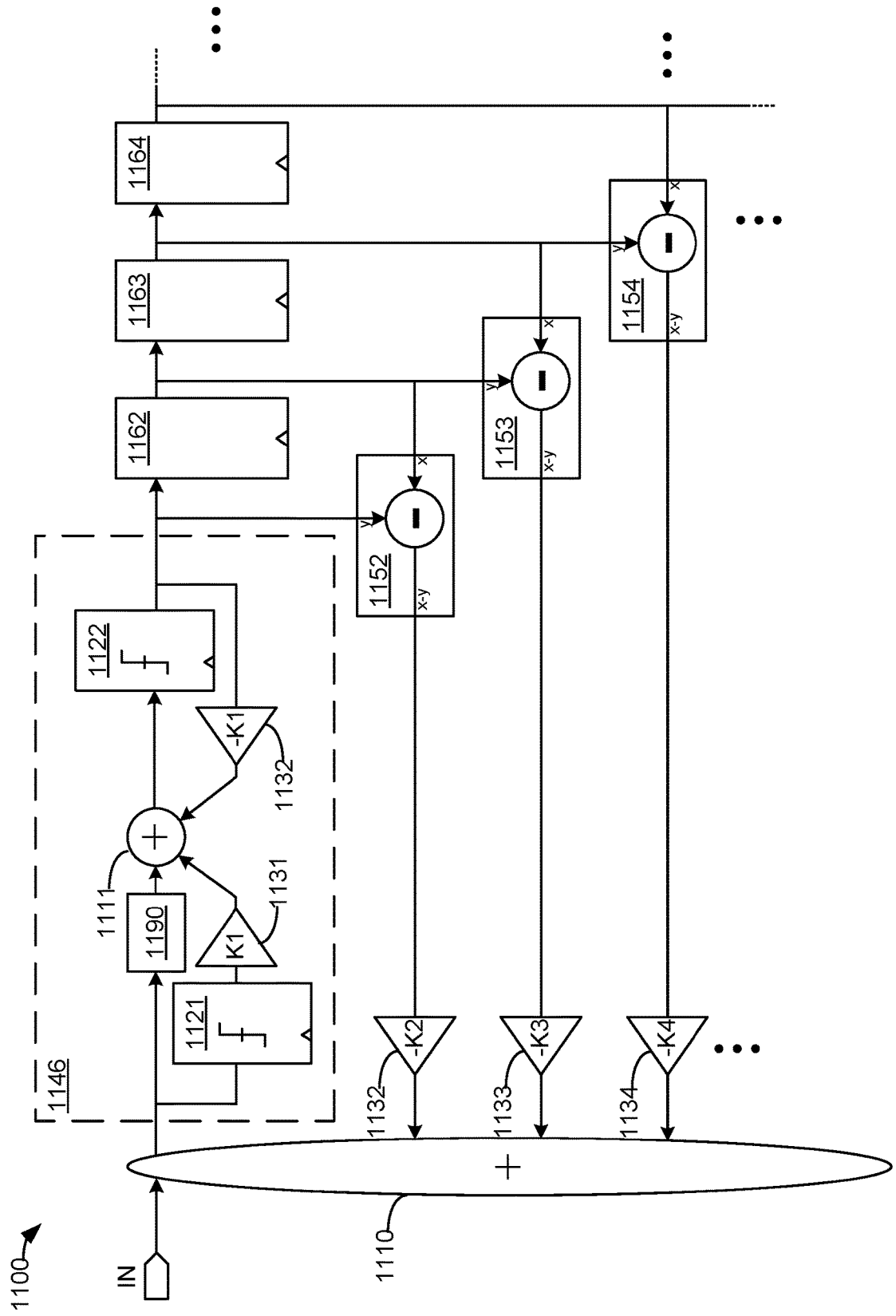
FIG. 11 illustrates a receiver with higher order DFE feedback.

FIG. 11 illustrates a receiver with higher order DFE feedback. Receiver 1100 illustrated in FIG. 11 may correspond to one or more of receiver 150, receivers 214, and/or receivers 224. Receiver 1100 comprises analog summer 1110, $1^{st}$ DFE tap 1146, weighted buffer 1132, weighted buffer 1133, weighted buffer 1134, tap logic 1152, tap logic 1153, tap logic 1154, register 1162, register 1163, and register 1164. $1^{st}$ DFE tap 1146 includes analog summer 1111, sampler 1121, sampler 1122, weighted buffer 1131, weighted buffer 1132, and sample-and-hold (S/H) 1190. In an embodiment, sampler 1120 is a PAM-4 sampler (e.g., similar to, or the same as, PAM-4 sampler 320 or 420) and outputs a plurality of decision bits accordingly. In another embodiment, sampler 1120 is a PAM-2 sampler that outputs a single decision bit (e.g., similar to, or the same as, sampler 322 or sampler 422.)

An input signal (IN) is operatively coupled to an input to summer 1110. Input signal (IN) may be received from, for example, interconnect system 140. The output of summer 1110 is input to $1^{st}$ DFE tap 1146. In particular, the output of summer 1110 is input to S/H 1190 and sampler 1121.

The outputs of weighted buffer 1131 and weighted buffer 1132 are input to analog summer 1111. The output of analog summer 1111 is input to sampler 1122. The output of sampler 1122 is input to tap logic 1152.

Sampler 1122, sampler 1121, and each of registers 1162-1164 receive a timing reference (not shown in FIG. 11.) This timing reference (e.g., CK of FIGS. 3A and 3B) determines the timing that sampler 1122 compares its input (i.e., output of summer 1111) to reference (or threshold) voltage(s) to produce respective digital output signal(s). Registers 1163-1164 each serially receive the output of the previous register 1162-1163, respectively, thereby forming a serial shift register that, for each successive stage, holds previous values sampled by sampler 1122.

The output of sampler 1122 is also input to tap logic 1152. Tap logic 1152 subtracts the output of register 1162 from the output of sampler 1122. The output of tap logic 1152 is input to weighted buffer 1132. Weighted buffer 1132 outputs the analog voltage at the input to weighted buffer 1132 multiplied by the factor −K2. In an embodiment, K2=$0.5\alpha_2$. The output of weighted buffer 1132 is input to summer 1110 thereby completing the second DFE tap loop. The output of register 1162 is also input to tap logic 1153. Tap logic 1153 subtracts the output of register 1163 from the output of register 1162. The output of tap logic 1153 is input to weighted buffer 1133. Weighted buffer 1133 outputs the analog voltage at the input to weighted buffer 1133 multiplied by the factor −K3. In an embodiment, K3=$0.5\alpha_3$. The output of weighted buffer 1133 is input to summer 1110 thereby completing the third DFE tap loop. The output of register 1163 is also input to tap logic 1154. Tap logic 1154 subtracts the output of register 1164 from the output of register 1163. The output of tap logic 1154 is input to weighted buffer 1134. Weighted buffer 1134 outputs the analog voltage at the input to weighted buffer 1132 multiplied by the factor −K4. In an embodiment, K4=$0.5\alpha_4$. The output of weighted buffer 1134 is input to summer 1110 thereby completing the fourth DFE tap loop. Additional higher order DFE tap loops can be formed in a similar manner.

Figure 12:
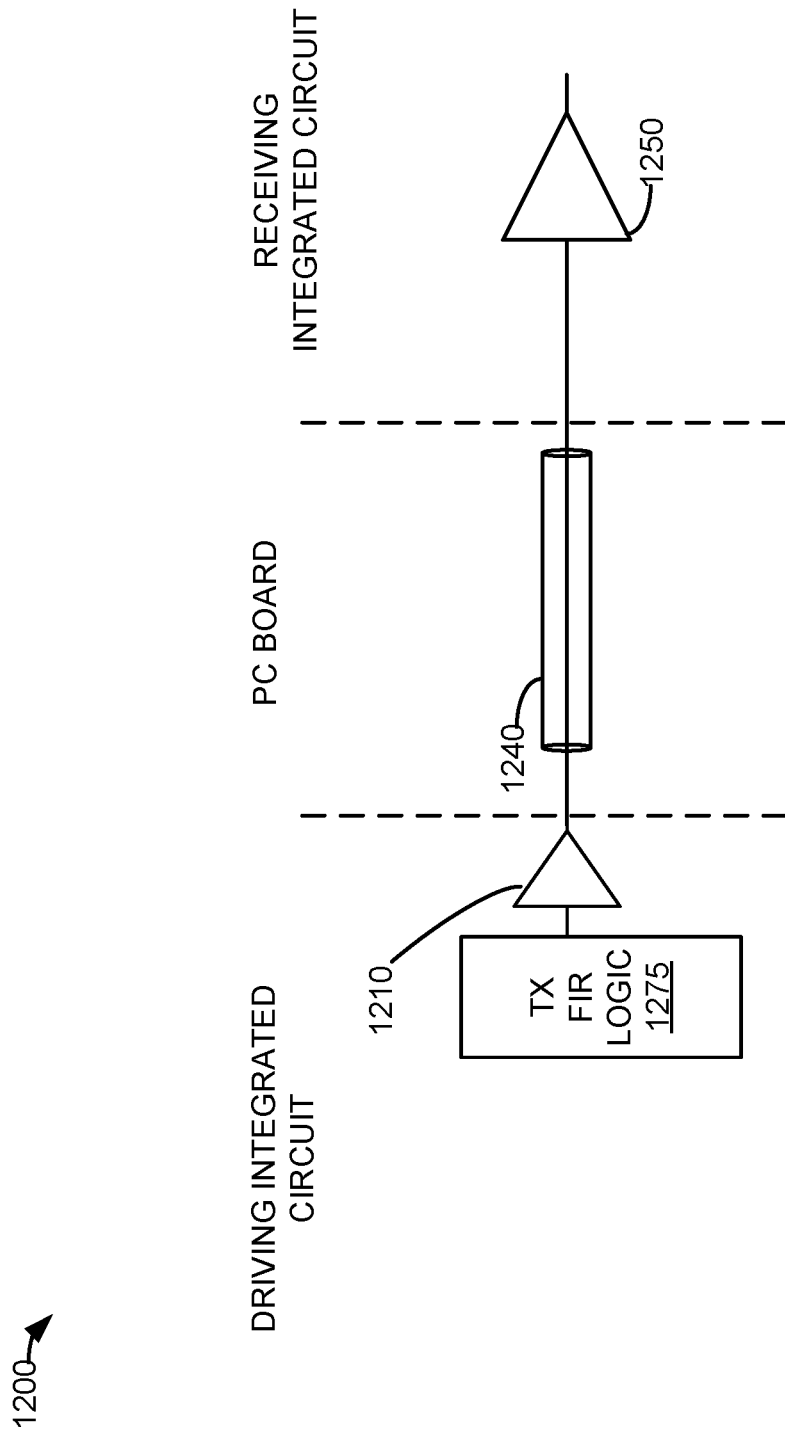
FIG. 12 illustrates a communication system with non-uniform transmit equalization and speculative DFE.

FIG. 12 illustrates a communication system with non-uniform transmit equalization and speculative DFE. Communication system 1200 comprises a driving integrated circuit, a receiving integrated circuit, and interconnect between them. The driving integrated circuit includes transmitter circuit 1210 (a.k.a., a driver). Transmit finite impulse response (FIR) logic 1275 controls transmitter circuit 1210 to implement non-uniform transmit equalization.

The receiver integrated circuit includes receiver circuit 1250. The interconnect between the driving integrated circuit and the receiving integrated circuit comprises interconnect system 1240. Interconnect system 1240 would typically comprise a printed circuit (PC) board, connector, cable, flex circuit, other substrate, and/or a combination of these. Interconnect system 1240 may be and/or include one or more transmission lines.

Receiver circuit 1250 would typically be part of an integrated circuit that is receiving the signal sent by the driving integrated circuit. It should be understood that termination (not shown in FIG. 12) can be part of the integrated circuit or interconnect system 1240. It should also be understood that although system 1200 is illustrated as transmitting a single-ended signal, the signals sent by the driving integrated circuit of system 1200 may represent one of a pair of differential signals or one of a collection of signals sending multi-wire-coded data.

In FIG. 12, the output of transmitter circuit 1210 is connected to a first end of interconnect system 1240. The second end of interconnect system 1240 is connected to the input of receiver 1250. Transmitter circuit 1210 is configured to drive PAM-4 signaling levels.

In an embodiment, receiver 1250 is a speculative DFE receiver. FIR logic 1275 applies non-uniform pre-emphasis to a PAM-4 output signal. The non-uniform pre-emphasis output by transmitter circuit 1210 under the control of FIR logic 1275 is selected such that, after passing through interconnect system 1420, a number of the received PAM-4 voltage levels have effectively the same values even when the previous symbols are different. For example, with uniform pre-emphasis (or no pre-emphasis) the non-ideal characteristics (e.g., ISI) of interconnect system 1240 may result in as many as 13 voltage levels (but still only representing 4 PAM-4 symbols) arriving at receiver 1250. The non-uniform emphasis applies by FIR logic 1275 reduces the number of different voltage levels arriving at the input to receiver 1250. Thus, in an embodiment, the non-uniform pre-emphasis allows certain PAM-4 transitions sent by transmitter circuit 1210 to be accurately sampled by speculative DFE receiver 1250 using a reduced number of comparators. For example, by applying appropriate non-uniform pre-emphasis, the number of voltage levels arriving at receiver 1250 can be reduced from 13 voltage levels (which requires 12 comparators to sample) to 6 voltage levels (which can be sampled with 5 comparators).

Figure 13A:
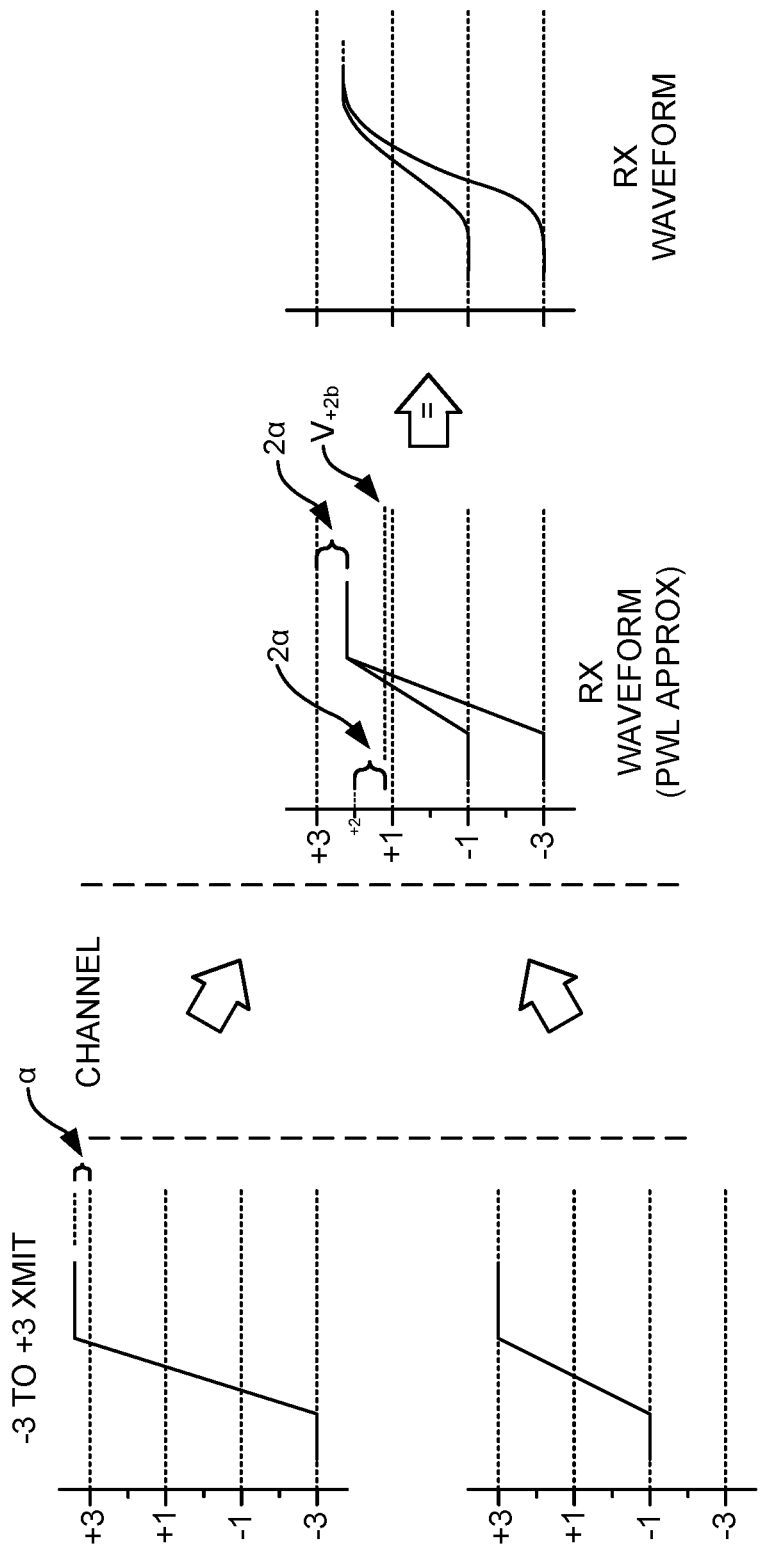
FIGS. 13A-13C illustrate an examples of non-uniform transmit equalization.

FIG. 13A illustrates an example of non-uniform transmit equalization. In FIG. 13A, a piecewise-linear approximation of the signal output by transmitter 1210 (under the control of FIR logic 1275) for two example PAM-4 transitions is shown—from −1 to +3 and from −3 to +3. The equalized PAM-4 transition from −3 to +3 is shown as a transition from the −3 voltage level to a +3+α voltage level. The equalized PAM-4 transition from −1 to +3 is shown as a simple transition from the −1 voltage level to the +3 voltage level. Thus, since the symbol after both of these transition is a +3 PAM-4 symbol, it can be seen that FIR logic 1275 is applying non-uniform pre-emphasis.

After passing through the channel (i.e., interconnect system 1240), bandwidth limitations, non-linearity's and other non-ideal properties of interconnect system 1240 result in the illustrated sketches shown on the right of FIG. 13A. Although both of these sketches illustrate the same waveform, one of the waveforms is sketched as a piecewise linear approximation. This is done to better illustrate the results of the non-linear equalization at the receiver. In particular, even though both transitions started from different states (i.e., −1 and −3) in the previous symbol period, both transitions (i.e., −1+3 and −3 to +3) result in substantially the same voltage at the sampling time for the next symbol period. In FIG. 13A, that voltage is +3-2a.

Also shown in FIG. 13A, is a suitable reference (or threshold) voltage ($V_{+2b}$) to be used to determine whether the resulting symbol corresponds to a PAM-4+3 level. $V_{+2b}$ is illustrated to be +2−2α.

Figure 13B:
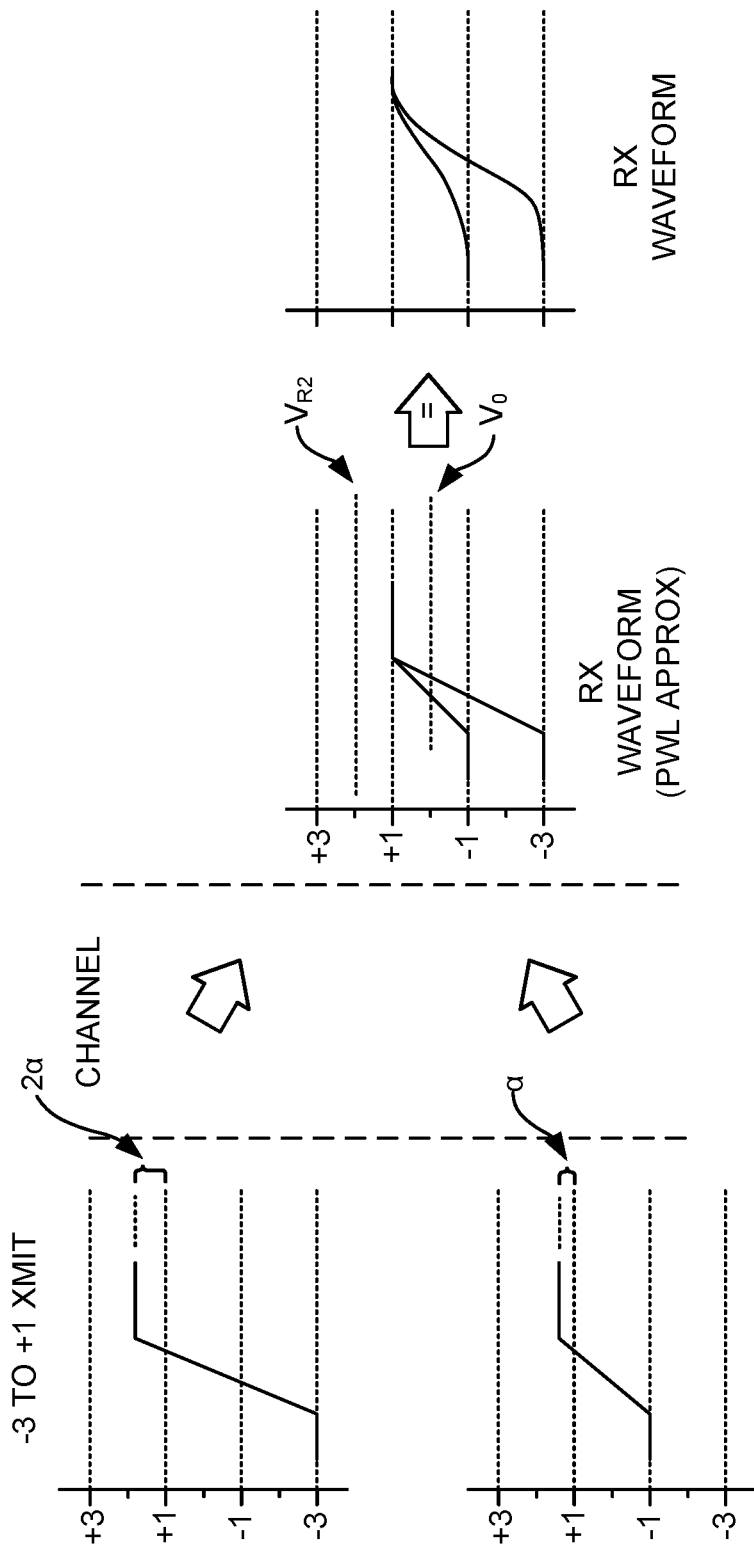

FIG. 13B illustrates another example of non-uniform transmit equalization. In FIG. 13B, a piecewise-linear approximation of the signal output by transmitter 1210 (under the control of FIR logic 1275) for two additional example PAM-4 transitions is shown—from −1 to +1 and from −3 to +1. The equalized PAM-4 transition from −3 to +1 is shown as a transition from the −3 voltage level to a +1+2α voltage level. The equalized PAM-4 transition from −1 to +1 is shown as a transition from the −1 voltage level to a +1+α voltage level. Thus, since the symbol after both of these transition is a +3 PAM-4 symbol, it can be seen that FIR logic 1275 is applying non-uniform pre-emphasis.

After passing through the channel (i.e., interconnect system 1240), bandwidth limitations, non-linearity's and other non-ideal properties of interconnect system 1240 result in the illustrated sketches shown on the right of FIG. 13B. Even though both transitions started from different states (i.e., −1 and −3) in the previous symbol period, both transitions (i.e., −1 to +3 and −3 to +3) result in substantially the same voltage at the sampling time for the next symbol period. In FIG. 13B, that voltage is +1. Also shown in FIG. 13B, is a suitable reference (or threshold) voltage ($V_0$) to be used to determine whether the resulting symbol corresponds to a positive (+1 or +3) or a negative (−1 or −3) PAM-4 level. $V_0$ is illustrated to be 0 V.

Figure 13C:
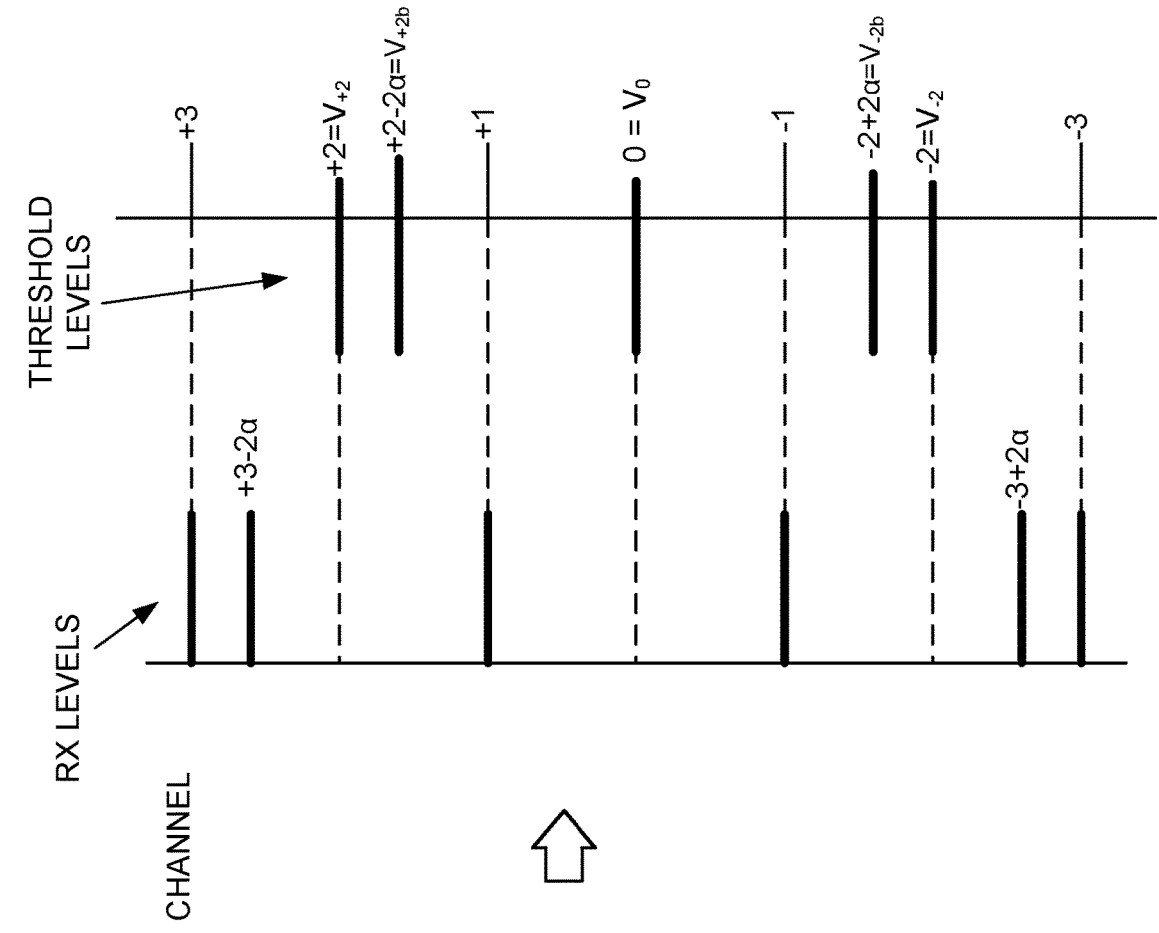

FIG. 13C is a diagram illustrating the transmit levels (voltages) that result from all of the possible PAM-4 transitions, corresponding receive levels, and suitable threshold levels to distinguish the receive levels. The transitions and levels illustrated in FIG. 13C are also given in Table 6. As can be seen from FIG. 13C and Table 6, the suitable number of threshold levels is five. Thus, for these signals that have non-uniform pre-emphasis, only five comparators/samplers would be needed to implement a speculative PAM-4 DFE receiver.

TABLE 6

| Previous Symbol | Current Symbol | Tx FIR tap value | Tx signal level | Rx signal level | Suitable threshold |
|---|---|---|---|---|---|
| +3 | +3 | 0 | +3 | +3 | +2 |
| +3 | +1 | −α | +1 − α | +1 | +2 |
| +3 | −1 | −2α | −1 − 2α | −1 | 0 |
| +3 | −3 | −α | −3 − α | −3 + 2α | −2 + 2α |
| +1 | +3 | +α | +3 + α | +3 | +2 |
| +1 | +1 | 0 | +1 | +1 | 0 |
| +1 | −1 | −α | −1 − α | −1 | 0 |
| +1 | −3 | 0 | −3 | −3 + 2α | −2 + 2α |
| −1 | +3 | 0 | +3 | +3 − 2α | +2 − 2α |
| −1 | +1 | +α | +1 + α | +1 | 0 |
| −1 | −1 | 0 | −1 | −1 | 0 |
| −1 | −3 | −α | −3 − α | −3 | −2 |
| −3 | +3 | +α | +3 + α | +3 − 2α | +2 − 2α |
| −3 | +1 | +2α | +1 + 2α | +1 | 0 |
| −3 | −1 | α | −1 + α | −1 | −2 |
| −3 | −3 | 0 | −3 | −3 | −2 |

Figure 14A:
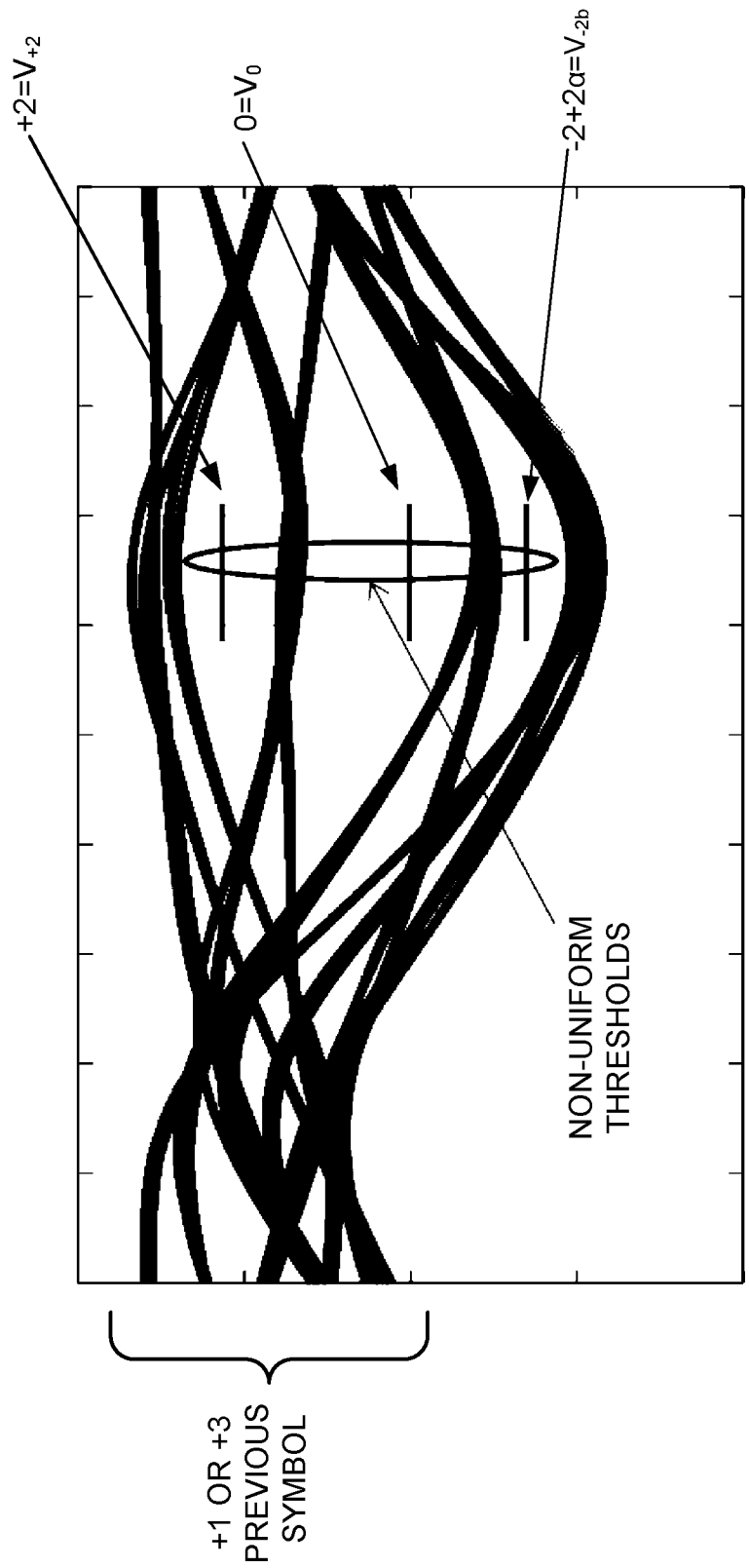
FIG. 14A illustrates PAM-4 data eyes for non-uniformly equalized transitions from positively signed previous symbols.
Figure 14B:
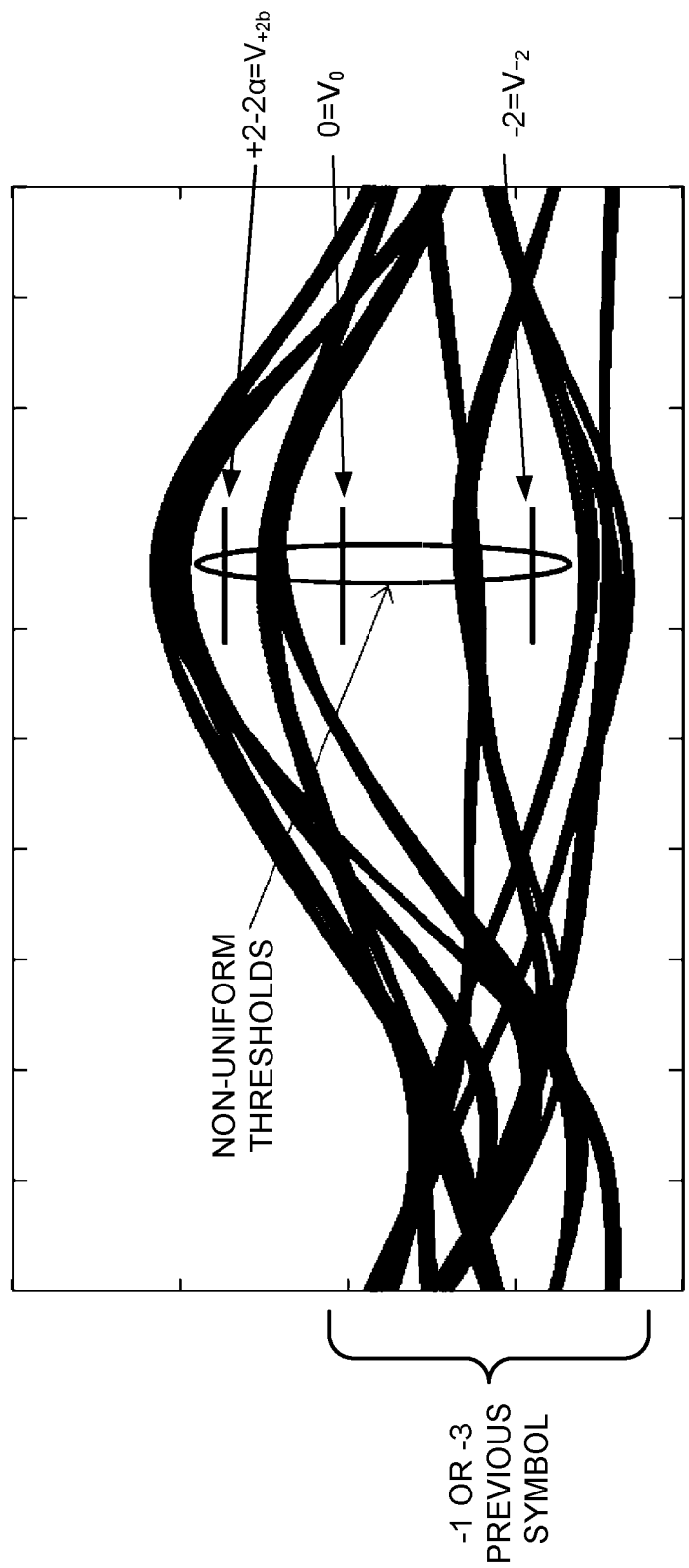
FIG. 14B illustrates PAM-4 data eyes for non-uniformly equalized transitions from negatively signed previous symbols.

It should be noted that for positive previous symbols (i.e., +1 or +3), there are only three suitable threshold voltages given: $V_{-2b}=-2+2\alpha$; $V_0=0$, and $V_{+2}=+2$. FIG. 14A illustrates PAM-4 data eyes for non-uniformly equalized transitions from positively signed previous symbols. For negative previous symbols (i.e., −1 or −3), there are also only three suitable threshold voltages given: $V_{-2}=-2$, $V_0=0$, and $V_{-2b}=+2-2\alpha$. FIG. 14B illustrates PAM-4 data eyes for non-uniformly equalized transitions from negatively signed previous symbols. Note also that the threshold voltage $V_0=0$ is used for both positive and negative previous symbols. Thus, the sampler with a threshold voltage of $V_0=0$ can be used to determine which set of samplers or threshold voltages (i.e., the set with $V_{-2b}$, $V_0$, and $V_{+2}$, or the set with $V_{-2}$, $V_0$, and $V_{+2b}$) should be used to determine the current symbol.

Figure 15:
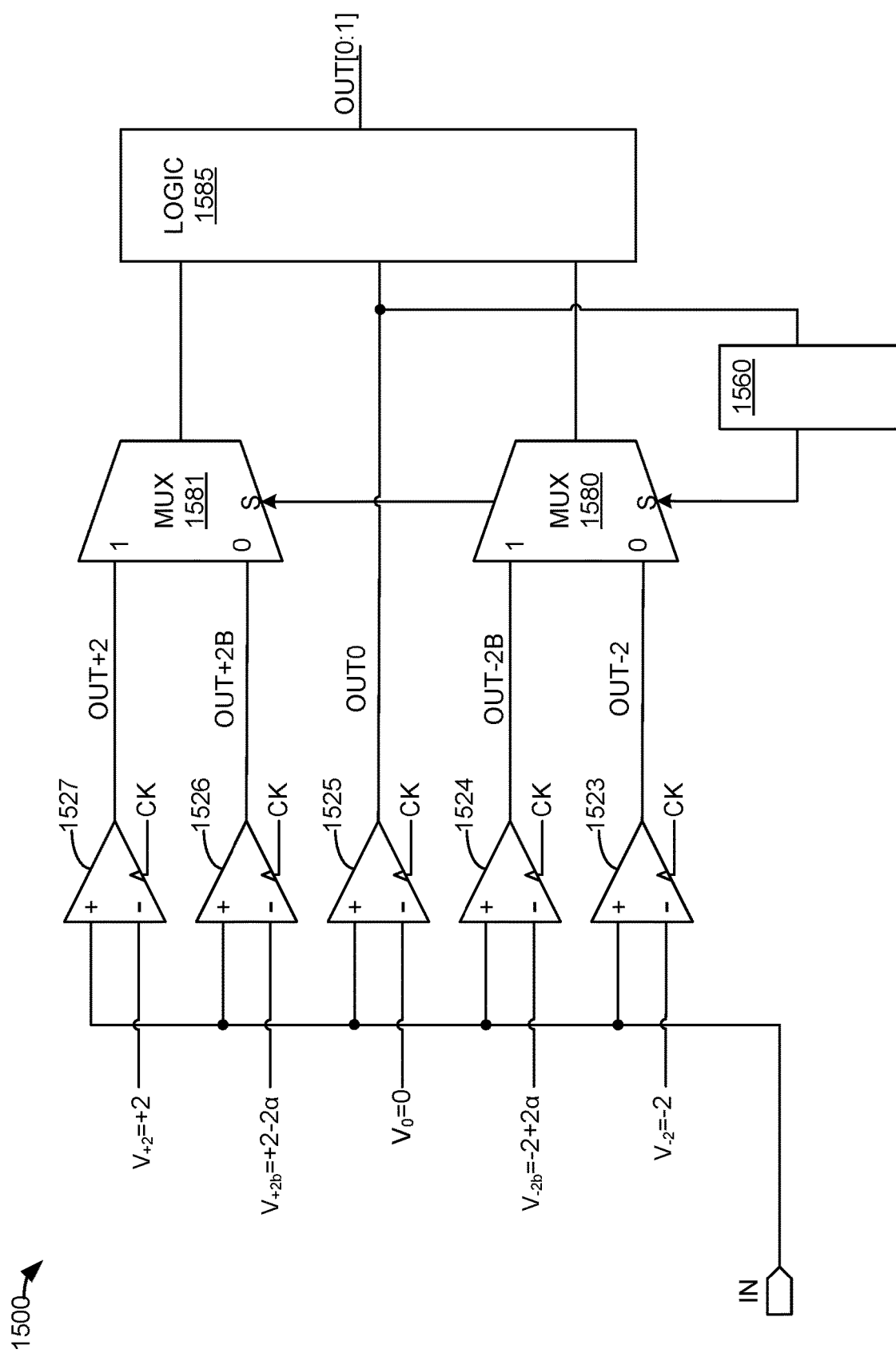
FIG. 15 illustrates a PAM-4 speculative DFE receiver with five comparators.

FIG. 15 illustrates a PAM-4 speculative DFE receiver with five comparators. Receiver 1500, illustrated in FIG. 15, may correspond to one or more of receiver 150, receivers 214, and/or receivers 224. Receiver 1500 comprises samplers 1523-1527, register 1560, multiplexer (MUX) 1580, MUX 1581, and decoding logic 1585. In FIG. 15, an input signal (IN) is operatively coupled to the non-inverting inputs of samplers 1523-1527. The inverting input (i.e., reference or threshold voltage input) of sampler 1523 receives reference voltage $V_{-2}$. The inverting input of sampler 1524 receives reference voltage $V_{-2b}$. The inverting input of sampler 1525 receives reference voltage $V_0$. The inverting input of sampler 1526 receives reference voltage $V_{+2b}$. The inverting input of sampler 1527 receives reference voltage $V_{+2}$.

Samplers 1523-1527 each receive a timing reference CK. CK determines the timing that samplers 1523-1527 compare inputs (i.e., IN) to their respective reference voltage (e.g., $V_{-2}$, $V_{-2b}$, etc.) to produce their respective digital output signal. The timing reference also determines when register 1560 latches and propagates the value on its input to its output. The output of sampler 1523 (OUT−2) is input to the "0" input of MUX 1580. The output of sampler 1524 (OUT−2B) is input to the "1" input of MUX 1580. The output of sampler 1525 (OUT0) is input to logic 1585 and the input of register 1560. The output of sampler 1526 (OUT+2B) is input to the "0" input of MUX 1581. The output of sampler 1527 (OUT+2) is input to the "1" input of MUX 1581.

The select inputs ("S") of MUX 1580 and MUX 1581 are received from the output of register 1560. Thus, the output of register 1560 is the result of the comparison by sampler 1525 of the input signal to the reference voltage $V_0$. Since $V_0$ is between the PAM-4 levels of +1 and −1, the output of register 1560 corresponds to the sign of the previous symbol. In other words, when the previous symbol is a −1 or a −3, the output of register 1560 controls MUXs 1580-1581 to select their "0" input. When the previous symbol is a +1 or a +3, the output of register 1560 controls MUXs 1580-1581 to select their "1" input. The outputs of MUXs 1580-1581 are received by logic 1585 to produce a received value OUT[0:1].

When the previous symbol is a −1 or a −3 (based on the output of register 1560), logic 1585 decodes the results of comparisons between IN and reference voltages $V_{-2}$, $V_0$, and $V_{+2b}$. When the previous symbol is a −1 or a −3 (based on the output of register 1560), logic 1585 decodes the results of comparisons between IN and reference voltages $V_{-2b}$, $V_0$, and $V_{+2}$. In an embodiment, $V_{-2b}$, $V_{-2}$, $V_0$, $V_{+2b}$, and $V_{+2}$ are selected in accordance with the relative (to each other) voltage levels of $V_{-2}=-2$, $V_{-2b}=-2+2\alpha$; $V_0=0$, $V_{-2b}=+2-2\alpha$, and $V_{+2}=+2$.

Figure 16:
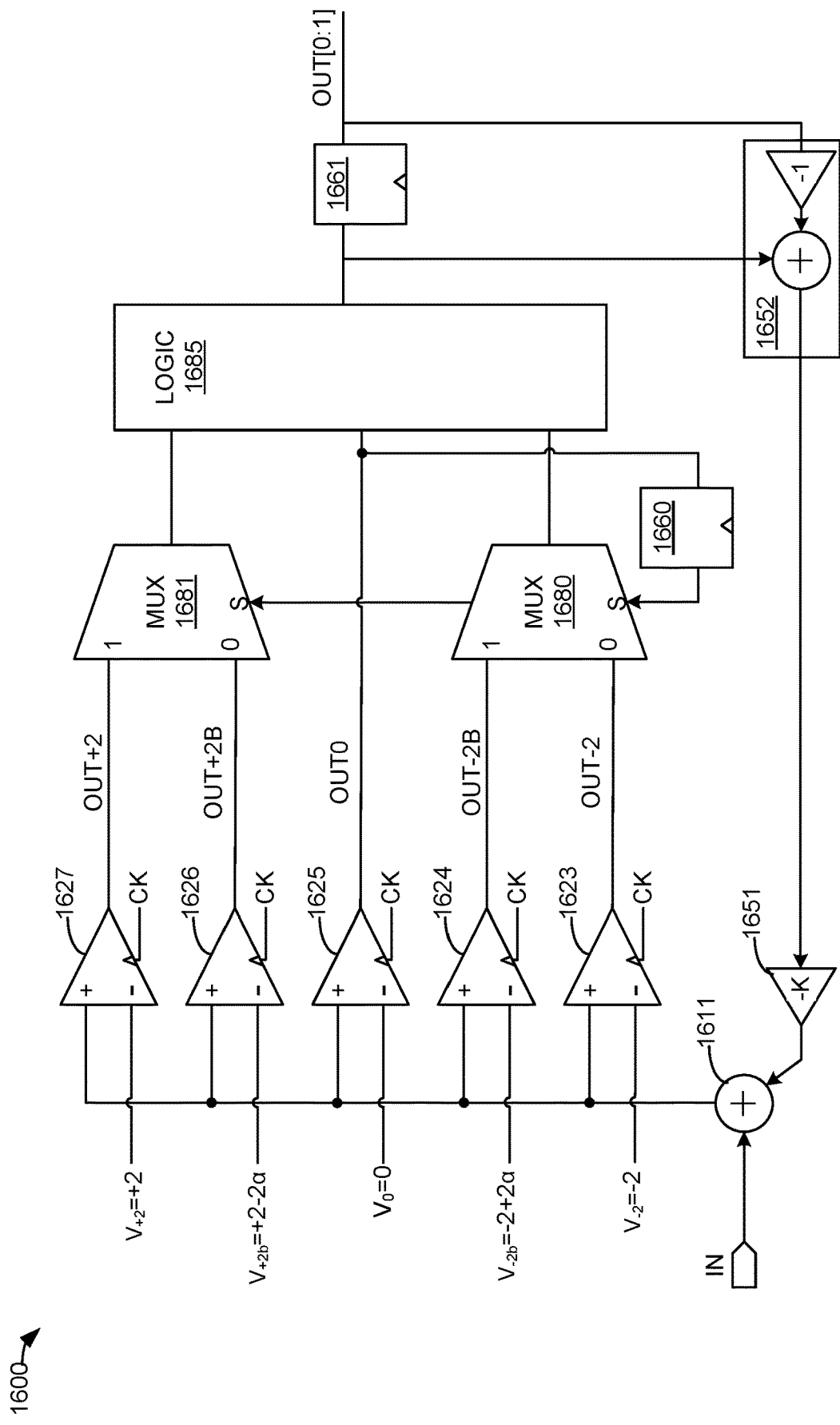
FIG. 16 illustrates a PAM-4 speculative DFE receiver with second tap feedback.

FIG. 16 illustrates a PAM-4 speculative DFE receiver with second tap feedback. Receiver 1600, illustrated in FIG. 16, may correspond to one or more of receiver 150, receivers 214, and/or receivers 224. Receiver 1600 comprises analog summer 1611, samplers 1623-1627, tap logic 1652, weighted buffer 1651, register 1660, register 1661, multiplexer (MUX) 1680, MUX 1681, and decoding logic 1685. In FIG. 16, an input signal (IN) is input to analog summer 1611. The output of analog summer 1611 is input to the non-inverting inputs of samplers 1623-1627. The inverting input (i.e., reference or threshold voltage input) of sampler 1623 receives reference voltage $V_{-2}$. The inverting input of sampler 1624 receives reference voltage $V_{-2b}$. The inverting input of sampler 1625 receives reference voltage $V_0$. The inverting input of sampler 1626 receives reference voltage $V_{+2b}$. The inverting input of sampler 1627 receives reference voltage $V_{+2}$.

Samplers 1623-1627 each receive a timing reference CK. CK determines the timing that samplers 1623-1627 compare inputs (i.e., IN) to their respective reference voltage (e.g., $V_{-2}$, $V_{-2b}$, etc.) to produce their respective digital output signal. The timing reference also determines when registers 1660 and 1661 latch and propagate the value on their respective inputs to their respective outputs. The output of sampler 1623 (OUT−2) is input to the "0" input of MUX 1680. The output of sampler 1624 (OUT−2B) is input to the "1" input of MUX 1680. The output of sampler 1625 (OUT0) is input to logic 1685 and the input of register 1660. The output of sampler 1626 (OUT+2B) is input to the "0" input of MUX 1681. The output of sampler 1627 (OUT+2) is input to the "1" input of MUX 1681.

The select inputs ("S") of MUX 1680 and MUX 1681 are received from the output of register 1660. Thus, the output of register 1660 is the result of the comparison by sampler 1625 of the input signal to the reference voltage $V_0$. Since $V_0$ is between the PAM-4 levels of +1 and −1, the output of register 1660 corresponds to the sign of the previous symbol. In other words, when the previous symbol is a −1 or a −3, the output of register 1660 controls MUXs 1680-1581 to select their "0" input. When the previous symbol is a +1 or a +3, the output of register 1660 controls MUXs 1680-1681 to select their "1" input. The outputs of MUXs 1680-1681 are received by logic 1685 to produce a received value OUT[0:1].

The output of logic 1685 OUT[0:1] is input to register 1661 and tap logic 1652. The output of register 1661 is input to tap logic 1652. Tap logic 1652 subtracts the output of register 1661 from the output of logic 1685. The output of tap logic 1652 is input to weighted buffer 1651. The output of weighted buffer 1651 is input to summer 1611 thereby completing a $2^{nd}$ tap DFE loop. In an embodiment, $V_{-2b}$, $V_{-2}$, $V_0$, $V_{+2b}$, and $V_{+2}$ are selected in accordance with the relative (to each other) voltage levels of $V_{-2}=-2$, $V_{-2b}=-2+2\alpha$; $V_0=0$, $V_{-2b}=+2-2\alpha$, and $V_{+2}=+2$.

Figure 17:
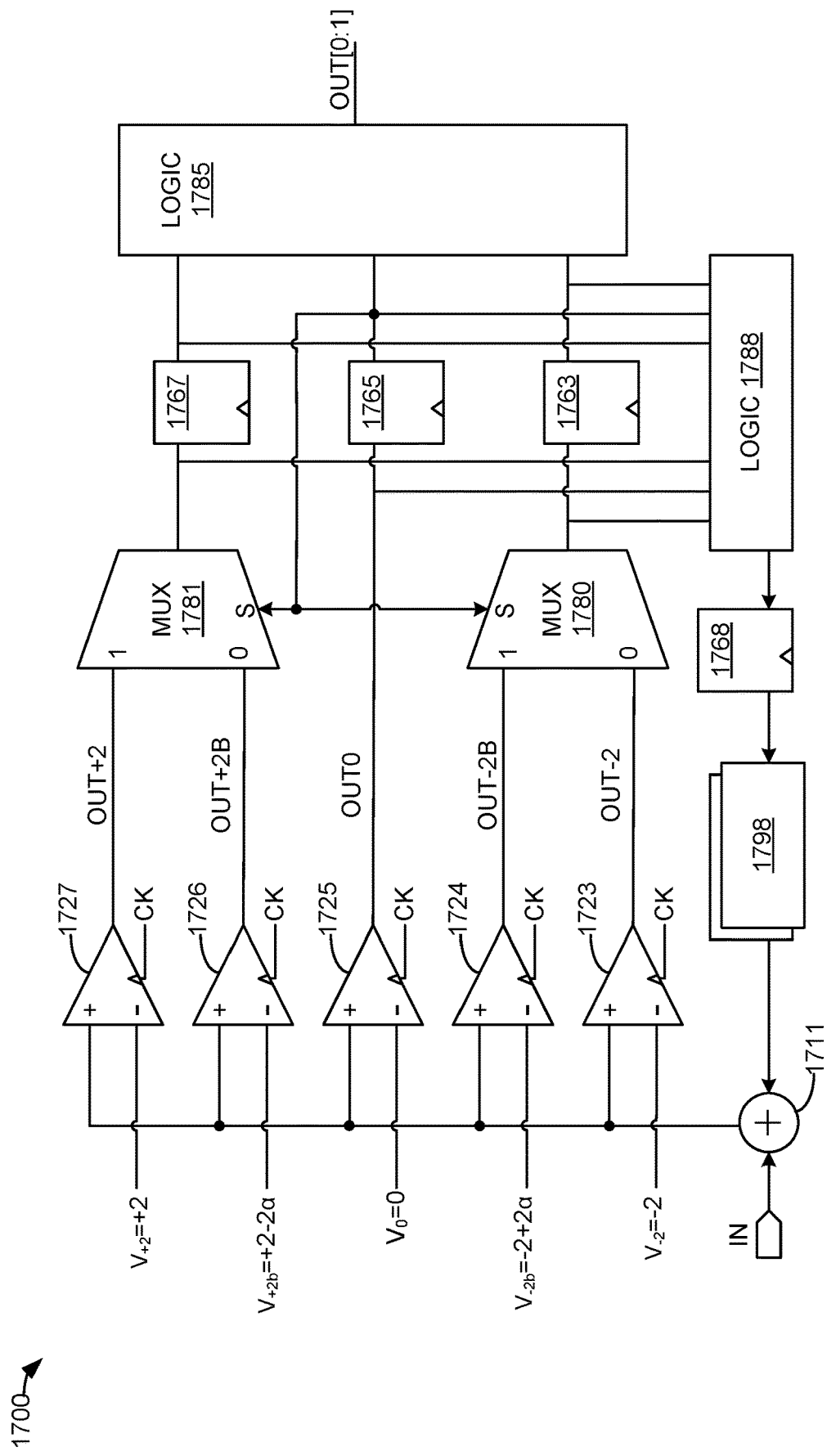
FIG. 17 illustrates a PAM-4 speculative DFE receiver having second tap feedback without subtraction.

FIG. 17 illustrates a PAM-4 speculative DFE receiver having second tap feedback without subtraction. Receiver 1700, illustrated in FIG. 17, may correspond to one or more of receiver 150, receivers 214, and/or receivers 224. Receiver 1700 comprises samplers analog summer 1711, 1723-1727, register 1763, register 1765, register 1767, register 1768, multiplexer (MUX) 1780, MUX 1781, decoder logic 1785, tap logic 1788, and digital-to-analog converter(s) 1798. In FIG. 17, an input signal (IN) is input to analog summer 1711. The output of analog summer 1711 is input to the non-inverting inputs of samplers 1723-1727. The inverting input (i.e., reference or threshold voltage input) of sampler 1723 receives reference voltage $V_{-2}$. The inverting input of sampler 1724 receives reference voltage $V_{-2b}$. The inverting input of sampler 1725 receives reference voltage $V_0$. The inverting input of sampler 1726 receives reference voltage $V_{+2b}$. The inverting input of sampler 1727 receives reference voltage $V_{+2}$.

Samplers 1723-1727 each receive a timing reference CK. CK determines the timing that samplers 1723-1727 compare inputs (i.e., IN) to their respective reference voltage (e.g., $V_{-2}$, $V_{-2b}$, etc.) to produce their respective digital output signal. The timing reference also determines when register 1760 latches and propagates the value on its input to its output. The output of sampler 1723 (OUT−2) is input to the "0" input of MUX 1780. The output of sampler 1724 (OUT−2B) is input to the "1" input of MUX 1780. The output of sampler 1725 (OUT0) is input to logic 1785 and the input of register 1765. The output of sampler 1726 (OUT+2B) is input to the "0" input of MUX 1781. The output of sampler 1727 (OUT+2) is input to the "1" input of MUX 1781.

The select inputs ("S") of MUX 1780 and MUX 1781 are received from the output of register 1765. Thus, the output of register 1765 is the result of the comparison by sampler 1725 of the input signal to the reference voltage $V_0$. Since $V_0$ is between the PAM-4 levels of +1 and −1, the output of register 1760 corresponds to the sign of the previous symbol. In other words, when the previous symbol is a −1 or a −3, the output of register 1760 controls MUXs 1780-1781 to select their "0" input. When the previous symbol is a +1 or a +3, the output of register 1760 controls MUXs 1780-1781 to select their "1" input.

When the previous symbol is a −1 or a −3 (based on the output of register 1760), logic 1785 decodes the results of comparisons between IN and reference voltages $V_{-2}$, $V_0$, and $V_{+2b}$. When the previous symbol is a −1 or a −3 (based on the output of register 1765), logic 1785 decodes the results (delayed by one symbol period by registers 1763, 1765, and 1767) of comparisons between IN and reference voltages $V_{-2b}$, $V_0$, and $V_{+2}$. In an embodiment, $V_{-2b}$, $V_{-2}$, $V_0$, $V_{+2b}$, and $V_{+2}$ are selected in accordance with the relative (to each other) voltage levels of $V_{-2}=-2$, $V_{-2b}=-2+2\alpha$; $V_0=0$, $V_{-2b}=+2-2\alpha$, and $V_{+2}=+2$.

The output of MUX 1780 is input to register 1763. The output of MUX 1781 is input to register 1767. The output of sampler 1725 is input to register 1765. Thus, the outputs of register 1763, register 1765, and register 1767 correspond (in thermometer code) to the previous PAM-4 symbol received via IN. The outputs of register 1763, register 1765, and register 1767 received by logic 1785 to produce a received value OUT[0:1]. The outputs of register 1763, register 1765, and register 1767 are also received by tap logic 1788 to produce a tap value from the current sampled result and the previous symbol. The tap value from logic 1788 is input to register 1768. The output of register 1768 is input to DAC(s) 1798. The analog output of DAC(s) 1798 is input to analog summer 1711 thereby completing at least a $2^{nd}$ tap DFE loop.

FIG. 18 is a flowchart illustrating a non-speculative decoder free method of decision feedback equalization. The steps illustrated in FIG. 18 may be performed by one or more elements of communication system 100, memory system 200, and/or communication system 1200. A first sampler decision indicator based on a comparison between an equalized data signal and a first reference voltage is produced (1802). For example, sampler 821 may compare the output of summer 810 to threshold or reference voltage Vref1 to produce a value on OUT[1].

A second sampler decision indicator based on a comparison between an equalized data signal and a second reference voltage is produced (1804). For example, sampler 822 may compare the output of summer 810 to threshold or reference voltage Vref2 to produce a value on OUT[2]. A third sampler decision indicator based on a comparison between an equalized data signal and a third reference voltage is produced (1806). For example, sampler 823 may compare the output of summer 810 to threshold or reference voltage Vref3 to produce a value on OUT[3].

Based on the first sampler decision indicator, a first error removal voltage is produced (1808). For example, based on OUT[1], weighted buffer 831 may produce an analog error removal voltage that is supplied to summer 810. Based on the second sampler decision indicator, a second error removal voltage is produced (1810). For example, based on OUT[2], weighted buffer 831 may produce an analog error removal voltage that is supplied to summer 810. Based on the third sampler decision indicator, a third error removal voltage is produced (1812). For example, based on OUT[3], weighted buffer 831 may produce an analog error removal voltage that is supplied to summer 810.

The received data signal is summed with the first error removal voltage, the second error removal voltage, and the third error removal voltage to produce the equalized data signal (1814). For example, the output of weighted buffer 831, the output of weighted buffer 832, and the output of weighted buffer 833 are summed with the input IN to produce an equalized data signal that is supplied to samplers 821-823.

FIGS. 19A-19B are a flowchart illustrating a non-speculative method of decision feedback equalization. The steps illustrated in FIGS. 19A-19B may be performed by one or more elements of communication system 100 and/or memory system 200. A first previous symbol sampler decision indicator based on a comparison between an equalized data signal and a first reference voltage is produced (1902). For example, sampler 921 may compare the output of summer 910 to threshold or reference voltage Vref1 to produce a value on OUT[1]. A second previous symbol sampler decision indicator based on a comparison between an equalized data signal and a second reference voltage is produced (1904). For example, sampler 922 may compare the output of summer 910 to threshold or reference voltage Vref2 to produce a value on OUT[2]. A third previous symbol sampler decision indicator based on a comparison between an equalized data signal and a third reference voltage is produced (1906). For example, sampler 923 may compare the output of summer 910 to threshold or reference voltage Vref3 to produce a value on OUT[3].

A first current symbol sampler decision indicator based on a comparison between a received data signal and the first reference voltage is produced (1908). For example, sampler 925 may compare input voltage IN to threshold or reference voltage Vref1 to produce a value on that is input to weighted buffer 935. A second current symbol sampler decision indicator based on a comparison between a received data signal and the second reference voltage is produced (1910). For example, sampler 926 may compare input voltage IN to threshold or reference voltage Vref2 to produce a value on that is input to weighted buffer 936. A third current symbol sampler decision indicator based on a comparison between a received data signal and the third reference voltage is produced (1912). For example, sampler 927 may compare input voltage IN to threshold or reference voltage Vref3 to produce a value on that is input to weighted buffer 937.

Based on the first previous symbol sampler decision indicator, a first previous symbol error removal voltage is produced (1914). For example, based on the input from sampler 921, weighted buffer 931 may produce an error removal voltage to be supplied to summer 910. Based on the second previous symbol sampler decision indicator, a second previous symbol error removal voltage is produced (1916). For example, based on the input from sampler 922, weighted buffer 932 may produce an error removal voltage to be supplied to summer 910. Based on the third previous symbol sampler decision indicator, a third previous symbol error removal voltage is produced (1918). For example, based on the input from sampler 923, weighted buffer 933 may produce an error removal voltage to be supplied to summer 910.

Based on the first current symbol sampler decision indicator, a first current symbol error removal voltage is produced (1920). For example, based on the input from sampler 921, weighted buffer 931 may produce an error removal voltage to be supplied to summer 910. Based on the second current symbol sampler decision indicator, a second current symbol error removal voltage is produced (1922). For example, based on the input from sampler 922, weighted buffer 932 may produce an error removal voltage to be supplied to summer 910. Based on the third current symbol sampler decision indicator, a third current symbol error removal voltage is produced (1924). For example, based on the input from sampler 923, weighted buffer 933 may produce an error removal voltage to be supplied to summer 910.

A delayed version of a received data signal is summed with the first previous symbol error removal voltage, the second previous symbol error removal voltage, the third previous symbol error removal voltage, the first current symbol error removal voltage, the second current symbol error removal voltage, and the third current symbol error removal voltage to produce the equalized data signal (1926). For example, summer 910 sums inputs from S/H 990, weighted buffers 931-933, and weighted buffers 935-937 to produce an equalized data signal that is supplied to samplers 921-933.

It should be understood that the received data signal IN is not sufficiently equalized when it is input to samplers 925-937. In an embodiment, the signal "IN" may already be equalized using a continuous-time equalizer (CTLE) and variable-gain-amplifier (VGA), both of which reside in a receiver analog front-end (AFE) (not shown in FIG. 9.) Thus, the outputs of weighted buffers 935-937 may be based on incorrect decisions by samplers 925-927. However, the outputs of samplers 925-927 may be viewed as estimates of the current symbol and choices for the weights of weighted buffers 935-937 selected accordingly.

Figure 20:
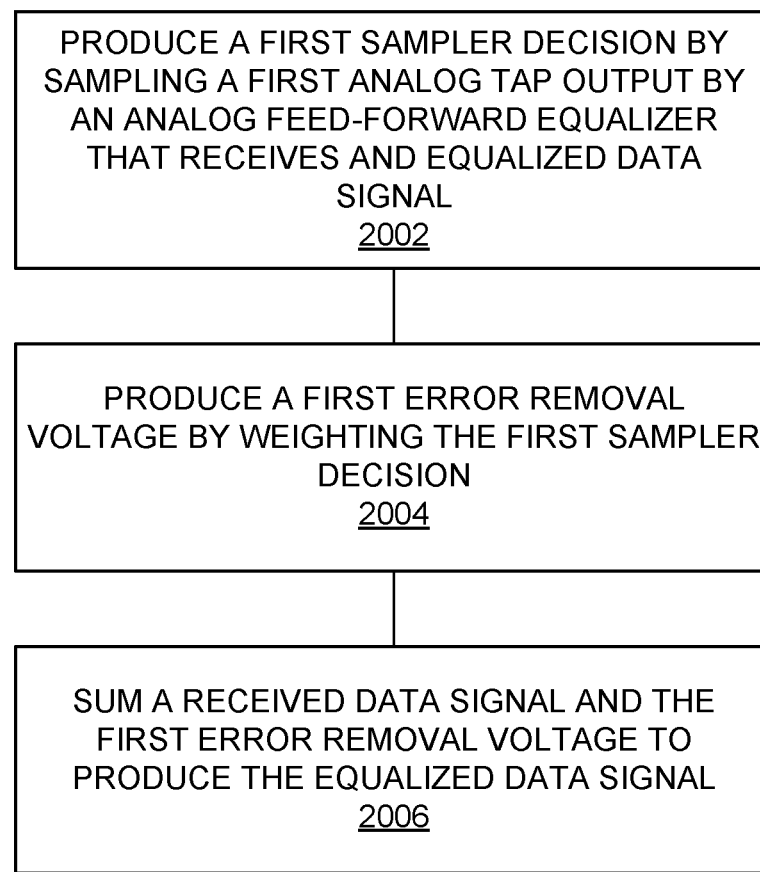
FIG. 20 is a flowchart illustrating non-speculative DFE using an analog FFE.

FIG. 20 is a flowchart illustrating non-speculative DFE using an analog FFE. The steps illustrated in FIG. 20 may be performed by one or more elements of communication system 100, memory system 200, and/or communication system 1200. A first sampler decision is produced by sampling a first analog output by an analog feed-forward equalizer that receives and equalized data signal (2002). For example, RxFFE 545 formed by S/H 540, weighted buffer 541, weighted buffer 542, and summer 511 may be sampled by sampler 522 to produce a sampler decision.

A first error removal voltage is produced by weighting the first sampler decision (2004). For example, weighted buffer 532 may weight the output of tap logic 552, which is based on a subtraction of the sampler decision from sampler 520, to produce an error removal voltage that is input to summer 510.

A received data signal and the first error removal voltage are summed to produce the equalized data signal (2006). For example, summer 510 may sum IN and the output of weighted buffer 532 to produce the input to S/H 540 and weighted buffer 542.

Figure 21:
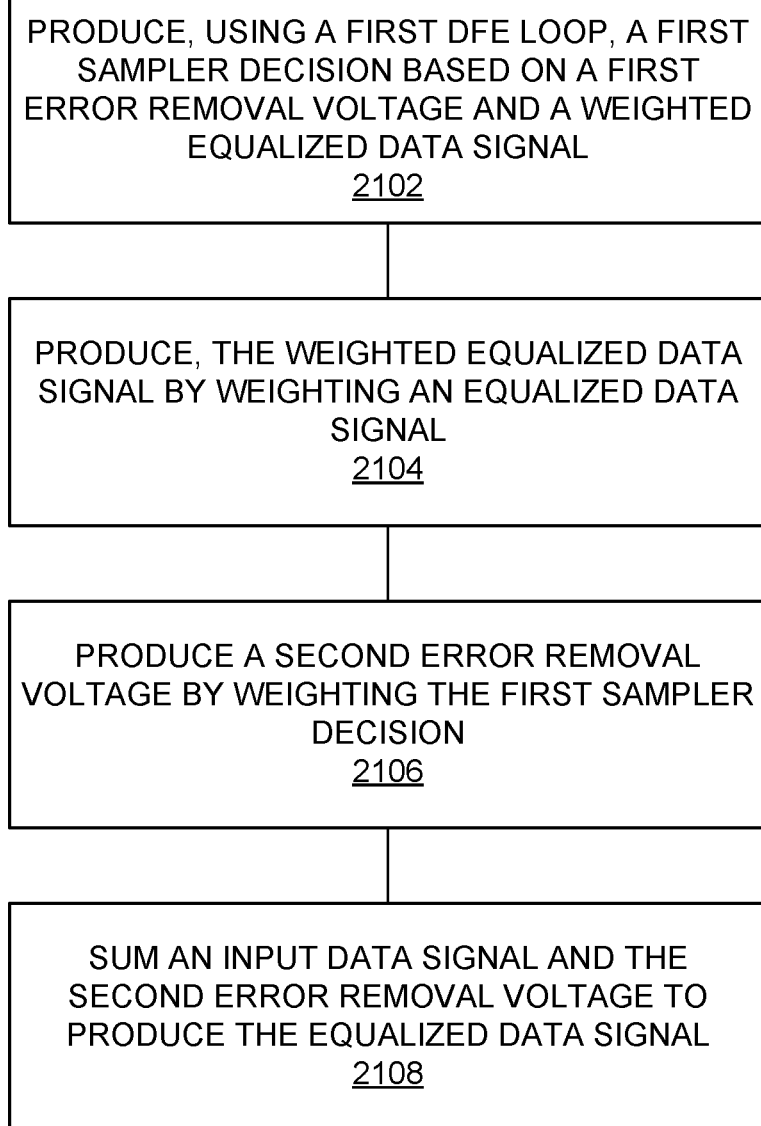
FIG. 21 is a flowchart illustrating non-speculative DFE using a combination receive FFE and first tap DFE loop.

FIG. 21 is a flowchart illustrating non-speculative DFE using a combination receive FFE and first tap DFE loop. The steps illustrated in FIG. 21 may be performed by one or more elements of communication system 100, memory system 200, and/or communication system 1200. Using a first DFE loop, a first sampler decision is produced based on a first error removal voltage and a weighted equalized data signal (2102). For example, sampler 620 may produce a sampler decision based on an error removal voltage from weighted buffer 642, where weighted buffer 642 is part of a DFE loop formed by summer 611, sampler 620, and weighted buffer 642.

The weighted equalized data signal is produced by weighting an equalized data signal (2104). For example, weighted buffer 641 may weight the equalized data signal output by summer 610. A second error removal voltage is produced by weighting the first sampler decision (2106). For example, weighted buffer 632 may produce, based on the output of tap logic 652 which is based on a subtraction of sampler decision from sampler 620, an error removal voltage that is input to summer 610.

An input data signal and the second error removal voltage are summed to produce the equalized data signal (2108). For example, summer 610 may receive the output of weighted buffer 632 and sum it with the input signal IN to produce the input to weighted buffer 641.

Figure 22:
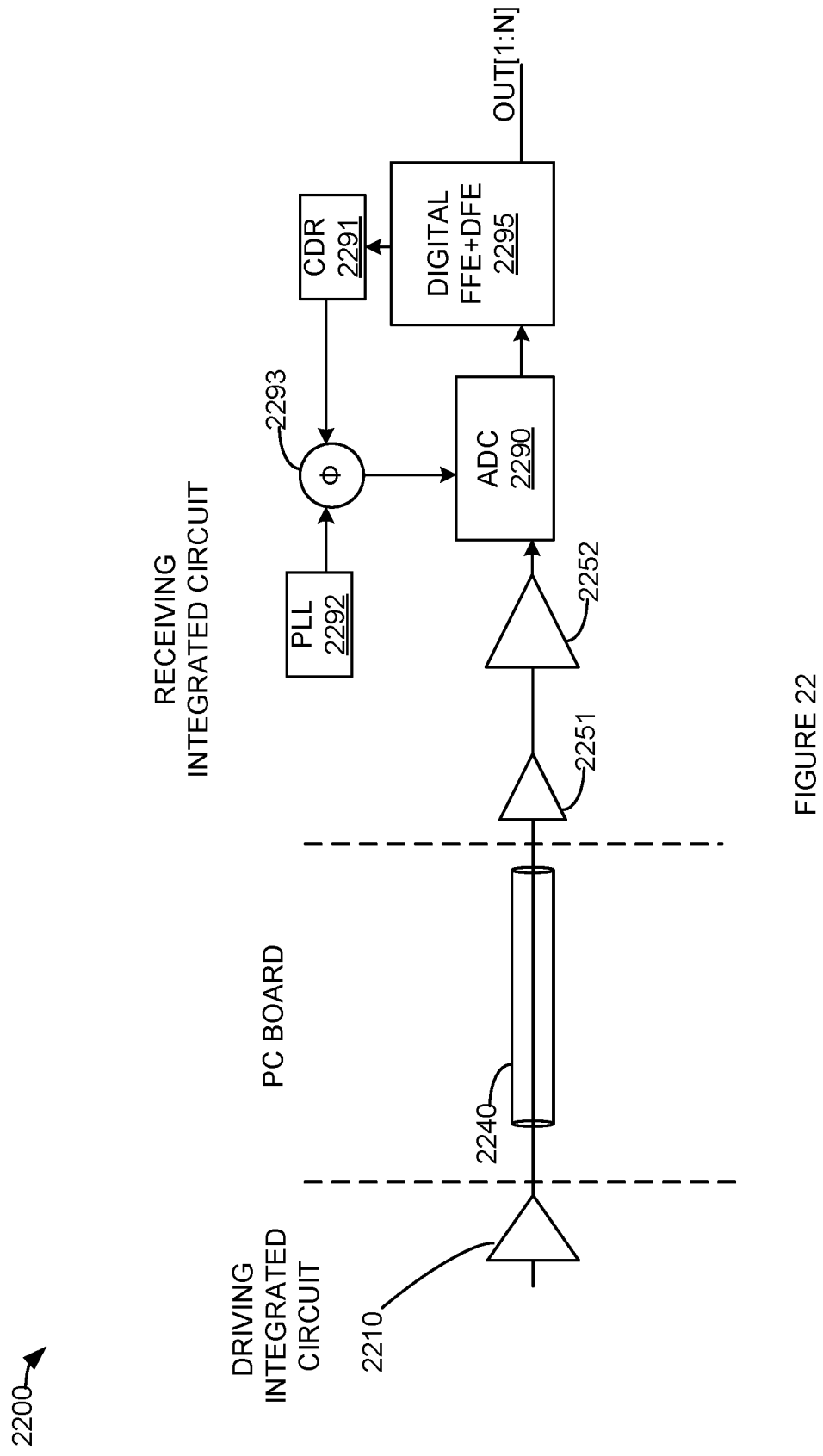
FIG. 22 illustrates a communication system with an analog-to-digital converter (ADC) based receiver.

FIG. 22 illustrates a communication system with an analog-to-digital converter (ADC) based receiver. Communication system 2200 comprises a driving integrated circuit, a receiving integrated circuit, and interconnect between them. The driving integrated circuit includes transmitter circuit 2210 (a.k.a., a driver). The receiver integrated circuit includes variable gain amplifier (VGA) 2251, continuous-time equalizer (CTLE) 2252, analog-to-digital converter 2290, digital FFE+DFE 2295, clock-data recovery 2291, phase adjuster 2293, and phase locked loop 2292. The interconnect between the driving integrated circuit and the receiving integrated circuit comprises interconnect system 2240. Interconnect system 2240 would typically comprise a printed circuit (PC) board, connector, cable, flex circuit, other substrate, and/or a combination of these. Interconnect system 2240 may be and/or include one or more transmission lines.

The receiver integrated circuit would typically be part of an integrated circuit that is receiving the signal sent by the driving integrated circuit. It should be understood that termination (not shown in FIG. 22) can be part of the integrated circuit or interconnect system 2240. It should also be understood that although system 2200 is illustrated as transmitting a single-ended signal, the signals sent by the driving integrated circuit of system 2200 may represent one of a pair of differential signals or one of a collection of signals sending multi-wire-coded data.

In FIG. 22, the output of transmitter circuit 2210 is connected to a first end of interconnect system 2240. The second end of interconnect system 2240 is connected to the input of VGA 2251. The output of VGA 2251 is input to CTLE 2252. The output of CTLE 2252 is input to ADC 2290. The multi-bit and/or multi-sample digital outputs of ADC 2290 is input to digital FFE+DFE 2295. Digital FFE+DFE 2295 is a multi-bit decision OUT[1:N]. An output of Digital FFE+DFE 2295 is input to CDR 2291. A recovered clock output by CDR 2291 is input to phase adjuster 2293. Phase adjuster 2293 also receives a clock signal from PLL 2292. The output of phase adjuster 2293 is used to control the timing that ADC 2290 samples the output of CTLE 2290. Transmitter circuit 2210 may be configured to drive PAM-4 signaling levels.

Figure 23:
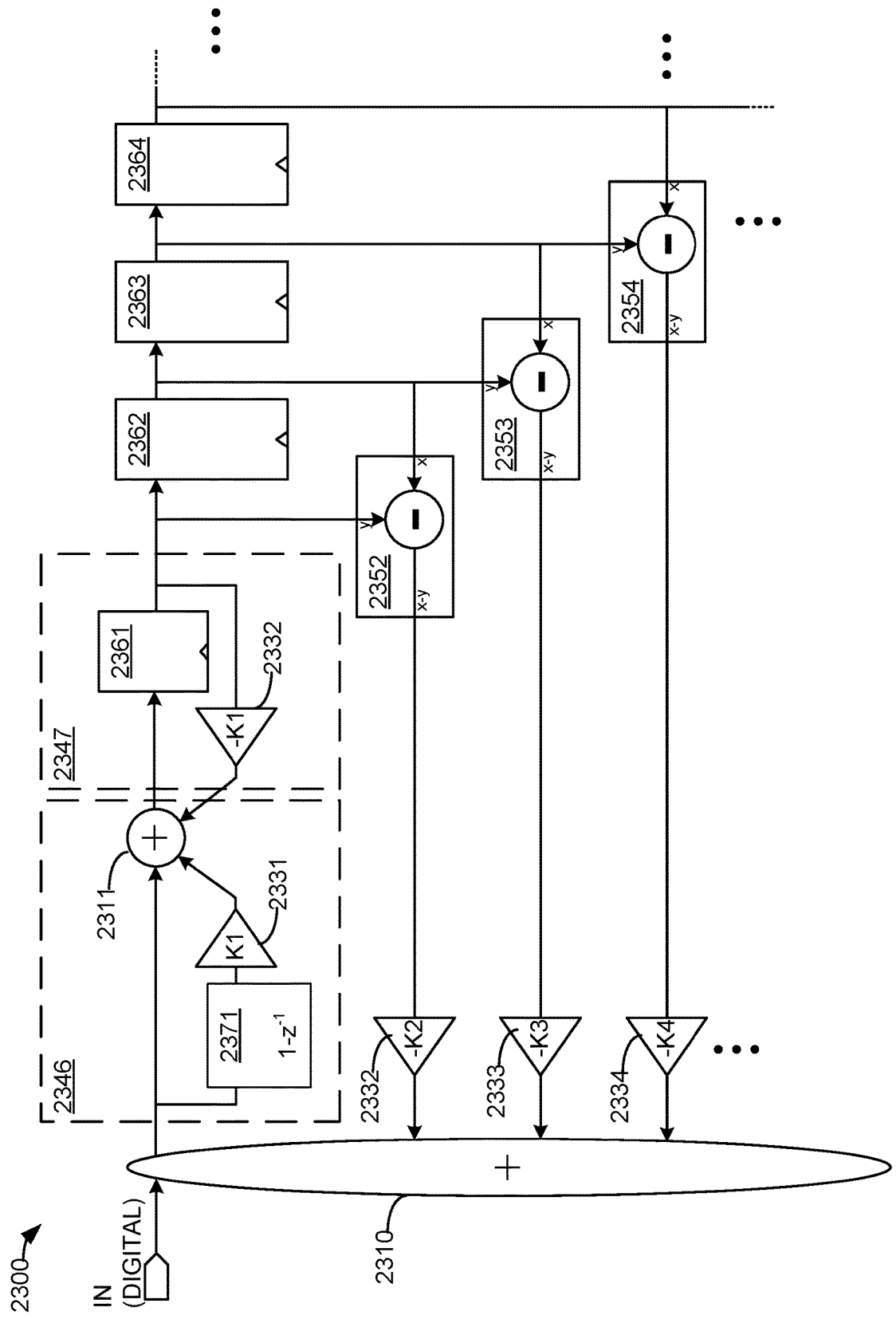
FIG. 23 illustrates a receiver with higher order DFE feedback in the digital domain.

FIG. 23 illustrates a receiver with higher order DFE feedback in the digital domain. Digital FFE+DFE 2300 illustrated in FIG. 23 may correspond to Digital FFE+DFE 2295. Digital FFE+DFE 2300 comprises digital summer 2310, FFE 2346, 1$^{st}$ DFE tap 2347, weighted buffer 2332, weighted buffer 2333, weighted buffer 2334, tap logic 2352, tap logic 2353, tap logic 2354, register 2362, register 2363, and register 2364. FFE 2346 includes digital summer 2311, discrete-time derivative 2371, and weighted buffer 2331. 1$^{st}$ DFE tap 2347 includes sampler register 2361 and weighted buffer 2332. In an embodiment Digital FFE+DFE 2300 is configured to process samples of a PAM-4 signal and therefore receives, via IN, a plurality of digital bits/samples (from, for example, ADC 2290) and outputs a plurality of decision bits accordingly. In another embodiment, Digital FFE+DFE 2300 is configured to process samples of a PAM-2 signal and therefore may output only a single decision bit (e.g., OUT[1]).

A digital input signal (IN), which may be a plurality of bits and/or a plurality of samples, is operatively coupled to an input to summer 2310. The output of summer 2310 is input to FFE 2346. In particular, the output of summer 2310 is input to summer 2311 and discrete-time derivative 2371. In an embodiment, discrete-time derivative 2371 implements a delay and subtraction such that discrete-time derivative 2371 outputs according to the equation: ffe$_{out}$=1−z$^{-1}$ where z$^{-1}$ is the value at the input to discrete-time derivative 2371 during the previous iteration (i.e., z$^{-1}$ represents the previous symbol input to discrete-time derivative 2371. In an embodiment, K1=0.5α$_1$. Accordingly, it should be understood that K1 may be variable during an adaptation (i.e., training) period, but is typically constant during normal operation.

The outputs of weighted buffer 2331, weighted buffer 2332, and summer 2310 are input to digital summer 2311. The output of summer 2311 is input to register 2361. The output of register 2361 is input to tap logic 2352 and weighted buffer 2332.

Discrete-time derivative 2371 and each of registers 2361-2364 receive a timing reference (not shown in FIG. 23.) Registers 2362-2364 each serially receive the output of the previous register 2361-2264 thereby forming a serial shift register that, for each successive stage, holds previous values output by summer 2311.

The output of register 2361 is also input to tap logic 2352. Tap logic 2352 subtracts the output of register 2362 from the output of register 2361. The output of tap logic 2352 is input to weighted buffer 2332. Weighted buffer 2332 outputs the value at the input to weighted buffer 2332 multiplied by the factor −K2. In an embodiment, K2=0.5α$_2$. The output of weighted buffer 2332 is input to summer 2310 thereby completing the second DFE tap loop. The output of register 2362 is also input to tap logic 2353. Tap logic 2353 subtracts the output of register 2363 from the output of register 2362. The output of tap logic 2353 is input to weighted buffer 2333. Weighted buffer 2333 outputs value at the input to weighted buffer 2333 multiplied by the factor −K3. In an embodiment, K3=0.5α$_3$. The output of weighted buffer 2333 is input to summer 2310 thereby completing the third DFE tap loop. The output of register 2363 is also input to tap logic 2354. Tap logic 2354 subtracts the output of register 2364 from the output of register 2363. The output of tap logic 2354 is input to weighted buffer 2334. Weighted buffer 2334 outputs the value at the input to weighted buffer 2334 multiplied by the factor −K4. In an embodiment, K4=0.5α$_4$. The output of weighted buffer 2334 is input to summer 2310 thereby completing the fourth DFE tap loop. Additional higher order DFE tap loops can be formed in a similar manner.

Figure 24:
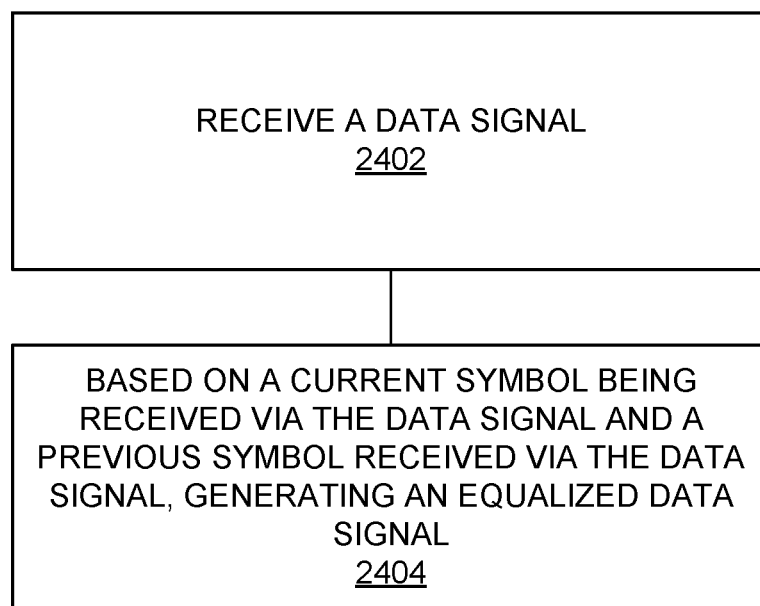
FIG. 24 is a flowchart illustrating a method of equalizing a data signal.

FIG. 24 is a flowchart illustrating a method of equalizing a data signal. The steps illustrated in FIG. 24 may be performed by one or more elements of communication system 100, memory system 200, and/or communication system 1200. A data signal is received (2402). For example, receiver 300 may receive an input data signal at node IN. This data signal may be received by S/H 340 and weighted buffer 342 of receiver 300.

Based on a current symbol being received via the data signal, and a previous symbol received via the data signal, an equalized data signal is generated (2404). For example, based on the current symbol being received at node IN, and the output of S/H 340 (which corresponds to the previous symbol that was received at node IN), summer 311 may output an equalized data signal to be sampled by PAM-4 sampler 320.

In an embodiment a circuit to receive a data signal and to output an equalized data signal includes a summer that receives the data signal and outputs the equalized data signal. The circuit also includes a first error signal generator to provide a first error removal signal to the summer such that the equalized data signal is based on both the current symbol being received via the data signal and the previous symbol that was received via the data signal. The equalized data signal may be based on a difference between the current symbol and the previous symbol. The first error signal generator and the summer may be configured to form an analog feed-forward equalization circuit. The first error signal generator and the summer may be configured to form an analog inter-symbol interference pre-filter and a first post-cursor decision feedback equalization loop. The first error signal generator and the summer maybe configured to form an analog feed-forward equalization circuit and first post-cursor decision feedback equalization loop.

The circuit may also include a second error signal generator to provide a second error removal signal to the summer such that the equalized data signal is further based on a first prior symbol that is received via the data signal prior to the current symbol, and a second prior symbol that is received consecutively after the first prior symbol. The second error signal generator may be configured to base the second error removal signal from the first prior symbol and the second prior symbol without using combinational logic between a first storage element that stores the first prior symbol and the summer. The data signal may be received by the summer in digital form and the first error signal generator and the summer may be configured to form a discrete time digital feed-forward equalization circuit.

In an embodiment, a method of equalizing a data signal includes receiving the data signal and, based on a current symbol being received via the data signal and a previous symbol received via the data signal, generating an equalized data signal. The equalized data signal may be based on a difference between the current symbol and the previous symbol. The equalized data signal may be produced by an analog feed-forward equalization circuit. The equalized data signal may be produced by a circuit configured to form an analog inter-symbol interference pre-filter and a first post-cursor decision feedback equalization loop. The equalized data signal may be produced by a circuit configured to form an analog feed-forward equalization circuit and first post-cursor decision feedback equalization loop. The equalized data signal may be further based on a first prior symbol that is received via the data signal prior to the current symbol and a second prior symbol that is received consecutively after the first prior symbol.

The equalized data signal may be further based on the first prior symbol and the second prior symbol without using combinational logic between a summer used to produce the equalized data signal and a plurality of storage elements that store at least the first prior symbol and the second prior symbol. The data signal may be received in digital form and the equalized data signal may be produced in digital form by a discrete time digital feed-forward equalization circuit.

In an embodiment, a communication system includes a transmitter sending a data signal having non-uniform pre-emphasis. This non-uniform pre-emphasis is applied to transitions from a first plurality of output states to a first output state. This non-uniform pre-emphasis is also applied to transitions from a second plurality of output states to a second output state. The non-uniform pre-emphasis is applied such that transitions of the data signal from respective ones of the first plurality of first output states are to be received, after traversing a band-limited channel, with substantially a first voltage level at a receiver sampling time. Likewise, the non-uniform pre-emphasis is also applied such that transitions of the data signal from respective ones of the second plurality of output states are to be received, after traversing the band-limited channel, with substantially a second voltage level at the receiver sampling time. The communication system also includes a receiver, to receive the data signal having non-uniform pre-emphasis after the data signal has traversed the band-limited channel. This receiver selects, based on a first comparator output sampled at a previous receiver sampling time, between a first set of comparator outputs and a second set of comparator outputs. The selected set of comparator outputs is to be used to determine an output of the receiver corresponding to the receiver sampling time.

There may be three comparator outputs in each of the first set of comparator outputs and the second set of comparator outputs. The first comparator output may be based on a first reference voltage. A first one of the selected set of comparator outputs may be based on the first reference voltage. A second one of the selected set of comparator outputs may be based on a second reference voltage. A third one of the selected set of comparator outputs may be based on a third reference voltage. The third reference voltage may be greater than the first reference voltage. The second reference voltage may be less than the first reference voltage.

In an embodiment, a communication system, includes a transmitter sending a data signal having non-uniform pre-emphasis. The non-uniform pre-emphasis is applied to transitions from a first output state, a second output state, and a third output state to a fourth output state. The non-uniform pre-emphasis is applied such that transitions of the data signal from at least the first output state and the second output state, to the fourth output state, are to be received, after traversing a band-limited channel, with substantially the same voltage level at the receiver sampling time. The communication system also includes a receiver. The receiver is to receive the data signal having non-uniform pre-emphasis after the data signal has traversed the band-limited channel. The receiver is to use a first reference voltage to detect the fourth output state after transitions from the first output state and the second output state to the fourth output state. The receiver is also to use a second reference voltage to detect the fourth output state after transitions from the third output state to the fourth output state.

The receiver may include a first sampler to produce a previous symbol sampler decision indicator based on a comparison of the data signal during a previous symbol time to a first reference voltage. This first sampler is to also produce a first sampler decision based on a comparison of the data signal during a current symbol time to the first reference voltage. The receiver may also include a second sampler to produce a second sampler decision based on a comparison of the data signal to a second reference voltage during the current symbol time. The receive may also include a third sampler to produce a first sampler decision based on a comparison of the data signal to a third reference voltage during the current symbol time. The receiver may also include a fourth sampler to produce a second sampler decision based on a comparison of the data signal to a fourth reference voltage during the current symbol time. The receiver may also include a fifth sampler to produce a second sampler decision based on a comparison of the data signal to a fifth reference voltage during the current symbol time. The receiver may also include selection logic to, based on a first value of the previous symbol sampler decision indicator, use the second sampler decision and the fourth sampler decision to produce output bits and also to be based on a second value of the previous symbol sampler decision indicator, use the third sampler decision and the fifth sampler decision to produce the output bits.

The third reference voltage may be greater than the second reference voltage. The first reference voltage may be greater than the third reference voltage. The fourth reference voltage may be greater than the first reference voltage. The fifth reference voltage may be greater than the fourth reference voltage. The selection logic may comprise a first multiplexor to select between the second sampler decision and the third sampler decision and a second multiplexor to select between the fourth sampler decision and the fifth sampler decision. The output bits may correspond to four-level pulse amplitude modulation (PAM-4) signaling levels. The non-uniform pre-emphasis may be applied to the transmitted data signal such that transitions of the transmitted data signal from at least a first output state and a second output state, to a third output state, are to be received, after traversing a band-limited channel, with substantially the same voltage levels at the receiver sampling time.

In an embodiment, a receiver circuit may include: a data signal input that is to receive a data signal transmitted with non-uniform pre-emphasis; a first sampler that is to produce a previous symbol sampler decision indicator based on a comparison of the data signal during a previous symbol time to a first reference voltage, where the first sampler is to also produce a first sampler decision based on a comparison of the data signal during a current symbol time to the first reference voltage; a second sampler that is to produce a second sampler decision based on a comparison of the data signal to a second reference voltage during the current symbol time; a third sampler that is to produce a first sampler decision based on a comparison of the data signal to a third reference voltage during the current symbol time; a fourth sampler that is to produce a second sampler decision based on a comparison of the data signal to a fourth reference voltage during the current symbol time; a fifth sampler that is to produce a second sampler decision based on a comparison of the data signal to a fifth reference voltage during the current symbol time; and, selection logic that is to, based on a first value of the previous symbol sampler decision indicator, use the second sampler decision and the fourth sampler decision to produce output bits. The selection logic to also, based on a second value of the previous symbol sampler decision indicator, use the third sampler decision and the fifth sampler decision to produce the output bits.

The third reference voltage may be greater than the second reference voltage. The first reference voltage may be greater than the third reference voltage. The fourth reference voltage may be greater than the first reference voltage. The fifth reference voltage may be greater than the fourth reference voltage. The selection logic may include a first multiplexor to select between the second sampler decision and the third sampler decision, and a second multiplexor to select between the fourth sampler decision and the fifth sampler decision. The output bits may correspond to four-level pulse amplitude modulation (PAM-4) signaling levels.

The non-uniform pre-emphasis may be applied to a transmitted data signal such that transitions of the transmitted data signal from at least a first output state and a second output state, to a third output state, are to be received, after traversing a band-limited channel, with substantially the same voltage levels at the receiver sampling time. The non-uniform pre-emphasis may be applied by a transmitting integrated circuit using a finite impulse response filter. The non-uniform pre-emphasis may be applied to four-level pulse amplitude modulation (PAM-4) signaling levels by the transmitting integrated circuit. The receiver circuit may be included in a memory device. The receiver circuit may be included in a memory controller.

In an embodiment, an integrated circuit may include an output to couple to a band-limited channel; and, a transmitter to send a data signal via the band-limited channel. The data signal to have non-uniform pre-emphasis. The non-uniform pre-emphasis to be applied to transitions from a first output state, a second output state, and a third output state to a fourth output state. The non-uniform pre-emphasis to be applied by the transmitter such that transitions of the data signal from at least the first output state and the second output state, to the fourth output state, are to be received, after traversing the band-limited channel, with substantially the same voltage levels at the receiver sampling time.

The data signal may be received by a receiving integrated circuit that uses a first reference voltage to detect the fourth output state after transitions from the first output state and the second output state to the fourth output state. The integrated circuit to also use a second reference voltage to detect the fourth output state after transitions from the third output state to the fourth output state.

The integrated circuit may further include a first sampler to produce a previous symbol sampler decision indicator based on a comparison of the data signal during a previous symbol time to a first reference voltage. The first sampler to also produce a first sampler decision based on a comparison of the data signal during a current symbol time to the first reference voltage. The integrated circuit may further include a second sampler to produce a second sampler decision based on a comparison of the data signal to a second reference voltage during the current symbol time. The integrated circuit may further include a third sampler to produce a first sampler decision based on a comparison of the data signal to a third reference voltage during the current symbol time. The fourth sampler to produce a second sampler decision based on a comparison of the data signal to a fourth reference voltage during the current symbol time. The integrated circuit may further include a fifth sampler to produce a second sampler decision based on a comparison of the data signal to a fifth reference voltage during the current symbol time. The integrated circuit may further include selection logic to, based on a first value of the previous symbol sampler decision indicator, use the second sampler decision and the fourth sampler decision to produce output bits, and to, based on a second value of the previous symbol sampler decision indicator, use the third sampler decision and the fifth sampler decision to produce the output bits.

The third reference voltage may be greater than the second reference voltage. The first reference voltage may be greater than the third reference voltage. The fourth reference voltage may be greater than the first reference voltage. The fifth reference voltage may be greater than the fourth reference voltage. The receiving integrated circuit may be a memory device.

In an embodiment, a decision feedback equalizer, includes: a first previous symbol sampler to compare an equalized data signal to a first reference voltage to produce a first previous symbol sampler decision; a second previous symbol sampler to compare the equalized data signal to a second reference voltage to produce a second previous symbol sampler decision; a first current symbol sampler to compare a received data signal to the first reference voltage to produce a first current symbol sampler decision; a second current symbol sampler to compare the received data signal to the second reference voltage to produce a second current symbol sampler decision; and, an analog summer circuit to receive a first previous symbol error removal voltage that is based on the first previous symbol sampler decision, and to receive a second previous symbol error removal voltage that is based on the second previous symbol sampler decision, and to receive a first current symbol error removal voltage that is based on the first current symbol sampler decision, and to receive a second current symbol error removal voltage that is based on the second current symbol sampler decision, and to produce the equalized data signal based on a delayed version of the received data signal, the first previous symbol error removal voltage, the second previous symbol error removal voltage, the first current symbol error removal voltage, and the second current symbol error removal voltage.

The first data sampler and the second data sampler may be part of a PAM-4 sampler. The first previous symbol error removal voltage, the second previous symbol error removal voltage, the first current symbol error removal voltage, and the second current symbol error removal voltage may have substantially equal magnitudes. The first previous symbol sampler decision may determine a first sign of the first previous symbol error removal voltage. The first current symbol sampler decision may determine a second sign of the first current symbol error removal voltage. The first sign and the second sign may be opposite signs when the first previous symbol sampler decision and the first current symbol sampler decisions indicate the same result of respective comparisons to the first reference voltage. The delayed version of the received data signal may be produced by an analog sample and hold circuit that receives the received data signal.

The decision feedback equalizer may further include: a third previous symbol sampler to compare the equalized data signal to a third reference voltage to produce a third previous symbol sampler decision; a third current symbol sampler to compare the received data signal to the third reference voltage to produce a third current symbol sampler decision where the analog summer to further receive a third previous symbol error removal voltage that is based on the third previous symbol sampler decision, and is to receive a third current symbol error removal voltage that is based on the third current symbol sampler decision, and the equalized data signal is further based on the third previous symbol error removal voltage and the third current symbol error removal voltage.

The first previous symbol error removal voltage, the second previous symbol error removal voltage, and the third previous symbol error removal voltage, the first current symbol error removal voltage, the second current symbol error removal voltage, and the third current symbol error removal voltage may have substantially equal magnitudes. A first difference between the first reference voltage and the second reference voltage, and a second difference between the second reference voltage and the third reference voltage may be approximately equal. The first previous symbol error removal voltage and second previous symbol error removal voltage may have substantially different magnitudes thereby effecting unique decision feedback weights for the first previous symbol sampler decision and the second previous sampler decision. The first current symbol error removal voltage and second current symbol error removal voltage may have substantially different magnitudes thereby effecting unique decision feedback weights for the first current symbol sampler decision and the second current sampler decision.

A method of receiving a data signal includes producing a first previous symbol sampler decision indicator based on a comparison between an equalized data signal and a first reference voltage; producing a second previous symbol sampler decision indicator based on a comparison between the equalized data signal and a second reference voltage; producing a first current symbol sampler decision indicator based on a comparison between a received data signal and the first reference voltage; producing a second current symbol sampler decision indicator based on a comparison between the received data signal and the second reference voltage; based on the first previous symbol sampler decision indicator, producing a first previous symbol error removal voltage; based on the second previous symbol sampler decision indicator, producing a second previous symbol error removal voltage; based on the first current symbol sampler decision indicator, producing a second previous symbol error removal voltage; based on the second current symbol sampler decision indicator, producing a second current symbol error removal voltage; and, summing at least a delayed version of a received data signal with the first previous symbol error removal voltage, the second previous symbol error removal voltage, the first current symbol error removal voltage, the second current symbol error removal voltage to produce the equalized data signal.

The first previous symbol error removal voltage and the second previous symbol error removal voltage may have substantially different magnitudes thereby effecting unique decision feedback weights for the first previous symbol sampler decision indicator and the second previous symbol sampler decision indicator. The first previous symbol error removal voltage and the second previous symbol error removal voltage may have substantially different magnitudes than the first current symbol error removal voltage and the second current symbol error removal voltage.

The method may further include: producing a third previous symbol sampler decision indicator based on a comparison between the equalized data signal and a third reference voltage; producing a third current symbol sampler decision indicator based on a comparison between the received data signal and the third reference voltage; based on the third previous symbol sampler decision indicator, producing a third previous symbol error removal voltage; and, based on the third current symbol sampler decision indicator, producing a third current symbol error removal voltage; the third previous symbol error removal voltage and the third current symbol error removal voltage summed with the delayed version of the received data signal with the first previous symbol error removal voltage, the second previous symbol error removal voltage, the first current symbol error removal voltage, the second current error removal voltage to produce the equalized data signal.

A first difference between the first reference voltage and the second reference voltage, and a second difference between the second reference voltage and the third reference voltage may be substantially equal. The first previous symbol error removal voltage, the second previous symbol error removal, and the third previous symbol error removal voltage may have substantially unequal magnitudes thereby effecting unique decision feedback weights for the first previous symbol sampler decision indicator, the second previous symbol sampler decision indicator, and the third previous symbol sampler decision indicator. The first current symbol error removal voltage, the second current symbol error removal, and the third current symbol error removal voltage have substantially unequal magnitudes thereby effecting unique decision feedback weights for the first current symbol sampler decision indicator, the second current symbol sampler decision indicator, and the third current symbol sampler decision indicator. The method may also further include delaying, by a symbol time, the received data signal to produce the delayed version of the received data signal.

In an embodiment, an integrated circuit, includes: a first previous symbol sampler to compare an equalized data signal to a first reference voltage to produce a first previous symbol sampler decision; a second previous symbol sampler to compare the equalized data signal to a second reference voltage to produce a second previous symbol sampler decision; a third previous symbol sampler to compare the equalized data signal to a second reference voltage to produce a second previous symbol sampler decision; a first current symbol sampler to compare a received data signal to the first reference voltage to produce a first current symbol sampler decision; a second current symbol sampler to compare the received data signal to the second reference voltage to produce a second current symbol sampler decision; a third current symbol sampler to compare the received data signal to the second reference voltage to produce a second current symbol sampler decision; an analog summer circuit to receive a first previous symbol error removal voltage that is based on the first previous symbol sampler decision, and to receive a second previous symbol error removal voltage that is based on the second previous symbol sampler decision, and to receive a third previous symbol error removal voltage that is based on the third previous symbol sampler decision, and to receive a first current symbol error removal voltage that is based on the first current symbol sampler decision, and to receive a second current symbol error removal voltage that is based on the second current symbol sampler decision, and to receive a third current symbol error removal voltage that is based on the third current symbol sampler decision, and to produce the equalized data signal based on a delayed version of the received data signal, the first previous symbol error removal voltage, the second previous symbol error removal voltage, the third previous symbol error removal voltage, the first current symbol error removal voltage, the second current symbol error removal voltage, and the third current symbol error removal voltage. The first previous symbol sampler, the second previous symbol sampler, and the second previous symbol sampler may be configured as a PAM-4 sampler.

In an embodiment, a circuit to receive a data signal includes: a first data sampler to compare an equalized data signal to a first reference voltage to produce a first sampler decision; a second data sampler to compare the equalized data signal to a second reference voltage to produce a second sampler decision; an analog summer circuit to receive a first error removal voltage that is based on the first sampler decision, and to receive a second error removal voltage that is based on the second sampler decision, and to produce the equalized data signal based on a received data signal, the first error removal voltage, and the second error removal voltage.

The first data sampler and the second data sampler may be part of a PAM-4 sampler. The first error removal voltage and the second error removal voltage may have substantially equal magnitudes. The first sampler decision may determine a first sign of the first error removal voltage and the second sampler decision may determine a second sign of the second error removal voltage.

The integrated circuit may further include: a third data sampler to compare the equalized data signal to a third reference voltage to produce a third sampler decision; and, the summer circuit to further receive a third error removal voltage that is based on the third sampler decision and to produce the equalized data signal based on the third error removal voltage. The first error removal voltage, the second error removal voltage, and the third error removal voltage may have substantially equal magnitudes. The first sampler decision, the second sampler decision, and the third sampler decision may determine signs of the respective first error removal voltage, the second error removal voltage, and the third error removal voltage. A first difference between the first reference voltage and the second reference voltage, and a second difference between the second reference voltage and the third reference voltage may be approximately equal.

In an embodiment a method of receiving a data signal includes: producing a first sampler decision indicator based on a comparison between an equalized data signal and a first reference voltage; producing a second sampler decision indicator based on a comparison between the equalized data signal and a second reference voltage; based on the first sampler decision indicator, producing a first error removal voltage; based on the second sampler decision indicator, producing a second error removal voltage; summing at least a received data signal with the first error removal voltage and the second error removal voltage to produce the equalized data signal.

The first error removal voltage and the second error removal voltage may have substantially different magnitudes thereby effecting unique decision feedback weights for the first sampler decision indicator and the second sampler decision indicator. A first value of the first sampler decision indicator may cause the first error removal voltage to contribute to increasing the voltage of the received data signal to produce the equalized data signal. A second value of the first sampler decision indicator may cause the first error removal voltage to contribute to decreasing the voltage of the received data signal to produce the equalized data signal.

The method may further include: producing a third sampler decision indicator based on a comparison between the equalized data signal and a third reference voltage; based on the third sampler decision indicator, producing a third error removal voltage; and, the third error removal voltage summed with the received data signal, the first error removal voltage, and the second error removal voltage to produce the equalized data signal.

A first difference between the first reference voltage and the second reference voltage, and a second difference between the second reference voltage and the third reference voltage may be substantially equal. The first error removal voltage, the second error removal, and the third error removal voltage may have substantially unequal magnitudes thereby effecting unique decision feedback weights for the first sampler decision indicator, the second sampler decision indicator, and the third sampler decision indicator. The first decision indicator, the second decision indicator, and the third decision indicator may determine whether a respective first error removal voltage, second error removal voltage, and third error removal voltage respectively contribute to increasing or decreasing the equalized data signal.

In an embodiment, an integrated circuit includes: a first data sampler to compare an equalized data signal to a first reference voltage to produce a first sampler decision; a second data sampler to compare the equalized data signal to a second reference voltage to produce a second sampler decision; a third data sampler to compare the equalized data signal to a third reference voltage to produce a third sampler decision; an analog summer circuit to receive a first error removal voltage that is based on the first sampler decision, and to receive a second error removal voltage that is based on the second sampler decision, and to receive a third error removal voltage that is based on the third sampler decision, and to produce the equalized data signal based on a received data signal, the first error removal voltage, and the second error removal voltage.

The first error removal voltage, the second error removal voltage, and the third error removal voltage may have substantially equal magnitudes. The first sampler decision, the second sampler decision, and the third sampler decision may determine signs of the respective first error removal voltage, the second error removal voltage, and the third error removal voltage. A first difference between the first reference voltage and the second reference voltage, and a second difference between the second reference voltage and the third reference voltage may be approximately equal. The first data sampler and the second data sampler may comprise a PAM-4 sampler.

In an embodiment, a decision feedback equalizer (DFE) includes: an analog feed-forward equalizer (FFE), the FFE to receive an equalized data signal and to produce a first analog tap output; a first sampler to receive the first analog tap output and to produce a first sampler decision; and, an analog summer to receive at least a received data signal and a first error removal voltage that is based on the first sampler decision, the summer to produce the equalized data signal.

The FFE may further include: an analog sample and hold to produce a delayed version of the equalized data signal; and, a summer to produce the first analog tap output, the summer to receive a current symbol error removal voltage and a previous symbol error removal voltage, the current symbol error removal voltage being based on the equalized data signal, the previous symbol error removal voltage being based on the delayed version of the equalized data signal.

The decision feedback equalizer may further include tap feedback circuitry to receive at least the first sampler decision and to produce the first error removal voltage. The tap feedback circuitry may receive a plurality of sampler decisions that includes the first sampler decision, and produce a corresponding plurality of error removal voltages corresponding to the plurality of sampler decisions, the plurality of sampler decisions corresponding to previous values of the first sampler decision.

In an embodiment, a method of receiving a data signal includes: producing a first sampler decision by sampling a first analog output by an analog feed-forward equalizer that receives an equalized data signal; producing a first error removal voltage by weighting the first sampler decision; and, summing at least a received data signal and the first error removal voltage to produce the equalized data signal.

The method may also include: holding the equalized data signal to produce a delayed analog version of the equalized data signal; weighting the delayed analog version of the equalized data signal to produce a previous symbol error removal voltage; weighting the equalized data signal to produce a current symbol error removal voltage; and, producing the first analog output by summing a current symbol error removal voltage and a previous symbol error removal voltage.

The method may also include: weighting a second sampler decision to produce a corresponding second error removal voltage that corresponds to a previous value of the first sampler decision where the second sampler decision is summed with at least the received data signal and the first error removal voltage to produce the equalized data signal.

In an embodiment, a decision feedback equalizer (DFE) includes: a first tap DFE loop that receives to receive an equalized data signal and to produce a first sampler decision based on a previous symbol sampler decision and the equalized data signal; and, a first analog summer to receive at least a received data signal and a first error removal voltage that is based on the first sampler decision, the summer to produce the equalized data signal.

The first tap DFE loop may further include: first tap weighting circuitry to receive the previous sampler decision and to produce a first tap error removal voltage; equalized data signal weighting circuitry to receive the equalized data signal and produce a weighted current symbol voltage; a second analog summer to receive the weighted current symbol voltage and the first tap error removal voltage; and, a sampler to receive the output of the second analog summer and to produce the first sampler decision.

The decision feedback equalizer may further include tap feedback circuitry to receive a plurality of sampler decisions that include the first sampler decision, and produce a corresponding plurality of error removal voltages correspond to the plurality of sampler decisions. The plurality of sampler decision may correspond to previous values of the first sampler decision.

The decision feedback equalizer may further include tap feedback circuitry to receive a plurality of sampler decisions that does not include the first sampler decision, and produce a corresponding plurality of error removal voltages correspond to the plurality of sampler decisions. The plurality of sampler decision corresponding to previous values of the first sampler decision.

In an embodiment, a decision feedback equalizer (DFE) includes: a first tap DFE loop that receives to receive an equalized data signal and to produce a first sampler decision based on a previous symbol sampler decision and the equalized data signal; and, a first analog summer to receive at least a received data signal and a first error removal voltage that is based on the first sampler decision, the summer to produce the equalized data signal.

The first tap DFE loop may further include: first tap weighting circuitry to receive the previous sampler decision and to produce a first tap error removal voltage; equalized data signal weighting circuitry to receive the equalized data signal and produce a weighted current symbol voltage; a second analog summer to receive the weighted current symbol voltage and the first tap error removal voltage; and, a sampler to receive the output of the second analog summer and to produce the first sampler decision.

The decision feedback equalizer may further include: tap feedback circuitry to receive a plurality of sampler decisions that include the first sampler decision, and produce a corresponding plurality of error removal voltages correspond to the plurality of sampler decisions, the plurality of sampler decision corresponding to previous values of the first sampler decision. The decision feedback may further include tap feedback circuitry to receive a plurality of sampler decisions that does not include the first sampler decision, and produce a corresponding plurality of error removal voltages correspond to the plurality of sampler decisions, the plurality of sampler decision corresponding to previous values of the first sampler decision.

The systems and devices described above may be implemented in computer systems, integrated circuits, or stored by computer systems. The systems described above may also be stored on a non-transitory computer readable medium. Devices, circuits, and systems described herein may be implemented using computer-aided design tools available in the art, and embodied by computer-readable files containing software descriptions of such circuits. This includes, but is not limited to, one or more elements of system 100, system 200, receiver 300, receiver 302, receiver 400, receiver 402, receiver 500, receiver 600, receiver 700, receiver 800, receiver 900, receiver 1000, receiver 1100, system 1200, receiver 1500, receiver 1600, receiver 1700, system 2200, digital FFE+DFE 2295, and their components. These software descriptions may be: behavioral, register transfer, logic component, transistor, and layout geometry-level descriptions. Moreover, the software descriptions may be stored on non-transitory storage media or communicated by carrier waves.

Data formats in which such descriptions may be implemented include, but are not limited to: formats supporting behavioral languages like C, formats supporting register transfer level (RTL) languages like Verilog and VHDL, formats supporting geometry description languages (such as GDSII, GDSIII, GDSIV, CIF, and MEBES), and other suitable formats and languages. Moreover, data transfers of such files on machine-readable media may be done electronically over the diverse media on the Internet or, for example, via email. Note that physical files may be implemented on machine-readable media such as: 4 mm magnetic tape, 8 mm magnetic tape, 3½-inch floppy media, CDs, DVDs, Blu-Ray, and so on.

Figure 25:
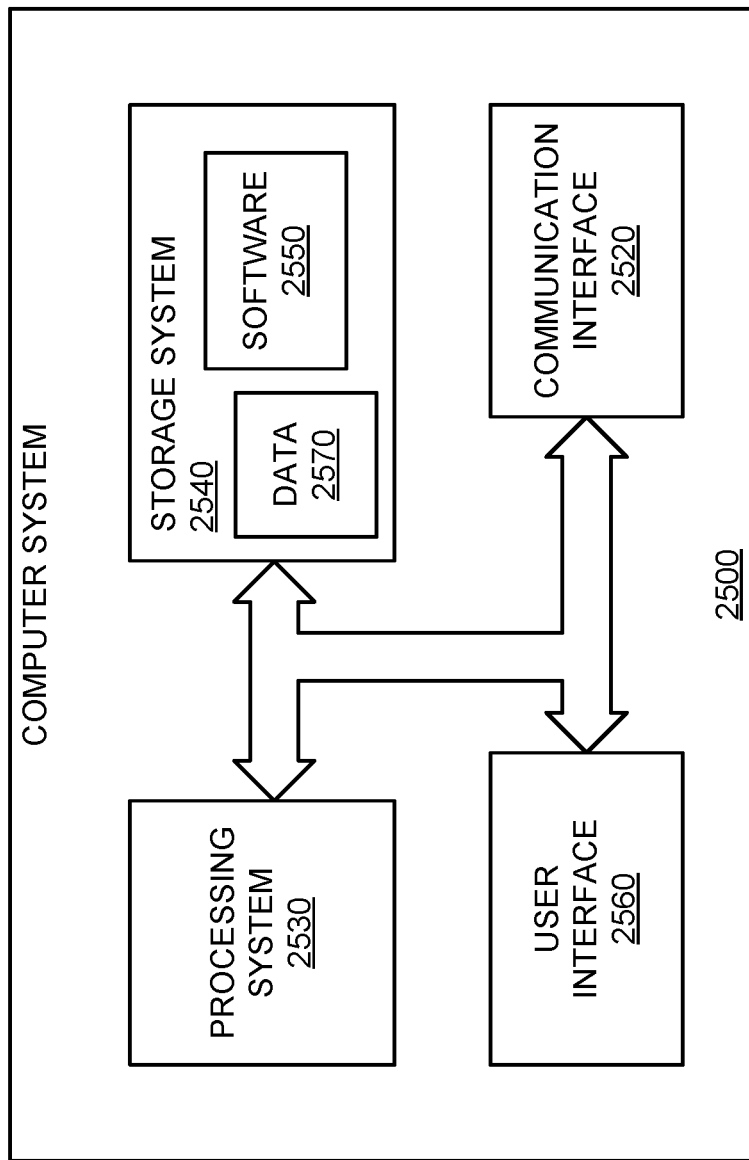
FIG. 25 is a block diagram of a computer system.

FIG. 25 illustrates a block diagram of a computer system. Computer system 2500 includes communication interface 2520, processing system 2530, storage system 2540, and user interface 2560. Processing system 2530 is operatively coupled to storage system 2540. Storage system 2540 stores software 2550 and data 2570. Computer system 2500 may include one or more of system 100, system 200, receiver 300, receiver 302, receiver 400, receiver 402, receiver 500, receiver 600, receiver 700, receiver 800, receiver 900, receiver 1000, receiver 1100, system 1200, receiver 1500, receiver 1600, receiver 1700, system 2200, digital FFE+DFE 2295, or components that implement the methods, circuits, and/or waveforms described herein. Processing system 2530 is operatively coupled to communication interface 2520 and user interface 2560. Computer system 2500 may comprise a programmed general-purpose computer. Computer system 2500 may include a microprocessor. Computer system 2500 may comprise programmable or special purpose circuitry. Computer system 2500 may be distributed among multiple devices, processors, storage, and/or interfaces that together comprise elements 2520-2570.

Communication interface 2520 may comprise a network interface, modem, port, bus, link, transceiver, or other communication device. Communication interface 2520 may be distributed among multiple communication devices. Processing system 2530 may comprise a microprocessor, microcontroller, logic circuit, or other processing device. Processing system 2530 may be distributed among multiple processing devices. User interface 2560 may comprise a keyboard, mouse, voice recognition interface, microphone and speakers, graphical display, touch screen, or other type of user interface device. User interface 2560 may be distributed among multiple interface devices. Storage system 2540 may comprise a disk, tape, integrated circuit, RAM, ROM, EEPROM, flash memory, network storage, server, or other memory function. Storage system 2540 may include computer readable medium. Storage system 2540 may be distributed among multiple memory devices.

Processing system 2530 retrieves and executes software 2550 from storage system 2540. Processing system 2530 may retrieve and store data 2570. Processing system 2530 may also retrieve and store data via communication interface 2520. Processing system 2530 may create or modify software 2550 or data 2570 to achieve a tangible result. Processing system 2530 may control communication interface 2520 or user interface 2560 to achieve a tangible result. Processing system 2530 may retrieve and execute remotely stored software via communication interface 2520.

Software 2550 and remotely stored software may comprise an operating system, utilities, drivers, networking software, and other software typically executed by a computer system. Software 2550 may comprise an application program, applet, firmware, or other form of machine-readable processing instructions typically executed by a computer system. When executed by processing system 2530, software 2550 or remotely stored software may direct computer system 2500 to operate.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A receiver circuit comprising:
    an analog summer circuit to receive a first input signal and to produce an output data signal based on a first error removal voltage;
    a data sampler to sample a sampler input signal based on the output data signal to produce a first sampler decision that corresponds to a current symbol, the data sampler to, previous to producing the first sampler decision, have produced a second sampler decision that corresponds to a second symbol immediately previous to the current symbol, and the data sampler to, previous to producing the second sampler decision, have produced a third sampler decision that corresponds to a third symbol immediately previous to the second symbol; and,
    the first error removal voltage to be based on a first difference between the second symbol and the third symbol.

2. The receiver circuit of claim 1, wherein the first difference is multiplied by a first scaling factor to generate the first error removal voltage.

3. The receiver circuit of claim 2, wherein a fourth sampler decision corresponds to a fourth symbol immediately previous to the third symbol.

4. The receiver circuit of claim 3, wherein a second error removal voltage is to be based on a second difference between the third symbol and the fourth symbol.

5. The receiver circuit of claim 4, wherein the analog summer circuit is to receive the second error removal voltage and is to produce the output data signal based on the second error removal voltage.

6. The receiver circuit of claim 4, wherein the second difference is multiplied by a second scaling factor to generate the second error removal voltage.

7. The receiver circuit of claim 1, wherein the sampler input signal is based on the second symbol.

8. A receiver circuit comprising:
    a data sampler to produce a first sampler decision that corresponds to a current symbol, the data sampler to, previous to producing the first sampler decision, have produced a second sampler decision that corresponds to a second symbol immediately previous to the current symbol, and the data sampler to, previous to producing the second sampler decision, have produced a third sampler decision that corresponds to a third symbol immediately previous to the second symbol;

first error removal voltage circuitry to, based on a first difference between the second symbol and the third symbol, generate a first error removal voltage; and error removal circuitry to, based on the first error removal voltage, produce a data sampler input signal used by the data sampler to produce the first sampler decision, the second sampler decision, and the third sampler decision.

9. The receiver circuit of claim 8, wherein the first difference is multiplied by a first scaling factor to generate the first error removal voltage.

10. The receiver circuit of claim 9, wherein a fourth sampler decision corresponds to a fourth symbol immediately previous to the third symbol.

11. The receiver circuit of claim 10, wherein a second error removal voltage is to be based on a second difference between the third symbol and the fourth symbol.

12. The receiver circuit of claim 11, wherein the error removal circuitry is to receive the second error removal voltage and the data sampler input signal is further based on the second error removal voltage.

13. The receiver circuit of claim 11, wherein the second difference is multiplied by a second scaling factor to generate the second error removal voltage.

14. The receiver circuit of claim 8, wherein the data sampler input signal is based on a scaled value of the second symbol.

15. A method of receiving a data signal, comprising:
producing a first sampler decision corresponding to a current symbol;

prior to producing the first sampler decision, producing a second sampler decision corresponding to a second symbol immediately previous to the current symbol;

prior to producing the second sampler decision, producing a third sampler decision corresponding to a third symbol immediately previous to the second symbol;

producing a first error removal voltage based on a first difference between the second symbol and the third symbol; and based on the first error removal voltage, producing a data sampler input signal used to produce the first sampler decision, the second sampler decision, and the third sampler decision.

16. The method of claim 15, wherein the first difference is multiplied by a first scaling factor to produce the first error removal voltage.

17. The method of claim 16, further comprising:
producing a fourth sampler decision corresponding to a fourth symbol immediately previous to the third symbol.

18. The method of claim 17, further comprising:
producing a second error removal voltage based on a second difference between the third symbol and the fourth symbol.

19. The method of claim 18, wherein the data sampler input signal is further based on the second error removal voltage.

20. The method of claim 19, wherein the data sampler input signal is further based on a scaled value of the second symbol.

* * * * *